(12) United States Patent
Kanai et al.

(10) Patent No.: US 7,449,866 B2
(45) Date of Patent: *Nov. 11, 2008

(54) BOOSTER THAT UTILIZES ENERGY OUTPUT FROM A POWER SUPPLY

(75) Inventors: Yasuyuki Kanai, Tokyo (JP); Masato Mino, Tokyo (JP); Satoshi Matsumoto, Tokyo (JP); Kazuya Akiyama, Tokyo (JP); Kousuke Katsura, Tokyo (JP); Junichi Ohwaki, Tokyo (JP); Satoshi Nakayama, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/925,481

(22) Filed: Oct. 26, 2007

(65) Prior Publication Data

US 2008/0062729 A1 Mar. 13, 2008

Related U.S. Application Data

(63) Continuation of application No. 10/526,928, filed as application No. PCT/JP2004/009993 on Jul. 7, 2004, now Pat. No. 7,345,458.

(30) Foreign Application Priority Data

Jul. 7, 2003 (JP) ............................. 2003-193185
Jun. 9, 2004 (JP) ............................. 2004-170957

(51) Int. Cl.
*G05F 1/00* (2006.01)
(52) U.S. Cl. ...................... 323/222; 323/901; 307/43; 307/80

(58) Field of Classification Search ................. 323/222, 323/901, 906; 307/43, 80
See application file for complete search history.

(56) References Cited

U.S. PATENT DOCUMENTS

| | | | |
|---|---|---|---|
| 4,691,159 A | 9/1987 | Ahrens et al. | |
| 5,027,051 A | 6/1991 | Lafferty | |
| 5,751,139 A | 5/1998 | Jordan et al. | |
| 5,801,519 A | 9/1998 | Midya et al. | |
| 5,892,353 A | 4/1999 | Yama | |
| 5,949,222 A | 9/1999 | Buono | |
| 6,037,756 A | 3/2000 | Pong | |
| 6,177,736 B1 | 1/2001 | Raiser | |
| 6,275,013 B1 | 8/2001 | Higuchi | |
| 7,081,739 B2 | 7/2006 | Osinga et al. | |
| 7,345,458 B2 * | 3/2008 | Kanai et al. ............. | 323/222 |

FOREIGN PATENT DOCUMENTS

| | | |
|---|---|---|
| JP | 11-196540 | 7/1999 |
| JP | 3025106 | 1/2000 |
| JP | 2002-63923 | 2/2002 |

* cited by examiner

*Primary Examiner*—Jeffrey L Sterrett
(74) *Attorney, Agent, or Firm*—Oblon, Spivak, McClelland, Maier & Neustadt, P.C.

(57) ABSTRACT

A booster circuit generates a boosted output by boosting a low voltage output supplied as a target to be boosted and feeds back a part of the boosted output, an output by the booster circuit itself, to the booster circuit as operation energy. An auxiliary booster circuit outputs start-up energy generated based on a low voltage output to the booster circuit as start-up energy that is necessary for starting up the booster circuit.

2 Claims, 30 Drawing Sheets

BOOSTER THAT UTILIZES ENERGY OUTPUT FROM A POWER SUPPLY

CROSS REFERENCE TO RELATED APPLICATIONS

This application is a Continuation of and claims the benefit of priority under 35 U.S.C. §120 from U.S. Ser. No. 10/526,928, filed Mar. 8, 2005 and claims priority to Japanese patent application no. 2003-193185, filed in the Japan Patent Office on Jul. 7, 2003 and Japanese patent application no. 2004-170957, filed in the Japan Patent Office on Jun. 9, 2004, and claims priority from PCT/JP04/09993, filed Jul. 7, 2004, the disclosure of which is incorporated by reference herein in its entirety.

TECHNICAL FIELD

The present invention relates to a booster and more particularly to a booster that utilizes energy output from a fuel cell or a solar cell.

BACKGROUND ART

Studies on utilization of fuel cells and solar cells as a power supply for mobile devices have been in progress. The reason being that the fuel cells have high energy density per unit weight and hence a large capacity, moreover, the solar cells are portable due to their light weight and thin structure.

The fuel cells produce power from a chemical reaction between hydrogen and oxygen. The fuel cells are considered to produce clean energy because they neither discharge noxious gases such as nitrogen oxides ($NO_x$) nor make any noise. The weight energy density of the fuel cells, one of the indicators that meter the performance of the cells, is said to be ten times as high as that of lithium ion cells. This means that a 5-hour-driving note-type personal computer can be used for 50 hours by employing the fuel cells. Due to these advantageous, the fuel cells are expected to drastically enhance convenience of the mobile devices.

The solar cells are clean energy sources free of noxious gases and noise and have an advantage over secondary cells, such as lithium ion cells and nickel-cadmium cells, that energy does not have to be supplemented. Therefore, the solar cells alone or in combination with fuel cells are expected to be used more and more in mobile devices.

Solar cells having a size suitable for use in the mobile devices have a low output voltage of about 0.5 volt (V) for a single cell. A solid polymer electrolyte fuel cell (PEFC) and a direct methanol fuel cell (DMFC), which are expected to be used in the mobile devices, each has a low output voltage for a single cell of 0.6 V to 0.7 V without loads and around 0.3 V when rated output is produced. These output voltages are determined based on the principles of power generation by fuel cells and solar cells. Single cells alone cannot produce output voltages higher than the above-mentioned voltages.

Therefore, with single cell batteries alone, neither the electronic devices can be operated nor the secondary batteries, such as a nickel-cadmium battery and a lithium battery, can be charged. This compels one to use, for example, a technique of serially connecting single cells to form a battery module to obtain a voltage necessary for operating the electric/electronic devices or charging the secondary cells.

However, this technique has the following problems.

First, in the case of fuel cells, there is an increase in cost for producing the fuel cells due to the structure for uniformly distributing fuel and oxygen (air) to all the cells. Moreover, an output current produced by the structure is limited to a current from a cell that receives a minimum supply of fuel and oxygen or to a current of a cell that generates the least current due to an inappropriate mixing ratio of the fuel and oxygen. Therefore, a countermeasure is taken for uniformly distributing fuel and so on, such as providing grooves in flow channels for fuel and oxygen in the fuel cell. However, this increases the cost since the grooves need to be provided with a coat of a material that can endure corrosion.

On the other hand, two problems arise in case of the fuel cells. The first problem relates to the output power. Some of the single cells that constitute a solar cell module may be under shadow, which leads to a decrease in the output voltage of the solar cells. In particular, when the solar cell module is mounted on a mobile device, it can be difficult for the entire solar cell module to receive light always. In addition, if a structure is adopted in which the entire solar cell module receives light always, it may not suit to the user's satisfaction.

The second problem relates to the cost. To connect single cells of a solar cell serially to constitute a solar cell module, it is essential to add bypass diodes, and to take countermeasures for insulation of wiring that connects a front surface of one solar cell to a rear surface of a neighboring solar cell and between the single cells of the solar cell. To increase the module packing factor of the solar cell, it is necessary to shorten the wiring between the single cells of the solar cell or decrease interstices for intercellular insulation. This requires the cells to be arranged with high precision. The countermeasures for intercellular insulation and the requirement of high precision are some of the reason that increase the cost.

Conventional technologies aimed at solving the problems include solar cell devices that use a tandem-type solar cell providing a relatively high output voltage of a little less than 2 V to avoid serial connection and use a booster circuit to charge a secondary cell (see, for example, Patent Document 1).

Patent Document 1: Gazette of Japanese Patent No. 3,025,106 (for example, page 3, reference numeral 5 in FIG. 1)

In the solar cell device described in Patent Document 1, a tandem-type solar cell is used in which the output voltage of the solar cell is boosted by constructing the solar cell by a plurality of layers and connecting the layers directly one to another. Since the tandem-type solar cell provides an output voltage of a little less than 2 V, the solar cell can boot a booster circuit with an oscillation circuit of a complementary metal oxide semiconductor (CMOS) type having a minimum start-up voltage of about 1.4 V.

The tandem-type solar cells are cheaper only in comparison with a solar cell in which single cells are serially connected. In other words, when compared with ordinary single cell solar cells, there still remains a problem of complexity in the production process, so that the production cost cannot be reduced drastically and the cost of the solar cell is not reduced.

The solar cell device disclosed in Patent Document 1 is provided with a booster circuit and it is necessary to first boot the booster circuit before the solar cell device can be operated. A predetermined amount of start-up energy needs to be supplied from a power supply unit. Accordingly, when the energy in the power supply unit is empty or insufficient, the booster circuit cannot be boot.

A first object of the present invention is to provide a booster that prevents an increase in production cost due to use of a special electric cell and allows a reduction in cost by multipurpose application of cells.

A second object of the present invention is to provide a booster having a booster circuit that can be boot without a power supply unit.

DISCLOSURE OF THE INVENTION

According to an aspect of the present invention, a booster includes a booster circuit to which start-up energy necessary for starting up the booster circuit and operation energy necessary for continuing an operation of the booster circuit are supplied, wherein the booster circuit generates a boosted output obtained by boosting an input voltage as a target to be boosted; and a power supply unit that supplies the start-up energy and the operation energy to the booster circuit.

According to another aspect of the present invention, a booster includes a booster circuit to which either one of start-up energy necessary for starting up the booster circuit and operation energy necessary for continuing an operation of the booster circuit is supplied, wherein the booster circuit generates a boosted output obtained by boosting an input voltage as a target to be boosted; a power supply unit that supplies the start-up energy; and a selector circuit that outputs either one of the start-up energy and the operation energy to the booster circuit, wherein the booster circuit outputs all or a part of the boosted output to the selector circuit as the operation energy.

In the booster according to the above aspects, the selector circuit includes a first rectifier element connected to between the power supply unit and the booster circuit; and a second rectifier element that is normally connected in a direction in which all or a part of the boosted output is fed back to the booster circuit.

In the booster according to the above aspects, the booster includes an output controller circuit that is provided in a stage subsequent to the booster circuit and performs output control to the boosted output obtained from the booster circuit.

In the booster according to the above aspects, the booster includes a unit that controls an ability of boosting of the booster based on the output control by the output controller circuit.

In the above aspects, with a configuration that the booster circuit is driven by a power supplying unit different from the first cell that is a main power source, a boosted voltage can be obtained in a high efficiency even when the output voltage of the main power source is a low voltage power, so that there is no need to use a plurality of cells that is connected in series as the main power source. Accordingly, instability of the output voltage can be eliminated and cost can be reduced.

Moreover, by supplying a power necessary for the start-up and operation of the booster circuit from a selected output selected by the rectifier out of the power generation voltage from the power supplying unit and a part of the boosted output, target to be boosted, obtained from a first cell, or a selected output obtained using a rectifier element that has equivalent rectifying characteristics (such as a part between the base and emitter of a bipolar transistor), the boosting capability of the booster circuit can be increased. Use of the output controller circuit allows the booster circuit to operate without being influenced by the control output from the output controller circuit to obtain stable start-up characteristics when starting up the booster circuit.

According to still another aspect of the present invention, a booster includes a booster circuit to which start-up energy necessary for starting up the booster circuit and operation energy necessary for continuing an operation of the booster circuit are supplied, wherein the booster circuit generates a boosted output obtained by boosting an input voltage as a target to be boosted; and a power supply unit that supplies the start-up energy to the booster circuit, wherein the booster circuit feeds back all or a part of the boosted output as the operation energy to the booster circuit.

According to the above aspect, a low voltage output, target to be boosted, is supplied to the booster circuit and start-up energy from the power generating unit is input to the booster circuit while operation energy necessary for continuing the operation of the booster circuit itself is fed back to the booster circuit by the booster circuit itself. Accordingly, a boosted output for operating, for example, a mobile device can be obtained by utilizing a low voltage output.

According to still another aspect of the present invention, a booster includes a booster circuit to which either one of start-up energy necessary for starting up the booster circuit and operation energy necessary for continuing an operation of the booster circuit is supplied, wherein the booster circuit generates a boosted output obtained by boosting an input voltage as a target to be boosted; a power supply unit that supplies the start-up energy; and a selector circuit that outputs either one of the start-up energy and the operation energy to the booster circuit, wherein the booster circuit outputs all or a part of the boosted output to the selector circuit and the power supply unit.

According to the above aspect, a low voltage output, target to be boosted, is supplied to the booster circuit, and the selector circuit, to which both the start-up energy and operation energy are input, outputs either one of the start-up energy and operation energy to the booster circuit. Accordingly, the boosted output for operating, for example, a mobile device can be obtained utilizing the energy of a low voltage output and efficient utilization of boosted output energy can be realized.

According to still another aspect of the present invention, a booster includes a booster circuit to which start-up energy necessary for starting up the booster circuit and operation energy necessary for continuing an operation of the booster circuit are supplied, wherein the booster circuit generates a boosted output by boosting an input voltage, a target to be boosted, and outputs the boosted output; and a storage element that stores the boosted output and generates a constant voltage output, and feeds back the constant voltage output as the start-up energy and the operation energy to the booster circuit.

According to the above aspect, a low voltage output, target to be boosted, is supplied to the booster circuit, and start-up energy necessary for the start-up of the booster circuit itself and operation energy necessary for continuing the operation of the booster circuit itself are output from the storage element to which the boosted output is input. Accordingly, the boosted output for operating, for example, a mobile device can be obtained utilizing the energy of a low voltage output, and efficient utilization of boosted output energy can be realized.

According to still another aspect of the present invention, a booster includes a booster circuit to which either start-up energy necessary for start starting up the booster circuit or operation energy necessary for continuing an operation of the booster circuit is supplied, wherein the booster circuit generates a boosted output by boosting an input voltage, a target to be boosted, and outputs the boosted output; and a storage element that stores the boosted output input through a rectifier element connected in a forward direction between the booster circuit and the storage element and generates a constant voltage output, and outputs the start-up energy; and a selector circuit that outputs either the start-up energy or the operation energy to the booster circuit.

According to the above aspect, a low voltage output, target to be boosted, is supplied to the booster circuit and the selector circuit, to which both the start-up energy as an output of the storage element and the operation energy as an output of the booster circuit are input, outputs either one of the start-up energy and operation energy to the booster circuit. Accordingly, the boosted output for operating, for example, a mobile device can be obtained by using the energy of a low voltage output, a load on the storage element can be reduced, and cost efficient utilization of boosted output energy can be realized.

According to still another aspect of the present invention, a booster includes a booster circuit to which start-up energy necessary for starting up the booster circuit and operation energy necessary for continuing an operation of the booster circuit are supplied, wherein the booster circuit generates a boosted output obtained by boosting an input voltage, target to be boosted; a power supplying unit that supplies the start-up energy; a switching unit that performs output control of the start-up energy, wherein the booster circuit feeds back all or a part of the boosted output to the booster circuit as the operation energy and outputs the boosted output to the switching unit as a supply stop signal for the start-up energy, and the switching unit performs control whether to output the start-up energy to the booster circuit based on a start-up signal based on power generation control of a low voltage output input as the target to be boosted and the supply stop signal.

According to the above aspect, a low voltage output, target to be boosted, is input to the booster circuit, and the selector circuit, to which both the start-up energy and the operation energy as an output of the booster circuit are input through the switching unit that operates based on the start-up signal output from the detecting unit, outputs either one of the start-up energy and operation energy to the booster circuit. Accordingly, the boosted output for operating, for example, a mobile device can be obtained by using the energy of a low voltage output, and the start-up energy can be output only when it is necessary to start up the booster circuit, so that it is possible to use the start-up energy efficiently.

According to still another aspect of the present invention, a booster includes a booster circuit to which either one of start-up energy necessary for starting up the booster circuit and operation energy necessary for continuing an operation of the booster circuit is supplied, wherein the booster circuit generates a boosted output obtained by boosting an input voltage as a target to be boosted; a power supplying unit that supplies the start-up energy; a switching unit that performs output control of the start-up energy; and a selector circuit that outputs either one of the start-up energy and the operation energy to the booster circuit, wherein the booster circuit outputs all or a part of the boosted output to the selector circuit and the power supplying unit, the switching unit performs control whether to output the start-up energy to the selector circuit based on a start-up signal based on power generation control of a low voltage output input as the target to be boosted.

According to the above aspect, a low voltage output, target to be boosted, is input to the booster circuit and the selector circuit, to which both the start-up energy and the operation energy as an ouptput of the booster circuit are input through the switching unit that operates based on the start-up signal output, outputs either one of the start-up energy and operation energy to the booster circuit. Accordingly, the boosted output for operating, for example, a mobile device can be obtained by using the energy of a low voltage output, and the start-up energy can be output only when it is necessary to start up the booster circuit, so that it is possible to use the start-up energy efficiently. All or a part of the boosted output is output and stored in the power supplying unit, so that the consumed start-up energy can be effectively supplemented.

According to still another aspect of the present invention, a booster includes a booster circuit to which either one of start-up energy necessary for starting up the booster circuit and operation energy necessary for continuing an operation of the booster circuit is supplied, wherein the booster circuit generates a boosted output obtained by boosting an input voltage as a target to be boosted; a power supplying unit that supplies the start-up energy; a switching unit that performs output control of the start-up energy; a selector circuit that outputs either one of the start-up energy and the operation energy to the booster circuit; and a signal delay circuit that generates a delay signal obtained by delaying a power generation request signal sent for power generation control of a low voltage output input as the target to be boosted by a predetermined time and outputs the delay signal, wherein the booster circuit outputs all or a part of the boosted output to the selector circuit and the power supplying unit, and the switching unit performs control whether to output the operation energy to the selector circuit based on the delay signal.

According to the above aspect, a low voltage output, target to be boosted, is input to the booster circuit and the selector circuit, to which both the start-up energy and the operation energy as an output of the booster circuit are input through the switching unit that operates based on the start-up signal output, outputs either one of the start-up energy and the operation energy to the booster circuit. Accordingly, the boosted output for operating, for example, a mobile device can be obtained by using the energy of a low voltage output, and the start-up energy can be output only when it is necessary to start up the booster circuit, so that it is possible to use the start-up energy efficiently. All or a part of the boosted output is output and stored in the power supplying unit, so that the consumed start-up energy can be effectively supplemented.

According to still another aspect of the present invention, a booster includes a booster circuit to which either one of start-up energy necessary for starting up the booster circuit and operation energy necessary for continuing an operation of the booster circuit is supplied, wherein the booster circuit generates a boosted output obtained by boosting an input voltage as a target to be boosted; and an auxiliary booster circuit that outputs the start-up energy generated based on the low voltage output to the booster circuit, wherein the booster circuit feeds back all or a part of the boosted output to the booster circuit itself as the operation energy.

According to the above aspect, the booster circuit, which is started up by the auxiliary booster circuit that outputs start-up energy generated based on a low voltage output to the booster circuit, feeds back a part of the boosted output that is output by the booster circuit itself to the booster circuit itself as operation energy. Accordingly, the booster circuit itself can be started up or continue the boosting operation of the booster circuit itself independently of the power supplying unit other than the power generating element that outputs a low voltage output, so that boosting of the power generation energy output from the power generating element can be performed reliably.

According to the above aspects, the first object of the present invention that is to provide a booster that prevents an increase in production cost due to use of a special electric cell and to allow a reduction in cost by multipurpose application of cells can be achieved.

Moreover, the second object of the present invention to provide a booster that can start up a booster circuit independently of start-up energy from a power supply unit can be achieved.

BRIEF DESCRIPTION OF THE DRAWINGS

FIG. 23 is a diagram of one example of a configuration of an output controller circuit 16a;

FIG. 24 is a diagram of another example of the configuration of the output controller circuit 16a;

BEST MODE FOR CARRYING OUT THE INVENTION

Exemplary embodiments of a booster according to the present invention are explained in detail with reference to the accompanying drawings. The present invention should not be considered as being limited by the embodiments.

FIRST EMBODIMENT

Figure 1:
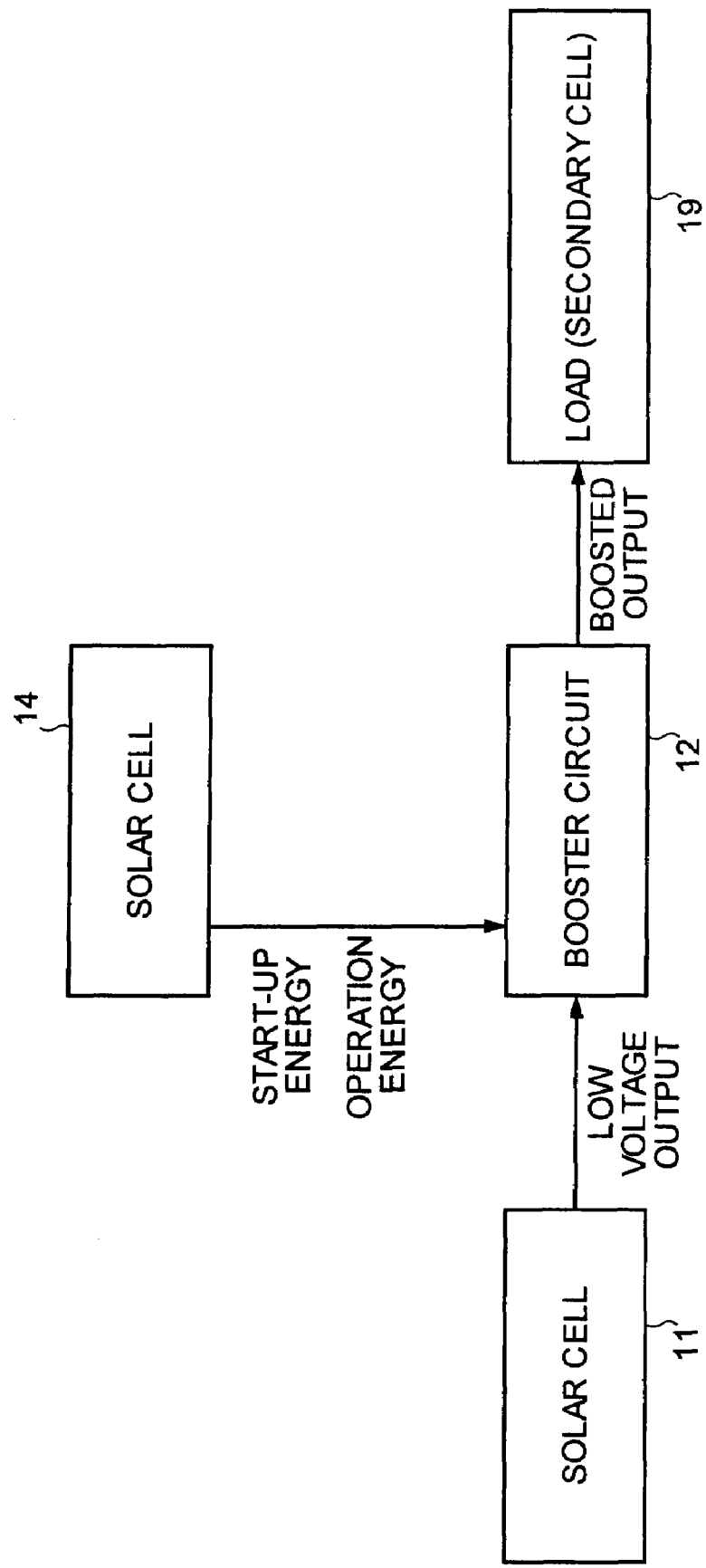
FIG. 1 is a block diagram of a configuration of a booster according to a first embodiment of the present invention.

FIG. 1 is a block diagram of a configuration of a booster according to a first embodiment of the present invention.

The booster for an output of a solar cell shown in FIG. 1 is applicable to an output of a solar cell 11, which is not a constituent element of the booster of the present invention, as a target to be boosted. The booster includes a solar cell 14 and a booster circuit 12 as a power supply unit, and supplies power to a load (secondary cell) 19.

When light falls on the solar cell 11, which is not serially connected, as a target to be boosted, electromotive force occurs. Typical widespread solar cells made of monocrystalline silicon, polycrystalline silicon, amorphous silicon, and compound semiconductors can be used as the solar cell 11. The single cells of these solar cells have an output voltage of at maximum a little higher than 0.5 V. The power generated by the solar cell 11 is boosted by the booster circuit 12 and then supplied to the load (secondary cell) 19. The load (secondary cell) 19 is any electric or electronic circuit. The booster circuit 12 does not operate at a voltage of below 0.6 V, so that the booster circuit 12 cannot be driven with only the solar cell 11. The booster circuit 12 is configured to receive a power supply from the solar cell 14, which includes serially connected single cells of an amorphous solar cell or a solar cell that can be manufactured at a cost as low as the cost of the amorphous solar cell. The area of the solar cell 14 only needs to be of a size that is large enough to generate the power required to operate the booster circuit 12. In other words, small elements of area of about 1 $cm^3$ to about 3.3 $cm^3$ can be used as the solar cell 14.

The serially connected amorphous solar cell 14 can be advantageously used as a power source for the booster circuit 12. Amorphous solar cells have a feature that they can be serially connected in the semiconductor processes and do not have the various problems that generally occur in the conventional technologies.

The booster circuit 12 that has a boost type circuit configuration is useful. A metal oxide semiconductor field effect transistor (MOSFET) that has a feature that it requires an extremely low driving power is used as a switching element in the booster circuit 12. Moreover, a multivibrator oscillator circuit with a complementary metal oxide semiconductor (CMOS) logic integrated circuit (IC) is used for a driving unit of the MOSFET. An oscillation frequency of the multivibrator is determined based on the power consumed by the oscillator circuit, and an inductance and rated current of a coil of a booster converter. The oscillation frequency of the multivibrator and the inductance and rated current of the coil of the boost converter are factors of design that are determined by the capability of the power generation of the solar cell 11, a target to be boosted, and are known technologies, so that their explanation will be omitted.

The booster circuit 12 configured from requisite minimum components consumes extremely low power and can operate at a power of 10 microwatts (μW) or less when operating at 10 kilo Hertz (kHz). A minimum voltage of start-up and operating voltages of a booster circuit that includes a CMOS logic IC 74HC14 as a multivibrator circuit is 1.2 V. When the solar cell 14 used is an amorphous solar cell that includes therein five cells of a size of 33 millimeters (mm)×10 mm serially connected, boosting operation was confirmed at a luminance of about 1,100 luxes or more.

If a large size MOSFET or a plurality of MOSFETs are used as a switching element with the object of increasing the boosting capability of the booster, the power consumed by the booster circuit 12 increases, thereby increasing a minimum luminance at which the booster circuit 12 starts up.

In this embodiment, the solar cell 11, which is the first cell, is a single-cell solar cell that is of a low-power-outputting type and can be produced without complicated production processes such as configurating a serial connection. However, a single-cell fuel cell that is a low-power-outputting type and can be configured without serial connections can be used instead. Also, when the object is to increase an output to the boosting circuit 12, parallely connected fuel cells or solar cells that can be realized without passing complicated production processes can be used.

On the other hand, the solar cell 14, which is the second cell, which plays a role of an energy source that provides start-up energy (operation energy), may be any solar cell that can supply energy. For example, a lithium storage cell may be used. The solar cell 14 may be a primary cell, which cannot be charged, such as a dry cell, or a storage element such as an ordinary capacitor or an electric double-layer capacitor.

SECOND EMBODIMENT

Figure 2:
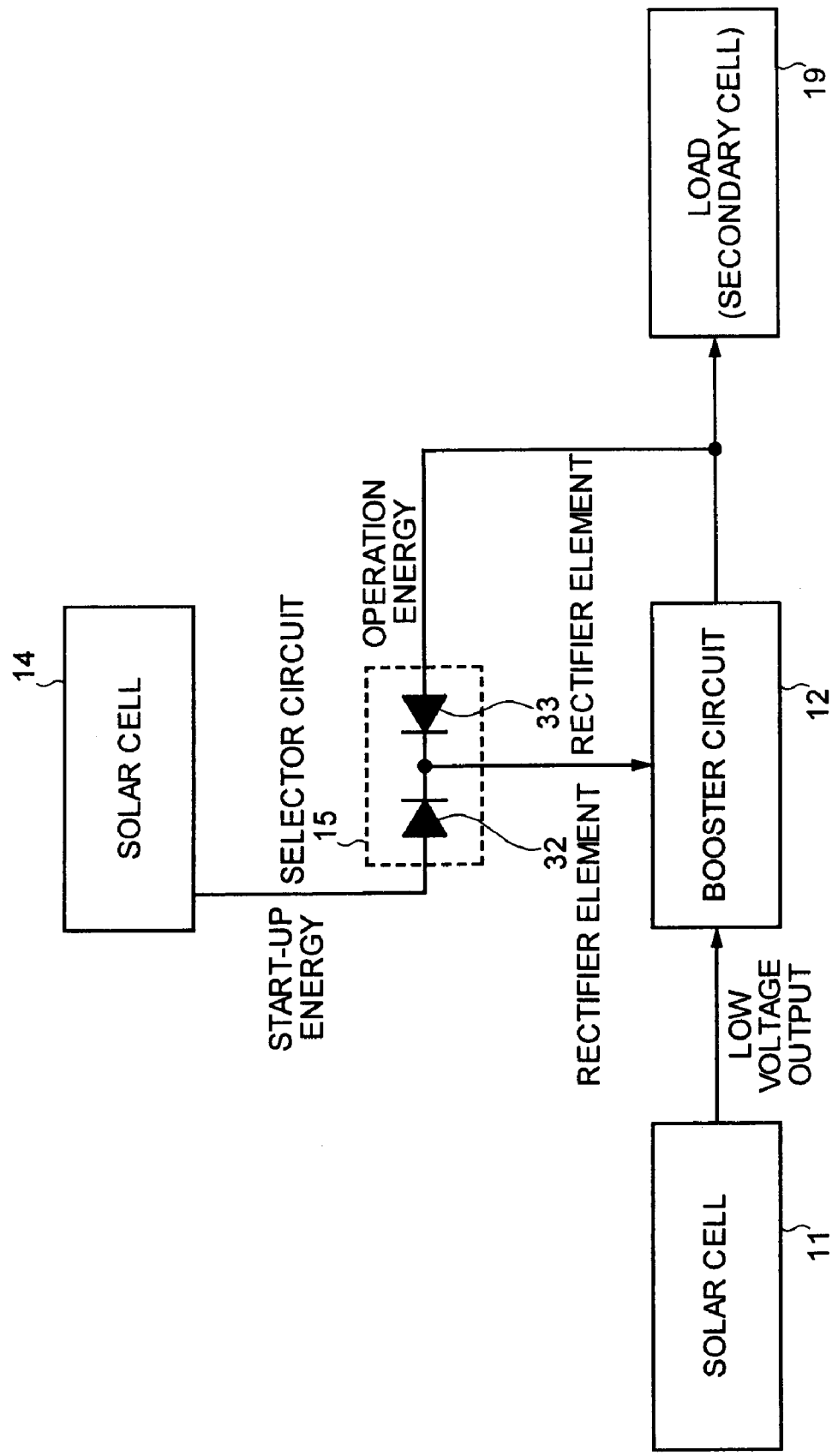
FIG. 2 is a block diagram of a configuration of a booster according to a second embodiment of the present invention.

FIG. 2 is a block diagram of a configuration of a booster according to a second embodiment of the present invention.

The booster circuit has a configuration that realizes an increase in the boosting capability of the booster circuit without causing an increase in minimum luminance for starting up the booster circuit. The configuration shown in FIG. 2 includes a selector circuit 15 in the configuration shown in FIG. 1 according to the first embodiment. The selector circuit 15 that two rectifier elements 32 and 33.

The booster circuit 12 uses a power from the solar cell 14 when starting up. Moreover, after a boosting operation is started, the booster circuit 12 uses a part of the boosted power thereby drastically increasing the boosting capability of the booster. Since the power of the solar cell 14 and a part of the boosted power is selectively supplied to the booster circuit 12, the power of the solar cell 14 is supplied only to the booster circuit 12 but not to the load (secondary cell) 19, a decrease in start-up luminance can be prevented. The booster circuit 12 starts up when it receives a supply of power from the solar cell 14, and the booster circuit 12 supplies a power from the boosted power to the booster circuit 12 through the rectifier element 33 when boosting operation has started. As a result, the boosting capability of the booster circuit 12 increases. The more the power generated by the solar cell 11 increases, the more the boosted power increases, thus increasing the power supplied to the booster circuit 12 through the rectifier element 33. As a result, the boosting capability of the booster circuit 12 is augmented to create a virtuous cycle. Note that a rectifier element that has equivalent rectifying characteristics (such as a portion between the base and emitter of a bipolar transistor) may be used instead of the rectifier elements 32 and 33. The details of the circuit configuration of the booster circuit are explained below using examples.

In the second embodiment, the solar cell 11, which is the first cell, is a single-cell solar cell that is of a low power outputting type and can be produced without complicated production processes such as configurating a serial connection. However, a single-cell fuel cell that also is of a low power outputting type and can be configured without serial connection may be used. Also, when it is desired to increase an output to the boosting circuit 12, parallely connected fuel cells or solar cells that can be realized without passing complicated production processes may be used.

The solar cell 14, which is the second cell, which plays a role of an energy source that provides start-up energy (operation energy), may be any solar cell that can supply energy. For example, a lithium storage cell may be used. In addition, the solar cell 14 may be a primary cell, which cannot be charged, such as a dry cell, or a storage element such as an ordinary capacitor or an electric double layer capacitor.

Examples of the present invention is explained with reference to the accompanying drawings.

FIRST EXAMPLE

In a first example, a booster circuit of a boost converter configuration is explained.

Figure 3:
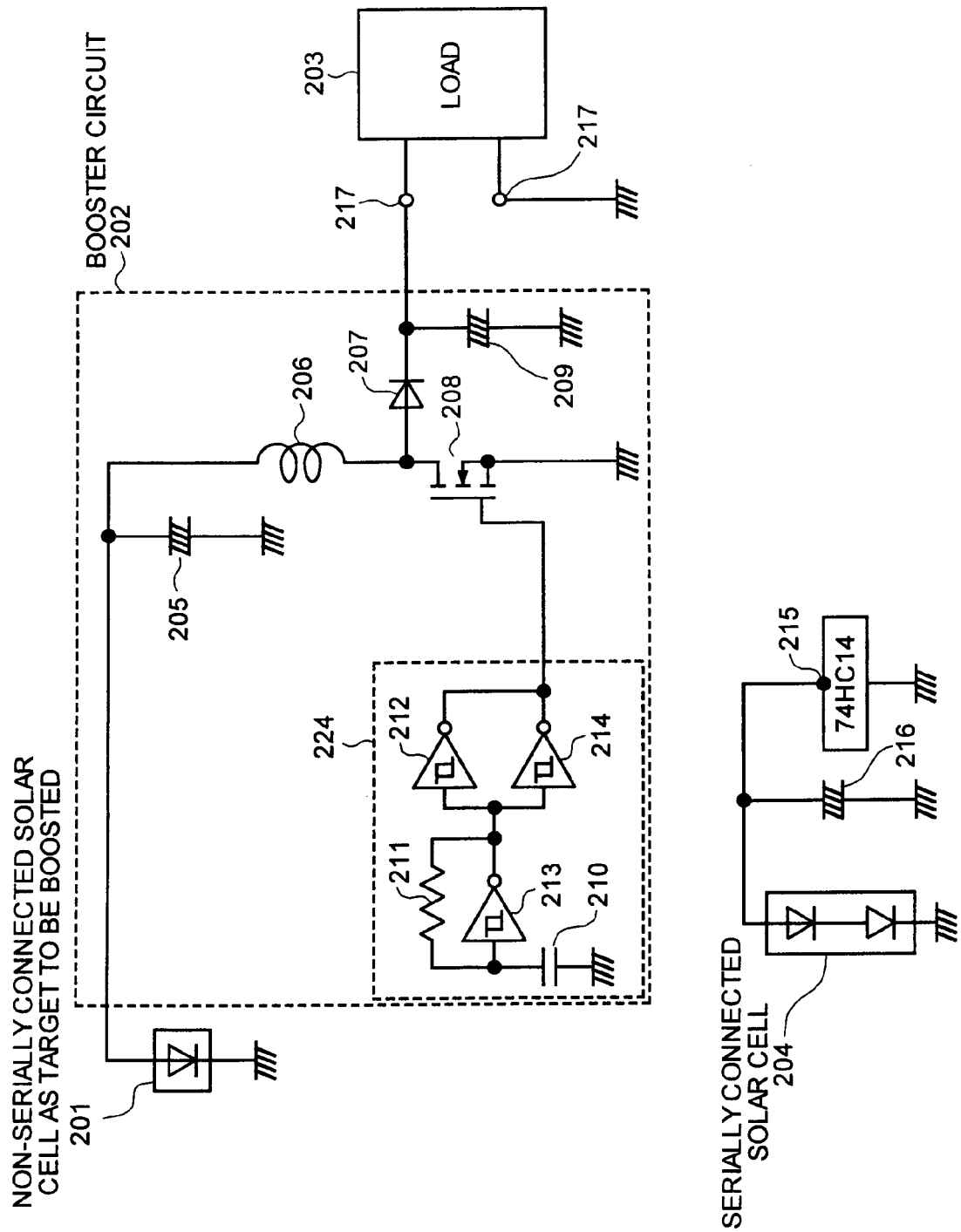
FIG. 3 is a diagram of a configuration of a booster circuit for boosting an output of a solar cell having a construction of a boost converter according to a first example of the present invention.

FIG. 3 is a diagram of a configuration of a booster circuit of a solar cell having a configuration of a boost converter according to the first example of the present invention.

A target to be boosted by a booster circuit 202 is a solar cell 201 that is not serially connected. The booster circuit 202 has an output terminal 217, to which an electronic load (Fujitsu Denso, EULαXL150) that can be controlled to a constant current and constant voltage is connected as a load 203. The solar cell 201 used is a 36-square-centimeter ($cm^2$) silicon polycrystal that generates an open end output voltage at AM1.5 of 0.56 V. The booster circuit 202 used includes a coil 206 that has a direct current resistance of 20 milliohms, a rated current of 2 amperes (A), and an inductance value of 22 microhenries. A switching element 208 used includes Si9948DY manufactured by Siliconix as a MOSFET. A diode 207 used is a Schottky barrier diode CMS06 manufactured by Toshiba Corporation. A capacitor 209 used is an electrolytic capacitor manufactured by Sanyo having an electron spin resonance (ESR) of 20 milliohms and a capacitance of 220 microfarads. An oscillator circuit 224 includes a multivibrator oscillator circuit by means of a Schmitt trigger type inverter 74HC14, which is a versatile CMOS logic gate and a driver circuit for augmenting an output current.

The multivibrator circuit includes a capacitor 210 that determines oscillation time constant, a resistor 211, and a Schmitt trigger type inverter 213. However, here, a general low power consuming type rectangular wave oscillator circuit can be used.

The driver circuit used includes Schmitt trigger type inverters 212 and 214 connected in parallel. A general low power consuming type inverter or a buffer type logic gate can also be used. The number of parallel gates may be determined depending on the current driving capability and load. Since a supply of power to a power source terminal 215 of the Schmitt trigger type inverter 74HC14 in the oscillator circuit 224 is necessary as a power source of the booster circuit 202, the serially connected solar cell 204 and a capacitor 216 are connected to the power source terminal 15. As the solar cell 204, an amorphous solar cell of a 5-cell configuration manufactured by Sanyo, having a rated output of 3.0 V and 2.2 mA, and a model number of AM1156 is used. The capacitor 216 used is an OS electrolytic capacitor of 220 microfarads manufactured by Sanyo. The solar cell 201 and the solar cell 204 are arranged close to each other on a plane.

Measurement of luminance is performed using an illuminometer 510-02 manufactured by Yokogawa Electric Corporation in such a manner that a distance from a light source and a surface of a solar cell is made equivalent to a distance from the light source and a light-receiving bulb of the illuminometer.

Experimental results indicate that boosting operation started at 1,100 luxes. Adjustment of the oscillation frequency of the oscillator circuit 224 varied a boosting start voltage and the boosting start voltage was most sensitive at an oscillation frequency of about 1 kHz to about 30 kHz. It has been demonstrated that when the output voltage of the solar cell 204 used as a driving source of the booster circuit exceeds 1.1 V, the oscillator circuit 224 starts oscillation but the switching element 208 is not driven whereas when the output voltage of the solar cell 204 exceeds 1.4 V, the boosting operation starts. When the illuminance was 1,100 luxes, the output voltage of the solar cell 204 reached 1.4 V. Although sufficient boosting operation is obtained near a window or under sunlight and a voltage of 20 V or more is obtained at the output terminal 217, the solar cell 204 provides an output voltage of about 1.9 V but does not reach rated voltage of 3.0 V. Therefore, augmentation of the supply of energy to the booster circuit after the start-up of the booster circuit was performed.

Note that the 74HC14 is a standard package that includes six inverter logics and power source supply terminals to the logics all together. The oscillator circuit 224 is configured by using the three inverter logics 21, 213, and 214 of 74HC14 and the resistor 211 and the capacitor 210.

SECOND EXAMPLE

In a second example, a booster circuit of a boost converter configuration that is different from the booster circuit in the first example is explained.

Figure 4:
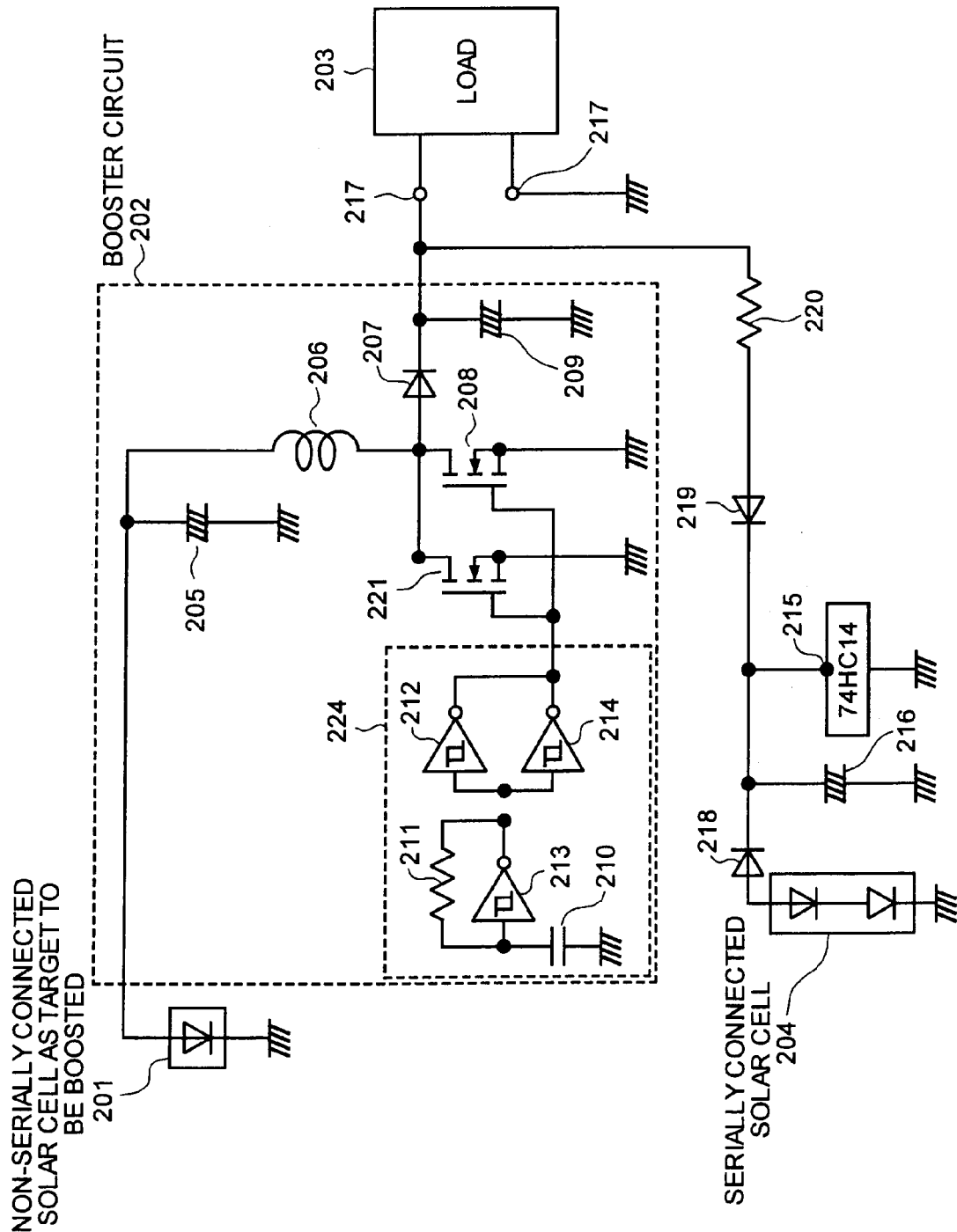
FIG. 4 is a diagram of a configuration of a booster circuit for boosting an output of a solar cell having a construction of a boost converter according to a second example of the present invention.

FIG. 4 is a diagram of a configuration of a booster circuit of a solar cell having a configuration of a boost converter according to the second example of the present invention.

The output from the solar cell 204 and the boosted output from the booster circuit are applied to the power source terminal 215 of the Schmitt trigger type inverter 74HC14 through an OR circuit formed by a Schottky diode 218 and a Schottky diode 219.

The output of the solar cell 204 is supplied to the booster circuit 202 only but not to the load 203 because of the diode 219, so that the start-up illuminance is not deteriorated as compared with that of the first example.

In experiments, irradiation of light at 1,200 luxes or more caused the booster circuit to start, and a boosted output was obtained from the solar cell 201. The boosted output is supplied to the load 203. At the same time, a part of the output is supplied to the booster circuit 202 through a current limiting resistor 220 and the diode 219. That is, the boosted output is supplied to the power source terminal 215 of the Schmitt trigger type inverter 74HC14 that constitutes the oscillator circuit. When the supply of the energy from the boosted output to the booster circuit 202 is started, the voltage of the power source terminal 215 of 74HC14 increases to stabilize the operation of the oscillator circuit 224 and start driving the switching element 208 and a switching element 221 with sufficient driving capability, so that ON resistances of the switching elements 208 and 221 can be decreased. In the experiments where Si9948DY was used for the switching elements 208 and 221, a combined value of ON-resistances obtained was 10 milliohms.

This means that when the coil 206 has a direct current of 20 milliohms, the direct current resistance of the booster circuit reaches about 30 milliohms, so that a generated current of at most 10 A can be introduced from the solar cell 201 into the booster circuit 202 when the solar cell 201 provides a power generation voltage of 0.3 V.

In the booster circuit of this example, once the booster circuit 202 is started, a part of the boosted output is supplied to the booster circuit 202, so that the solar cell 204 used for the start-up is no longer necessary.

Since irradiation of light of about 5,000 luxes produces a boosted power of above 7V, an electric load EULαX150 manufactured by Fujitsu Denso was connected to the load 203 and a constant operation was set.

Table 1 below shows one example of results obtained when an output voltage Vin of the solar cell 201 not serially connected, target to be boosted, was varied at various luminances.

TABLE 1

| Vin (V) | Iin (mA) | Win (mW) | Vout (V) | Iout (mA) | Wout (mW) | Efficiency (%) |
| --- | --- | --- | --- | --- | --- | --- |
| 0.50 | 330 | 165 | 5.002 | 27 | 135 | 81.9 |
| 0.40 | 280 | 112 | 5.002 | 19.1 | 95.5 | 85.0 |
| 0.30 | 210 | 63 | 5.002 | 9.7 | 48.5 | 77.0 |
| 0.20 | 150 | 30 | 5.002 | 4.7 | 23.5 | 78.4 |
| 0.10 | 110 | 11 | 5.002 | 1.9 | 9.5 | 86.4 |

In the experiments, the electric load used as the load 203 was set at 5.00 V for a constant voltage operation. A boosted output was calculated from an output voltage and an output current at the output terminal 217 of the booster circuit that were measured. The results indicated that even when the output voltage of the solar cell 201 was 0.1 V, a boosted output was obtained and a high conversion efficiency on the order of 80% was obtained. The rectangular wave oscillator circuit including a multivibrator used in the experiments was not configured so as to vary the duty ratio, so that for example, when the output voltage Vin of the solar cell 201 was 0.5 V, the supply current Iin from the solar cell 201 was 330 milliamperes (mA). However, the duty ratio can be controlled. Experiments using a separate rectangular wave oscillator circuit indicated that an increased duty ratio enabled the booster circuit 202 to incorporate the output current Iin from the solar cell 201 even when the output current Iin exceeds 1,500 mA. The 74HC14 is a standard package that includes six inverter logics and power source supply terminals to the logics all together. The oscillator circuit includes the three inverter logics 212, 213, and 214, the resistor 211, and the capacitor 210.

THIRD EMBODIMENT

Figure 5:
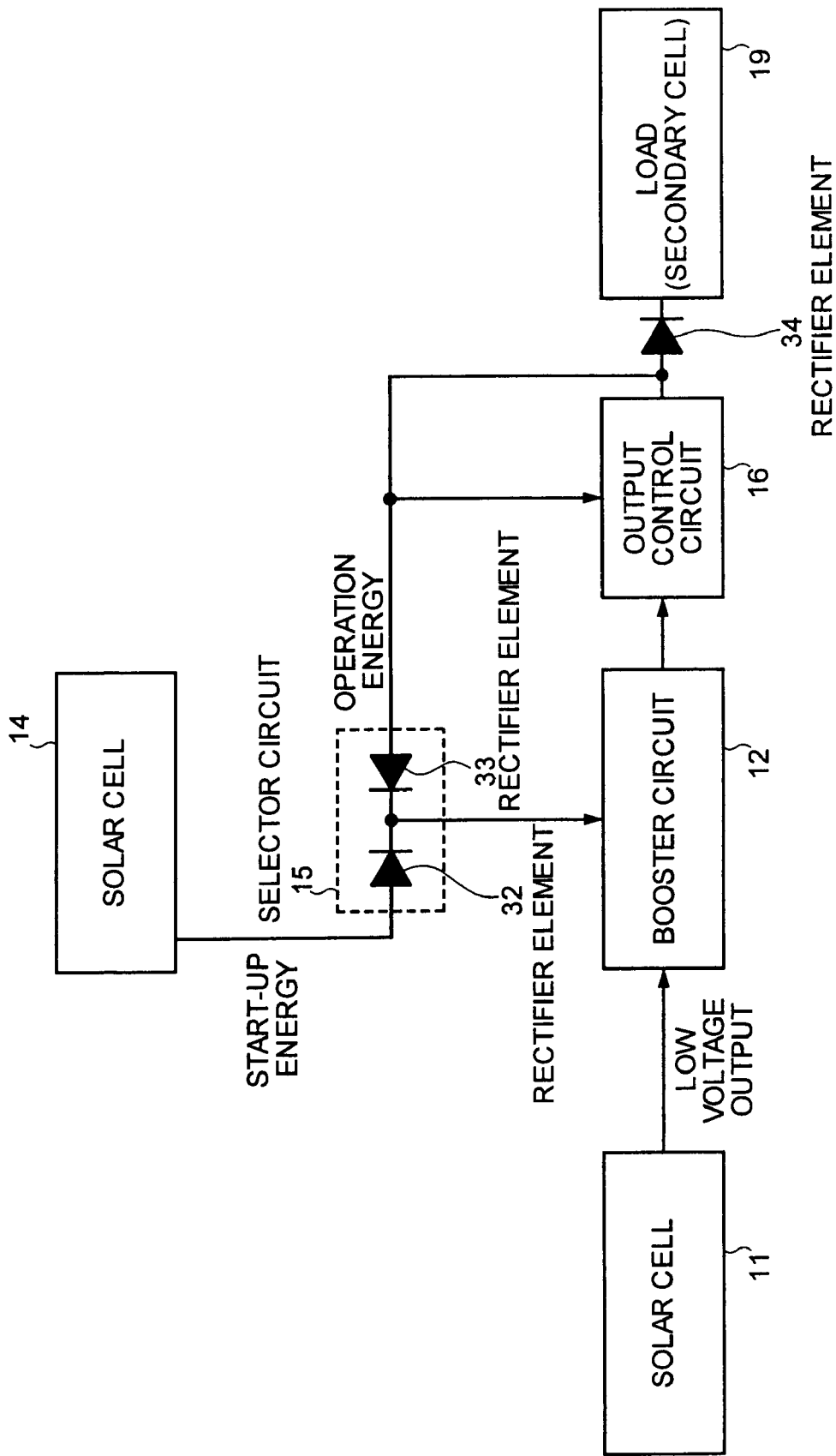
FIG. 5 is a block diagram of a configuration of a booster according to a third embodiment of the present invention.

FIG. 5 is a block diagram of a configuration of a booster according to a third embodiment of the present invention.

The configuration of a booster for an output from a solar cell with an output controller circuit corresponds to the configuration of the booster shown in FIG. 2 according to the second embodiment which includes an output controller circuit 16.

The electric power generated by the solar cell 11, a target to be boosted, is boosted by the booster circuit 12 and subjected to output control for a constant voltage or constant current or for charging, and then supplied to an electric or electronic circuit or the load (secondary cell) 19, which is a secondary cell through a rectifier element 34. A part of the boosted power is supplied to the output controller circuit 16 and the booster circuit 12. The power of the solar cell 14 for starting up the booster circuit 12 is supplied to the booster circuit only by the action of the rectifier element 33, so that a decrease in the start-up luminance can be prevented. Since current does not flow back in the direction of the load (secondary cell) 19 to the output controller circuit 16 because of the rectifier element 34, unnecessary discharge of the secondary cell can be prevented when a secondary cell is used as the load (secondary cell) 19. When the load (secondary cell) 19 is not a secondary cell, the rectifier element 34 may be omitted. The output controller circuit 16 to be used may be either a 3-terminal series regulator or a simple configuration in which a constant voltage diode is used. The details of the circuit configuration of the booster circuit are explained in examples hereinbelow.

In this embodiment, the solar cell 11, which is the first cell, is a single-cell solar cell that is of a low power outputting type and can be produced without complicated production processes such as configurating a serial connection. However, a single-cell fuel cell that also is of a low power outputting type and can be configured without serial connection may be used. Also, when it is desired to increase an output to the boosting circuit 12, parallelly connected fuel cells or solar cells that can be realized without passing complicated production processes may be used.

The solar cell 14, which is the second cell, which plays a role of an energy source that provides start-up energy (operation energy), may be any solar cell that can supply energy. For example, a lithium storage cell may be used. In addition, the solar cell 14 may be a primary cell, which cannot be charged, such as a dry cell, or a storage element such as an ordinary capacitor or an electric double layer capacitor.

FOURTH EMBODIMENT

Figure 6:
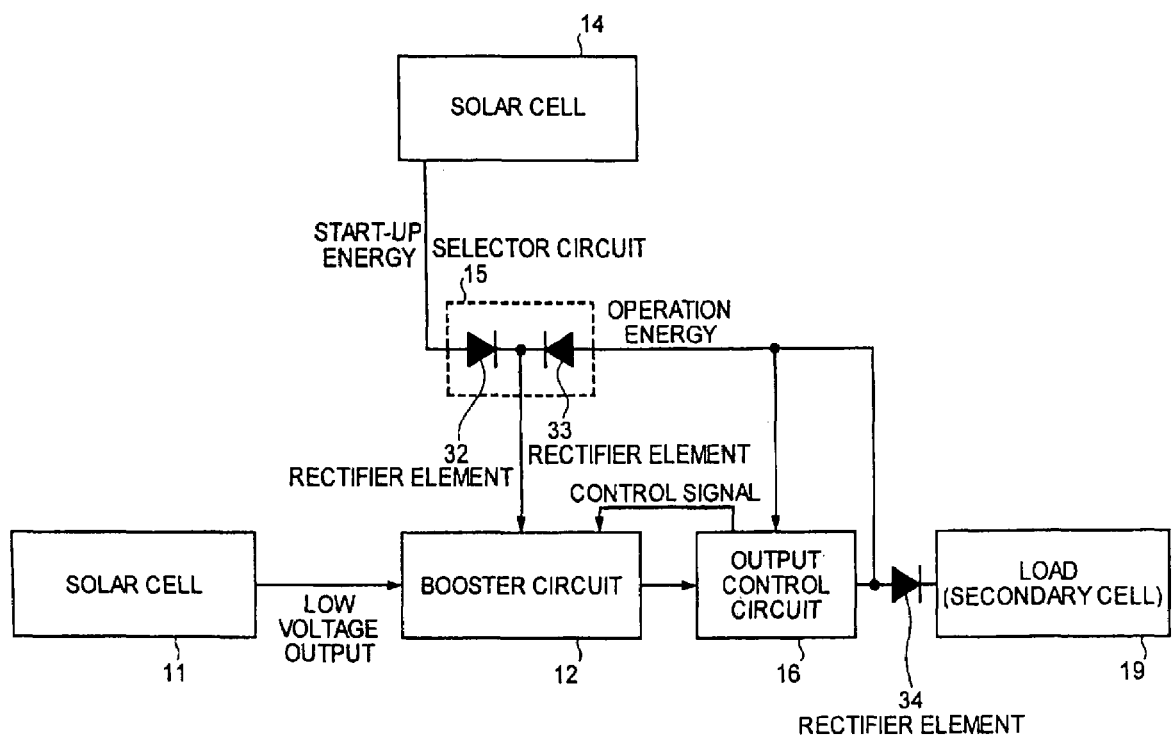
FIG. 6 is a block diagram of a configuration of a booster according to a fourth embodiment of the present invention.

FIG. 6 is a block diagram of a configuration of a booster according to a fourth embodiment of the present invention. The booster has a configuration of a booster for an output from a solar cell, aimed at making the boosting capability of the booster variable. Also, FIG. 6 is intended to explain the configuration of the booster circuit shown in FIG. 5 according to the third embodiment in which a control signal is sent from the output controller circuit 16 to the booster circuit 12 to make the boosting capability of the booster variable, thereby achieving control of the target.

The booster for an output of a solar cell shown in FIG. 6 starts up when receiving a power from the solar cell 14 at the time of start-up of the booster circuit 12. Since in this point in time, neither a boosted output is generated nor the boosted output reaches a minimum operation voltage of the controller circuit 16, there exists no control signal from the output controller circuit 16 or the output controller circuit 16 operates unstably. For this reason, the booster circuit that has started up in an undesirable signal state stops, so that there is a fear that normal operation will not be performed. To solve this problem, it is necessary that a circuit configuration having the following characteristics be adopted.

(1) At the time of start-up, no unstable control output must be provided from the output controller circuit 16 to the booster circuit 12.

(2) At the time of start-up, a control signal output terminal of the output controller circuit 16 must be at a high impedance.

To prevent the output controller circuit 16 from outputting unstable control signals, it is effective that a current driving element such as a bipolar transistor be used in a control signal outputting stage. The current driving element needs current for turning the element ON, and when starting up the booster circuit, the output controller circuit does not have sufficient capability for driving the current driving element. Setting the output terminal at a high impedance allows current to flow from the booster circuit 12 to the output controller circuit 16, so that deterioration of the start-up characteristics of the booster circuit can be prevented. Therefore, it is effective that a configuration of an open drain or an open collector by using parallelly connected resistors between the gate and source to form a current driving type be used in the control signal output stage of the output controller circuit 16. The details of the circuit configuration of the booster are explained in the examples hereinbelow.

The solar cell 11, which is the first cell, is a single-cell solar cell that is of a low power outputting type and can be produced without complicated production processes such as configurating a serial connection. However, a single-cell fuel cell that also is of a low power outputting type and can be configured without serial connection may be used. Also, when it is desired to increase an output to the boosting circuit 12, parallelly connected fuel cells or solar cells that can be realized without passing complicated production processes may be used.

The solar cell 14, which is the second cell, which plays a role of an energy source that provides start-up energy (operation energy), may be any solar cell that can supply energy. For example, a lithium storage cell may be used. The solar cell 14 may be a primary cell, which cannot be charged, such as a dry cell, or a storage element such as an ordinary capacitor or an electric double layer capacitor.

THIRD EXAMPLE

In a third example, a booster circuit of a boost converter configuration that has an output-controlling function is explained.

Figure 7:
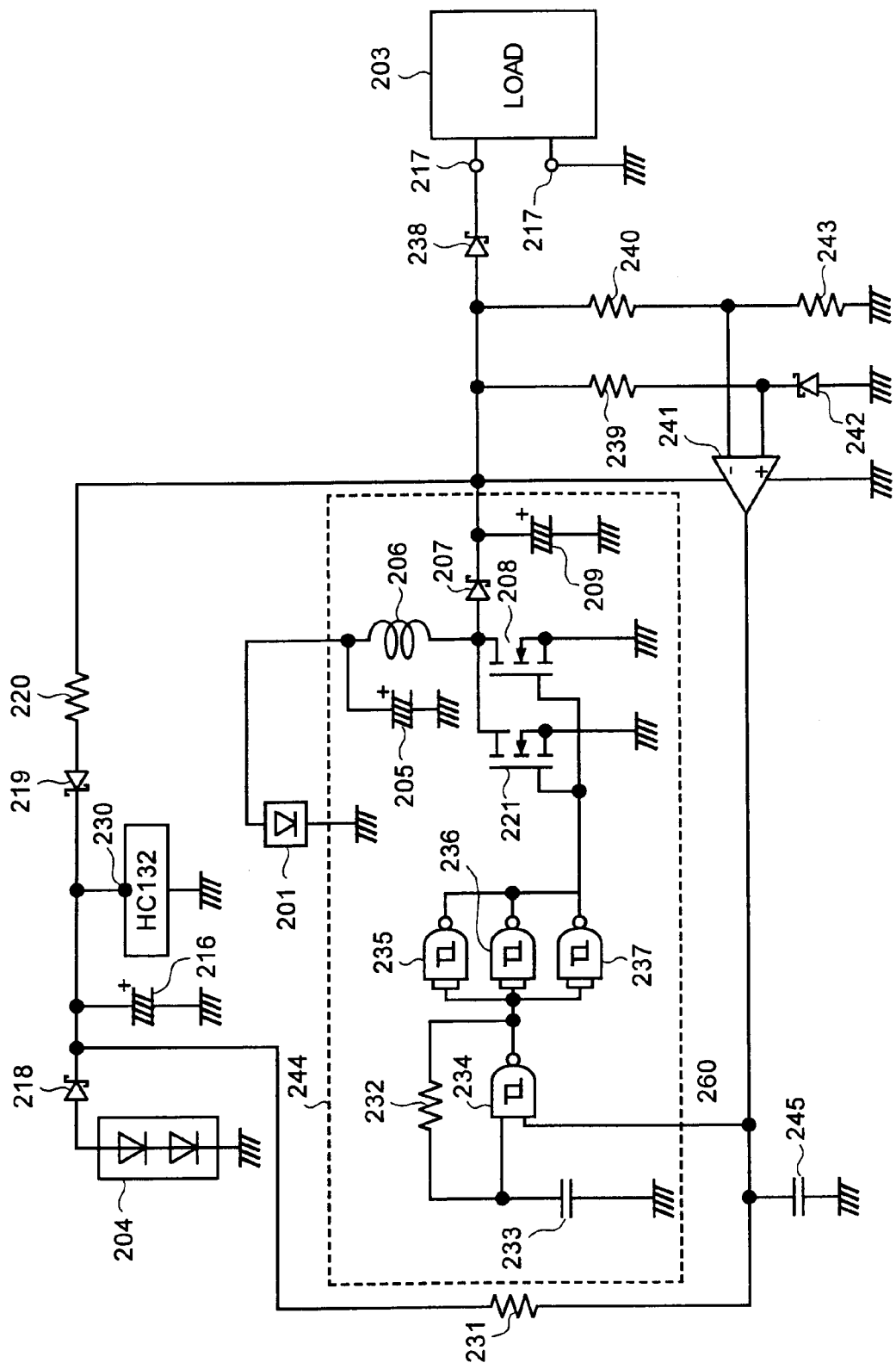
FIG. 7 is a diagram of a configuration of a booster circuit for boosting an output of a solar cell according to a third example of the present invention.

FIG. 7 is a diagram of a configuration of a booster circuit for an output of a solar cell according to the third example of the present invention.

A rectangular wave oscillator circuit in a booster circuit 244 includes a multivibrator oscillator circuit by means of a Schmitt trigger type two-input inverter NAND (74HC132), which is a versatile CMOS logic gate, and a driver circuit for augmenting an output current. The multivibrator circuit includes a capacitor 233 that determines an oscillation time constant, a resistor 232, and a Schmitt trigger type two-input NAND gate 234. A low power consumption type rectangular wave oscillator circuit that can be controlled of an oscillation state from outside the oscillator circuit may be used. The driver circuit used includes Schmitt trigger type two-input NANDs 235 and 236, and 237 connected in parallel. Here, a logic gate of a general low power consuming type inverter having an excellent capability of driving current can be advantageously used. The number of parallel gates may be determined depending on the load. Since a supply of power to a power source terminal 230 of the Schmitt trigger type two-input NAND 74HC132 in the oscillator circuit 224 is necessary as a power source of the booster circuit 244, the serially connected solar cell 204 is connected to the power source terminal 230 through the diode 218. As the solar cell 204, an amorphous solar cell of a 5-cell configuration manufactured by Sanyo, having a rated output of 3.0 V and 2.2 mA, and a model number of AM1156 is used. The capacitor 216 used is a low ESR type electrolytic capacitor of 220 microfarads manufactured by Sanyo. In the same manner as that in the Example 2, the output of power generation of the solar cell 204 and the boosted output from the booster circuit 244 are connected to the power source terminal 230 in a configuration of OR by means of the diodes 218 and 219.

With this configuration, the output of power generation by the solar cell 204 can be supplied to the power source terminal 230 only and a part of the boosted output can be supplied to the power source terminal 230 without flowing back from the boosted output to the solar cell 204. When a part of the boosted output is output to the power source terminal 230, insertion of the current limiting resistor 220 can prevent a supply of excessive power to the power source terminal 230, thereby increasing the conversion efficiency of the booster circuit.

The diodes 218, 219, 207, and 238 are advantageously Schottky barrier diodes that have characteristics of low potential drops in the forward direction. In this example, CMS06 manufactured by Toshiba Corporation is used.

Now, the output controller circuit is explained.

The third example is an example of a circuit configuration for making a boosted output at a constant voltage when an output from a non-serially connected solar cell is boosted by the booster circuit 244. It is not essential for this booster circuit whether the boosted output is controlled to a constant voltage or a constant current and any known output-controlling technologies can be used. What is needed is where to obtain a power that is required by the output controller circuit and how to interface control signals. The output voltage of the solar cell 201 as a target to be boosted is about 0.4 V, at most a little higher than 0.5 V. It is impossible to drive a comparator or a standard voltage source that constitute a general output controller circuit at such a low voltage. The solar cell 204, another energy source, is to provide energy necessary for the start-up operation of the booster circuit 244 and it is assumed that a small area solar cell is utilized.

Diverting energy from the solar cell 204 could cause a decrease in output voltage of the solar cell 204, resulting in a considerable decrease in the characteristics of low luminance operation of the booster circuit of the present invention or a failure of starting up of the booster circuit 244. The output controller circuit needs to function only when the booster circuit 244 generates a boosted output. Therefore, known output-controlling units can be used without deteriorating the characteristics of low luminance operation of the booster circuit of the present invention by connecting the output controller circuit in such a manner that a voltage is obtained from the boosted output of the non-serially connected solar cell 201 as shown in FIG. 7.

Then, an interfacing method of control signals is explained. Output controls such as a constant voltage control and a constant current control can be realized by affecting the boosting operation of the booster circuit 244 to control the boosting capability thereof. When the output control unit operates by obtaining a power from the boosted output from the booster circuit 244, the output control unit cannot operate until a boosted output is obtained from the booster circuit 244. When the oscillator circuit in the booster circuit receives an oscillation permission signal that is not 0 (zero) volt to oscillate and controls the boosting operation, the following problems arise.

The booster circuit 244 starts oscillation and performs boosting operation when an oscillation control terminal 260 receives an oscillation permission signal that corresponds to a high level of a logic. When the booster circuit 244 starts up, a boosted output is not generated yet, so that no oscillation permission signals are obtained from the output-controlling unit, resulting in that the oscillator circuit cannot oscillate. Accordingly, the oscillation control terminal 260 is connected to the power source terminal 230 through an integrator circuit that includes a resistor 231 and a capacitor 245, as shown in FIG. 7. To increase an impedance of the output terminal of the output controller circuit at a time other than outputting an oscillation permission signal, the output terminal of control signals is designed to be of an open drain configuration or an open collector configuration. In this circuit configuration, the voltage of the oscillation control terminal 260 at the time of start-up is substantially equal to the power source voltage of the power source terminal 230, so that the booster circuit has characteristics that logic high can be stably obtained.

There are no power consuming factors that deteriorate the low luminance characteristics of the booster circuit of the present invention. As an output-controlling method for a booster for an output from a solar cell that is not serially connected to solve the problems, an example of a constant voltage output control is shown in the third example, and a constant voltage control operation is explained.

The constant voltage controller circuit includes a comparator 241 of an open drain output configuration, a standard voltage source 242, a bias resistor 239, and output voltage resistors 240 and 243 for setting an output voltage value, and the components are connected to each other as shown in FIG. 7. The comparator 241, which may be of an open drain output configuration or an open collector configuration, or of a configuration other than these, can be connected to the oscillation control terminal 260 at the comparator output terminal through an N-type MOSFET or NPN-type bipolar transistor.

Then, the operation of the booster is explained.

When the booster is started up by irradiation of sunlight, no boosted output is obtained, so that the N-type MOSFET or NPN transistor in the output stage of the comparator 241 is in a state of OFF, the voltage of the oscillation control terminal 260 increases, and the multivibrator in the booster circuit starts oscillation to provide a boosted output. When divided voltages of the boosted voltage by 0-division resistors 240 and 243 are higher than the voltage of the standard voltage source 242, the output of the comparator draws current, so that the oscillator control terminal 260 is at a logic low, resulting in that the oscillation stops and the boosting operation stops. When the output voltage is equal to or lower than values set by the divided resistors 240 and 243, the open drain output circuit of the comparator turns OFF, the voltage of the oscillation control terminal 260 increases through an integrator circuit and the logic becomes a high level and then the booster circuit 244 starts again oscillation to perform boosting operation to control the output voltage to a constant level.

In the experiments, the solar cell 201 and the solar cell 204 were arranged close to each other on a plane. Measurement of luminance is performed using an illuminometer 510-02 manufactured by Yokogawa Electric Corporation in such a manner that a distance from a light source and a surface of a solar cell is made equivalent to a distance from the light source and a light-receiving bulb of the illuminometer. Results of experiments indicated that boosting operation started at 800 luxes. Adjustment of the oscillation frequency of the oscillator circuit varied a boosting start voltage and the boosting start voltage was most sensitive at an oscillation frequency of about 1 kHz to about 30 kHz. It has been demonstrated that when the output voltage of the solar cell 204 used as a driving source of the booster circuit exceeds 0.95 V, the oscillator circuit 224 started oscillation but the switching element 208 is not driven whereas when the illuminance was 1,100 luxes, the output voltage of the solar cell 204 was 1.4 V. Near a window or under sunlight, a sufficient boosting operation is obtained and the output voltage set by the divided resistors 240 and 243 was obtained from the output terminal 217.

FOURTH EXAMPLE

In a fourth example, a booster circuit of a boost converter configuration having an output control function is explained.

Figure 8:
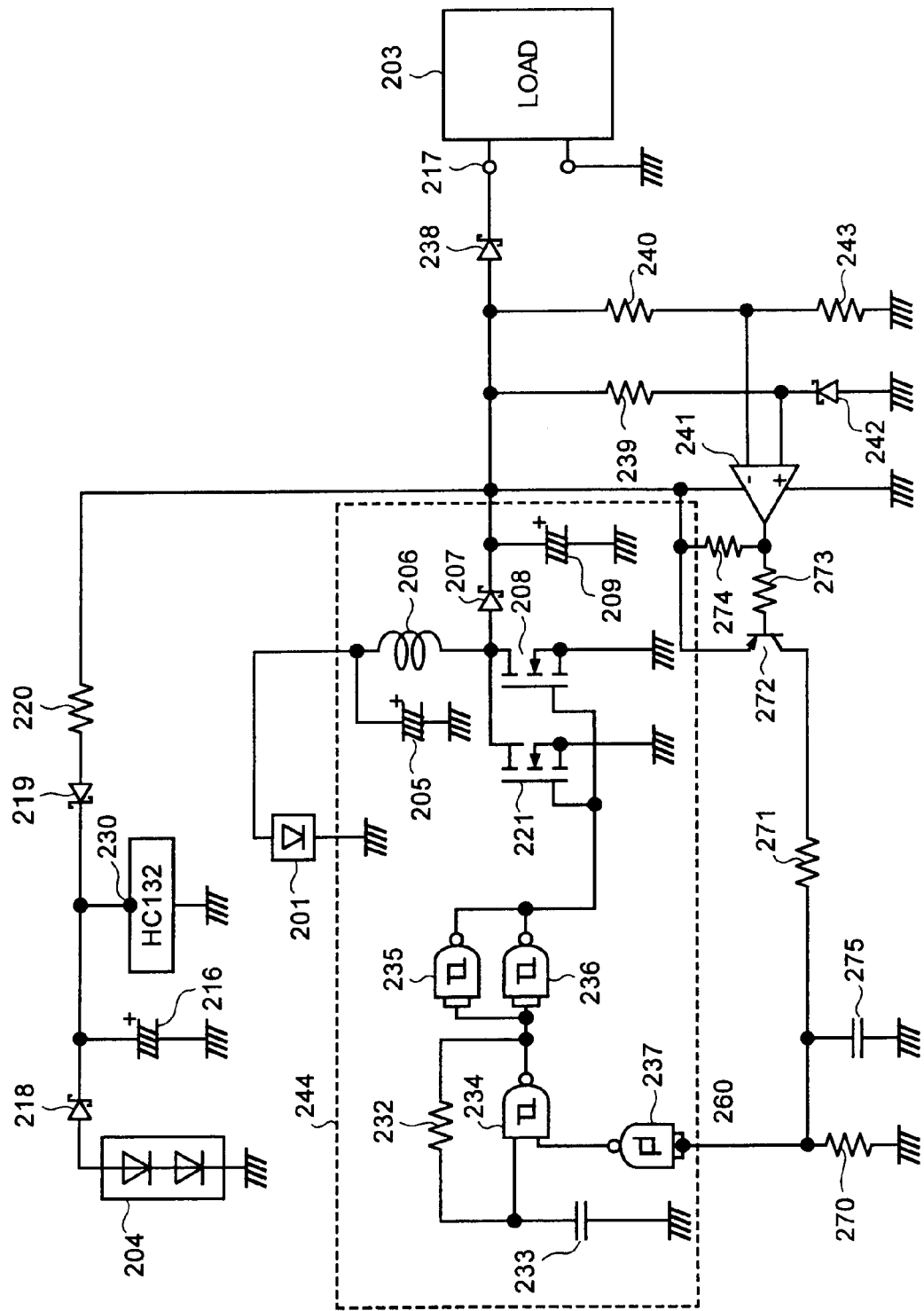
FIG. 8 is a diagram of a configuration of a booster circuit for boosting an output of a solar cell that has a construction of a boost converter with an output control function and that is not serially connected according to a fourth example of the present invention.

FIG. 8 is a diagram of a configuration of a booster circuit for an output of a solar cell that has a configuration of a boost converter with an output control function and is not serially connected according to the fourth example of the present invention.

In the fourth example, similarly to the circuit configuration of the third example shown in FIG. 7, the boosting capability of the booster circuit 244 is controlled through the oscillation control terminal 260 of the booster circuit 244 with the control output of the output controller circuit to realize a constant voltage output operation. A difference between this example and the third example is that when the oscillation control terminal 260 of the booster circuit 244 is at a logic low, the oscillator circuit operates to operate the booster circuit, thus making unnecessary a bias circuit from the power source terminal 230 that is necessary in the third example. Since the operation of the oscillator circuit stops when the oscillation control terminal 260 is at a logic high, a PNP transistor 272 or a P-type MOSFET level shifter circuit is arranged downstream of the output of the comparator. Resistors 273 and 274 are bias resistors of the PNP transistor 272.

A resistor 270 is a pull-down resistor of the oscillation control terminal 260 and a resistor 271 is to prevent excess current from the PNP transistor 272 and to prevent latch up by application of an excess voltage to the oscillation control terminal. A capacitor 275 is to increase the anti-noise characteristics of the oscillator circuit control terminal.

Operation of the booster having this configuration is explained below.

When light is irradiated to solar cells and an output voltage is generated by the solar cell 204, the voltage of the power source terminal 230 increases and the Schmitt trigger type two-input NAND logic gate 74HC132 comes to be in an active state. Since there is no boosted output, the oscillation control terminal 260 is at a logic low due to the pull-down resistor 270, so that the oscillator circuit starts oscillation and the booster circuit starts up to generate a boosted output. A voltage obtained by dividing the boosted output voltage by the divided resistors 240 and 243 and the voltage of the standard voltage source 242 are compared by the comparator 241. The comparator 241 connects the positive and negative input terminals of the PNP transistor 272 in a subsequent stage to each other in such a manner that when the boosted output voltage is higher than the voltage of the standard voltage source 242, the PNP transistor 272 turns ON. When the transistor turns ON, current flows from the boosted output to the pull-down resistor 270, which brings the oscillation control terminal at a logic high, resulting in that the oscillation operation stops and the boosting operation stops.

When the output voltage is equal to or below the set voltage, the output of the comparator turns OFF and the PNP transistor 272 turns OFF, so that the oscillation control terminal 260 is at a logic low. As a result, the oscillator circuit operates and the boosting operation starts again, so that the output voltage is controlled to a constant voltage.

The present invention should not be considered to be limited by the examples, and various modifications and applications may be made within the scope of the appended claims.

With the booster of the present invention, even when the output voltage is 0.15 V or less, no problems occur and a boosted voltage can be obtained at a high efficiency. Therefore, there is no need for connecting a number of single cells in series, so that the problem encountered in the conventional serially connected solar cells that when some tens percents of single-cell solar cells that constitute a solar cell module is under a shade, the same effect as that obtained when some tens percents of the entire module is under a shade is obtained, resulting a considerable decrease in output, can be solved.

Conventionally, to prepare a serially connected solar cell module, a countermeasure of insulating wiring that connects a surface of a solar cell to a back surface of an adjacent solar cell and a portion between cells is necessary. To increase the module packing ratio, a technique to reduce a space for wiring and a space for intercellular insulation in each solar cell and to arrange cells with high precision, so that solar cells are at high cost. In contrast, by applying the present invention, serial connection becomes unnecessary, so that the cost of solar cell modules decreases.

Conventionally, the shape of a cell is tetrangular and it has been difficult to apply a design. However, according to the present invention, solar cells having various shapes can be used in a parallel connection so that the solar cell modules are free of restrictions on their shape since the solar cells as a power generation target do not have to be serially connected.

FIFTH EMBODIMENT

Figure 9:
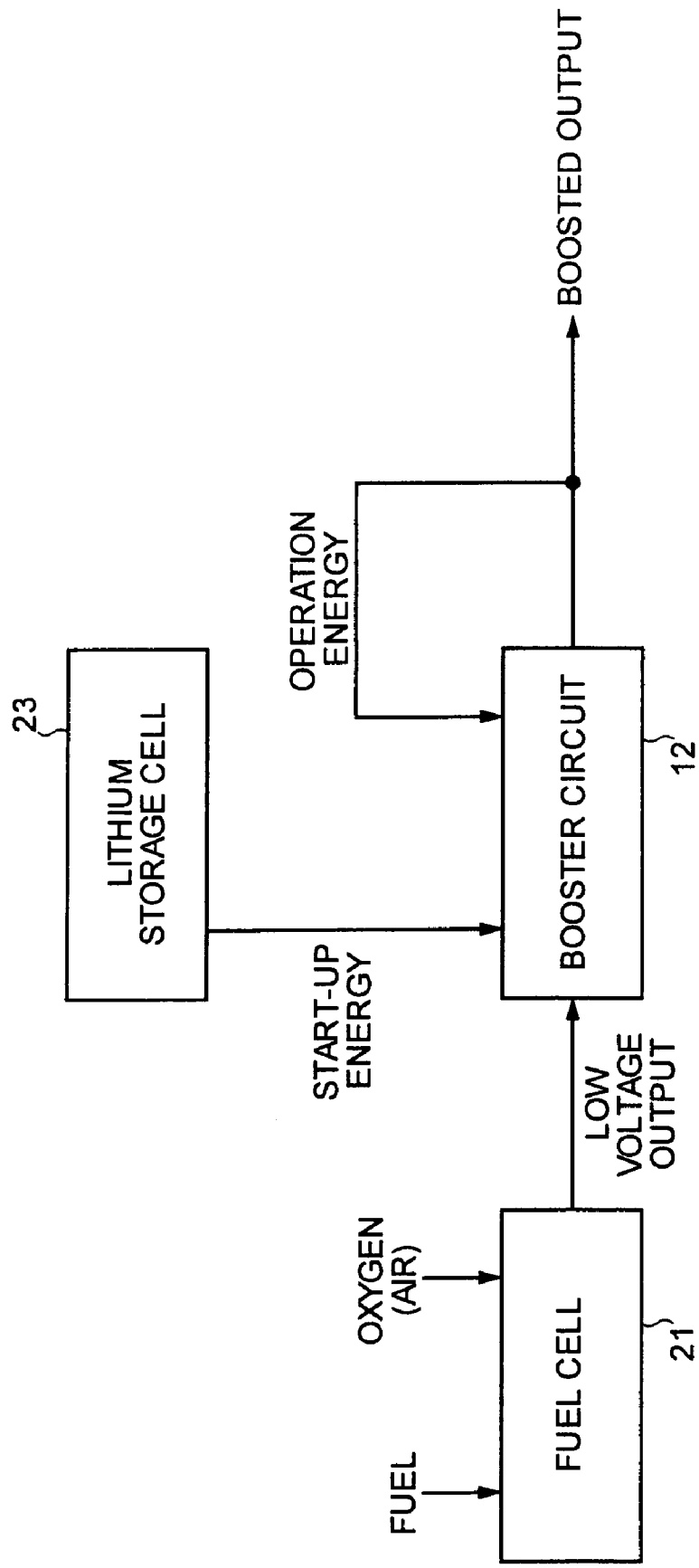
FIG. 9 is a block diagram of a configuration of a booster according to a fifth embodiment of the present invention.

FIG. 9 is a block diagram of a configuration of a booster according to a fifth embodiment of the present invention. The booster includes the booster circuit 12 that boosts a low voltage output from a single-cell fuel cell 21 (i.e., the first cell) outputting a low voltage of about 0.6 V to about 0.7 V (without loads) as a target to be boosted to a predetermined voltage (for example, a voltage at which the load can operate) and a lithium storage cell 23 (i.e., the second cell) that serves as a power supply unit for providing start-up energy to the booster circuit 12. The fuel cell 21 merely supplies a low voltage output, a target to be boosted, to the booster circuit 12, and is not an essential constituent element of the booster of the present invention.

The fuel cell 21 is a single-cell fuel cell of a low voltage outputting type that can be produced without passing complicated production processes such as configuring serial connection. The lithium storage cell 23 is a rechargeable secondary cell and plays a role of an energy source that provides start-up energy. The booster circuit 12 is configured by a circuit of, for example, a boost converter type, which is easy to design a circuit configuration. By performing ON/OFF control of the switching elements provided in the booster circuit, boosting of a voltage that is stored in a storage element such as a capacitor can be performed. It is preferable to use a CMOS type circuit as an oscillator circuit for performing ON/OFF control of the switching elements.

Referring to FIG. 9, the operation of the booster of the present invention is explained. A chemical reaction is performed between a fuel and oxygen (air) sent in the fuel cell 21 and the chemical reaction generates electric energy. The generated output is generally at a low voltage, for example, an output voltage of 0.6 V to 0.7 V without loads (i.e., when no load is connected) and at most about 0.3 V when a rated output is generated. Therefore, the output from the fuel cell 21 cannot directly drive mobile devices such as note-type personal computers and mobile phones.

The low voltage output from the fuel cell 21 is input into the booster circuit 12. In the booster circuit 12, boosted electric energy is stored in a storage element such as a capacitor (not shown). To operate the booster circuit 12, a predetermined level of start-up energy is required. The lithium storage cell 23 supplies start-up energy to the booster circuit 12. The booster circuit 12 requires some amounts of energy at the time of start-up but the booster circuit 12 can continue the operation with a lower amount of energy than the energy given at the time of start-up once the booster circuit 12 has started up.

For example, the boost converter type booster circuit requires an input voltage of about 1.4 V at the time of start-up. However, after the start-up, the operation of the booster circuit 12 itself can be continued even with a low input voltage of about 0.1 V. Therefore, in the booster according to this embodiment, start-up energy is output from the lithium storage cell 23 to the booster circuit 12 only at the time of the start-up. After the start-up, the output of the booster circuit 12 itself is fed back to the booster circuit 12 as operation energy, so that the operation of the booster circuit 12 itself can be continued to obtain a predetermined boosted output.

The output of the booster circuit 12, i.e., boosted output, can be set to any predetermined voltage depending on the operation voltage of the mobile device to which the booster circuit 12 is connected, so that a boosted output for operating mobile devices can be obtained by utilizing the energy of the fuel cell 21 from which only a low voltage output can be obtained.

As explained above, with the booster according to this embodiment, a low voltage output, target to be boosted, from the first cell and start-up energy from the second cell are input to the booster circuit while operation energy necessary for continuing the operation of the booster circuit itself is fed back to the booster circuit by the booster circuit itself, so that a predetermined boosted output can be obtained. As a result, a boosted output for operating, for example, a mobile device can be obtained by utilizing the energy of the first cell from which only a low voltage output is available and an increase in production cost because of using a special cell can be prevented, so that a booster that enables one to reduce cost by utilization of a versatile cell can be provided.

In this embodiment, the fuel cell 21, which is the first cell, is a single-cell fuel cell of a low voltage outputting type that can be produced without passing complicated production processes such as configurating serial connection. However, a single-cell solar cell that also is of a low power outputting type and can be configured without serial connections may be used. Also, when it is desired to increase an output to the boosting circuit 12, parallelly connected fuel cells or solar cells that can be realized without passing complicated production processes may be used.

The lithium storage cell 23, which is the second cell, which is a rechargeable secondary cell and plays a role of an energy source that provides start-up energy, may be any cell that can supply energy. For example, the lithium storage cell may be a primary cell that is not rechargeable, such as a dry cell. The second cell may be a storage element such as an ordinary capacitor or an electric double layer capacitor.

Although it is preferable to use a CMOS type oscillator circuit as an oscillator circuit for performing ON/OFF control of the switching elements in the booster circuit, other circuits, for example, a bipolar type oscillator circuit may be used. The bipolar type oscillator circuit has a disadvantage that the circuit consumes much power but has an advantage that the minimum operation voltage is low. It is also possible to design a circuit configuration making the best of this advantage.

SIXTH EMBODIMENT

Figure 10:
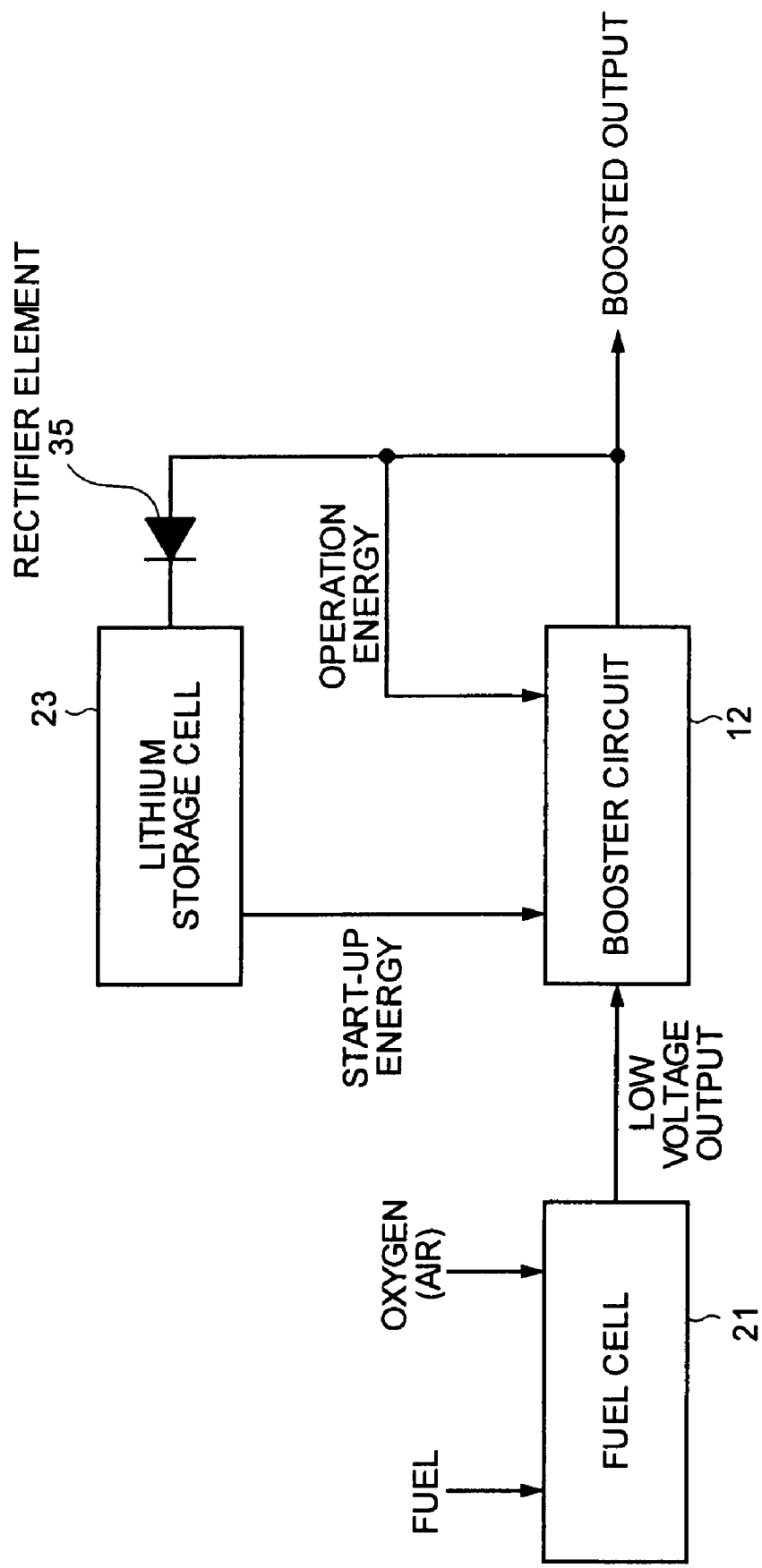
FIG. 10 is a block diagram of a configuration of a booster according to a sixth embodiment of the present invention.

FIG. 10 is a block diagram of a configuration of a booster according to a sixth embodiment of the present invention. The booster includes, in addition to the configuration according to the fifth embodiment as shown in FIG. 9, a rectifier element 35 for outputting a part of the output of the booster circuit 12 to the lithium storage cell 23 as energy to be utilized for next and subsequent start-ups. Other configurations are the same as or equivalent to those shown in FIG. 9 and the same reference numerals designate those portions.

Referring to FIG. 10, the operation of this booster circuit is explained. However, the feature that the booster circuit 12 performs boosting operation using the low voltage output from the single-cell fuel cell 21, the start-up energy from the lithium storage cell 23, and operation energy that is a part of the own output and fed back to the booster circuit is the same as that in the fifth embodiment and explanation is omitted.

In the sixth embodiment, all or a part of the boosted output from the booster circuit 12 is output to the lithium storage cell 23 through the rectifier element 35. The energy output then is energy for starting the operation of the booster circuit 12 again and is stored in the lithium storage cell 23. For example, when a low voltage output is not supplied from the fuel cell 21 to the booster circuit 12, there is sometimes a case where it is desired that the operation of the booster circuit 12 be stopped to prevent unnecessary consumption of electric power. In this case, all or a part of the output of the booster circuit 12 is stored in the lithium storage cell 23 and this energy is output to the booster circuit 12 when the booster circuit 12 is restarted.

The rectifier element 35 is provided to prevent flow of current from the lithium storage cell 23 to the side of the output (booster circuit 12) when the stored voltage of the lithium storage cell 23 is higher than the boosted output.

With the booster according to this embodiment, a low voltage output, target to be boosted, from the first cell and start-up energy from the second cell are input to the booster circuit while operation energy necessary for continuing the operation of the booster circuit itself is fed back to the booster circuit by the booster circuit itself, so that a predetermined boosting output can be obtained. As a result, a boosting output for operating, for example, a mobile device can be obtained by utilizing the energy of the first cell from which only a low voltage output is available and an increase in production cost because of using a special cell can be prevented, so that a booster that enables one to reduce costs by utilization of a versatile cell can be provided.

With the booster according to this embodiment, the booster circuit outputs a boosted output to the second cell to store therein as start-up energy for restarting the own operation of the booster circuit, so that unnecessary consumption of electric power can be prevented. Since restart is possible with the energy stored in the second cell even when the boosted output decreases due to overload, thus falling in a situation where the own boosting operation of the booster circuit cannot be continued, a configuration with which continued operation is easy can be realized with ease.

While the lithium storage cell 23 may be a primary cell that is not rechargeable, such as a dry cell in the fifth embodiment, it is necessary in the sixth embodiment to store energy for restarting the booster circuit. Therefore, it is advantageous to use a storage element such as an ordinary capacitor or an electric double layer capacitor in addition to the rechargeable secondary cell.

SEVENTH EMBODIMENT

Figure 11:
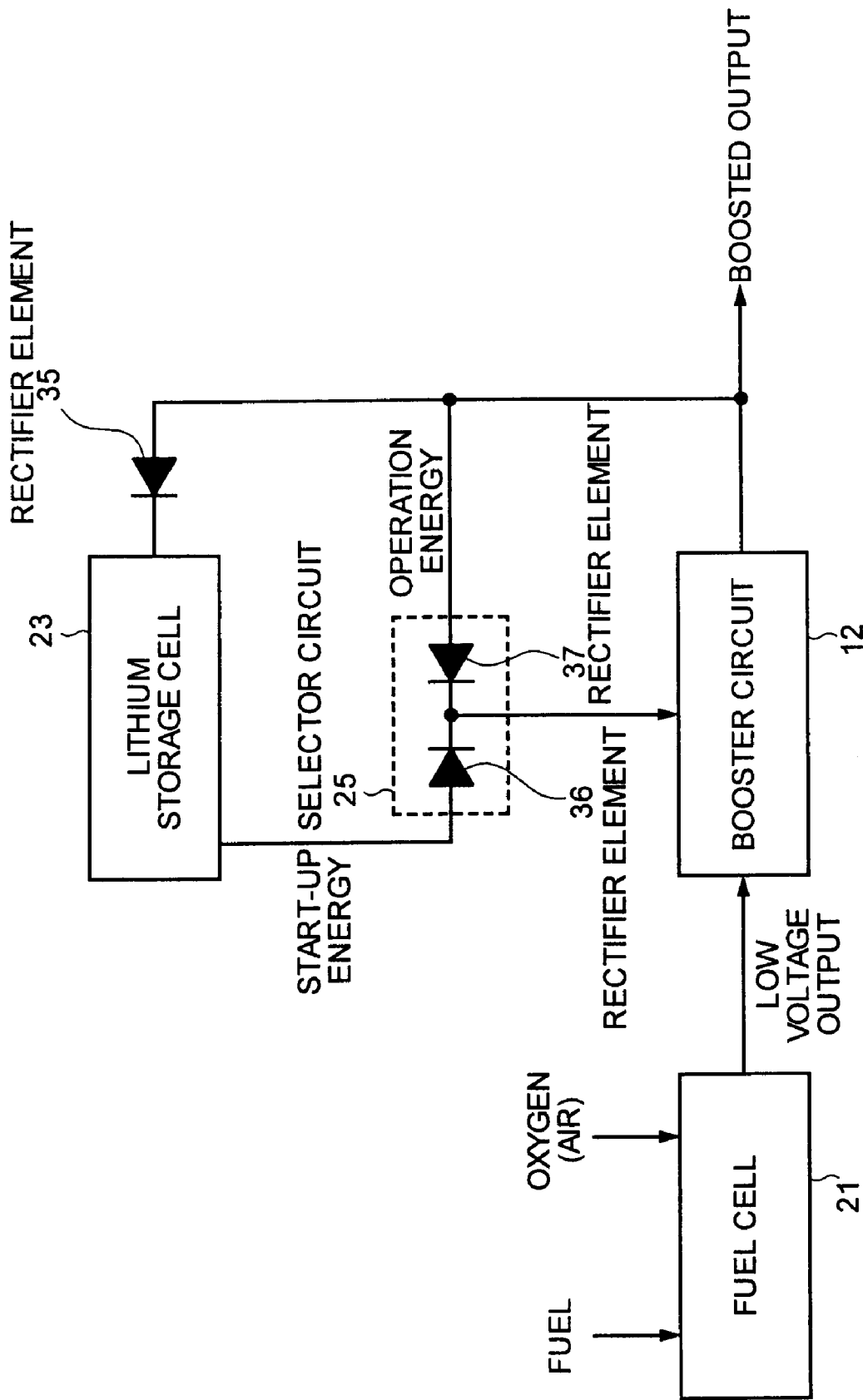
FIG. 11 is a block diagram of a configuration of a booster according to a seventh embodiment of the present invention.

FIG. 11 is a block diagram of a configuration of a booster according to a seventh embodiment of the present invention. The booster includes, in addition to the configuration according to the sixth embodiment as shown in FIG. 10, a selector circuit 25 that has rectifier elements 36 and 37 and selects which one of the start-up energy and operation energy is to be output to the booster circuit 12. Other configurations are the same as or equivalent to those shown in FIG. 9 and the same reference numerals designate those portions.

Referring to FIG. 11, the operation of this booster circuit is explained. A low voltage output is input to the booster circuit 12 from the fuel cell 21. Although in the fifth and sixth embodiments, both the start-up energy and operation energy are input into the booster circuit, the booster circuit 12 according to the seventh embodiment is configured in such a manner that either one of the start-up energy and operation energy is input to the booster circuit 12 through the selector circuit 25. The reason for this is as follows.

It is necessary to supply some input voltage to the booster circuit 12 when starting up but once the booster circuit has started up, the booster circuit 12 can continue its operation with a small amount of input voltage. That is, as in the configuration according to the seventh embodiment, inputting an output that is superior between outputs of the start-up energy and operation energy to the booster circuit 12 through the selector circuit 25 can lead to realization of efficient utilization of energy.

Unless both of a decrease in boosted output due to overload and a decrease in the energy stored in the lithium storage cell 23 occur simultaneously, restart of the booster circuit 12 is possible, so that a system configuration with a high capacity utilization can be realized with ease.

The rectifier element 35 is provided so as to prevent flow of the current from the lithium storage cell 23 to the output side when the stored voltage of the lithium storage cell 23 is higher than the boosted voltage.

The rectifier elements 36 and 37 are provided in the selector circuit 25 as units that supply a superior output (output having higher output voltage) between outputs of the start-up energy and operation energy to the booster circuit 12.

With the booster according to the seventh embodiment, a low voltage output, target to be boosted, is input to the booster circuit 12 from the first cell and the selector circuit, to which both the start-up energy and operation energy are input, outputs either one of the start-up energy and operation energy to the booster circuit, so that not only the boosted output for operating, for example, a mobile device can be obtained by using the energy of the first cell from which only a low voltage output is available but also a booster with which an increase in production cost due to use of a special cell is prevented and reduction of cost by using a versatile cell is possible can be provided. Further, efficient utilization of boosted output energy can be realized and a system configuration having a high capacity utilization can be realized with ease.

In the same manner as that in other embodiments, the first cell, which is the fuel cell 21, may be a single-cell fuel cell or a single-cell solar cell. Alternatively, parallelly connected fuel cells or solar cells may be used.

The second cell, which is the lithium storage cell 23, may be any cell that can store energy for the restart similarly to the sixth embodiment. In addition to a rechargeable secondary cell, a storage element such as an ordinary capacitor or an electric double layer capacitor may be used as the secondary cell.

EIGHTH EMBODIMENT

Figure 12:
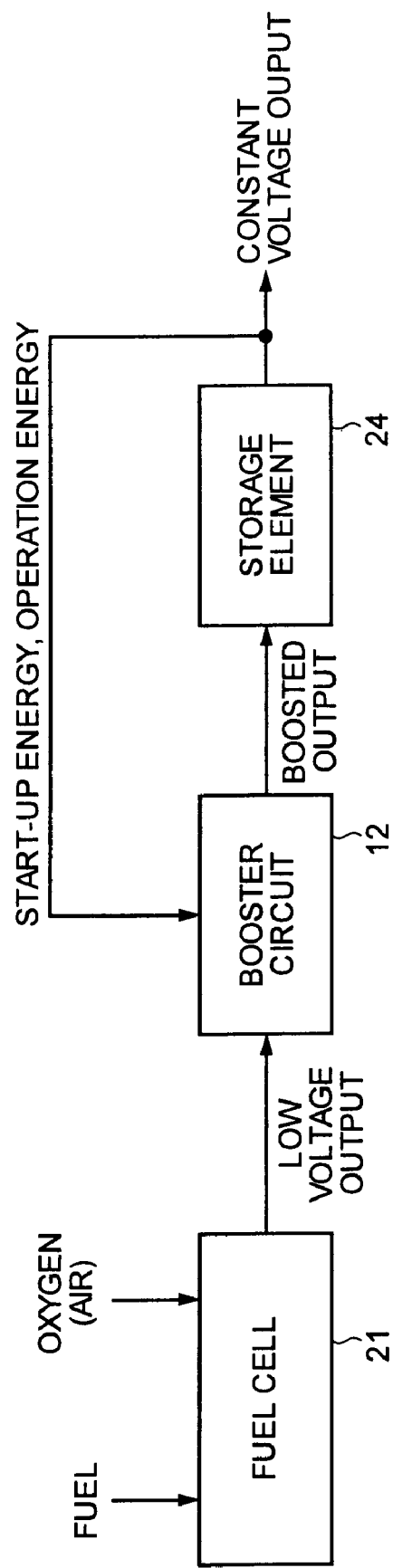
FIG. 12 is a block diagram of a configuration of a booster according to an eighth embodiment of the present invention.

FIG. 12 is a block diagram of a configuration of a booster according to an eighth embodiment of the present invention. The booster depicted includes, in the configuration according to the fifth embodiment as shown in FIG. 9, a storage element 24 for storing the output of the booster circuit 12 while the booster includes no lithium storage cell 23. Other configurations are the same as or equivalent to those shown in FIG. 9 and the same reference numerals designate those portions.

Referring to FIG. 12, the operation of this booster circuit is explained. In FIG. 12, a low voltage output is input to the booster circuit 12 from the single-cell fuel cell 21. Here, although in the fifth and sixth embodiments, the start-up energy is input to the booster circuit 12 from the lithium storage cell 23 and the operation energy is input to the booster circuit 12 from the booster circuit 12 itself, the booster circuit 12 according to the eighth embodiment is configured in such a manner that both the start-up energy that is supplied when starting up and the operation energy that is continuously supplied during operation are input to the booster circuit 12 from the storage element 24.

When the boosted output is directly supplied to a load with a considerable load fluctuation, load current changes greatly so that the boosted output fluctuates greatly. In such a case, a countermeasure that is commonly adopted is to incorporate a constant voltage unit such as the storage element 24 between the booster circuit 12 and the load (not shown) as shown in FIG. 12.

By providing the storage element 24 that provides a constant voltage, the start-up energy and operation energy output to the booster circuit 12 caused to be output from the storage element 24 to thereby start up the booster circuit 12 and continue its operation after the start-up. Accordingly, a configuration close to the actual system configuration can be obtained and the booster circuit 12 can be made compact. Further, use of the storage element 24 enables one to realize a booster having a relatively large power source capacity. Further, use of the storage element 24 enables one to realize a booster having a relatively large power source capacity.

By the booster according to the eighth embodiment, a low voltage output, target to be boosted, is input to the booster circuit 12 from the first cell and the selector circuit, to which both the start-up energy and operation energy are input, outputs the start-up energy and operation energy to the booster circuit. Accordingly, the boosted output for operating, for example, a mobile device can be obtained by using the energy of the first cell from which only a low voltage output is available. Also, a booster having a relatively large power source capacity can be realized.

In the same manner as that in other embodiments, the first cell, which is the fuel cell 21, may be a single-cell fuel cell or a single-cell solar cell. Alternatively, parallelly connected fuel cells or solar cells may be used.

The storage element 24 may be a storage element such as an ordinary capacitor or an electric double layer capacitor.

In the eighth embodiment, the booster circuit 12 and the storage element 24 are configured to be separate. However, it is possible to configure the booster in such a manner that the storage element 24 is incorporated in the booster circuit 12.

NINTH EMBODIMENT

Figure 13:
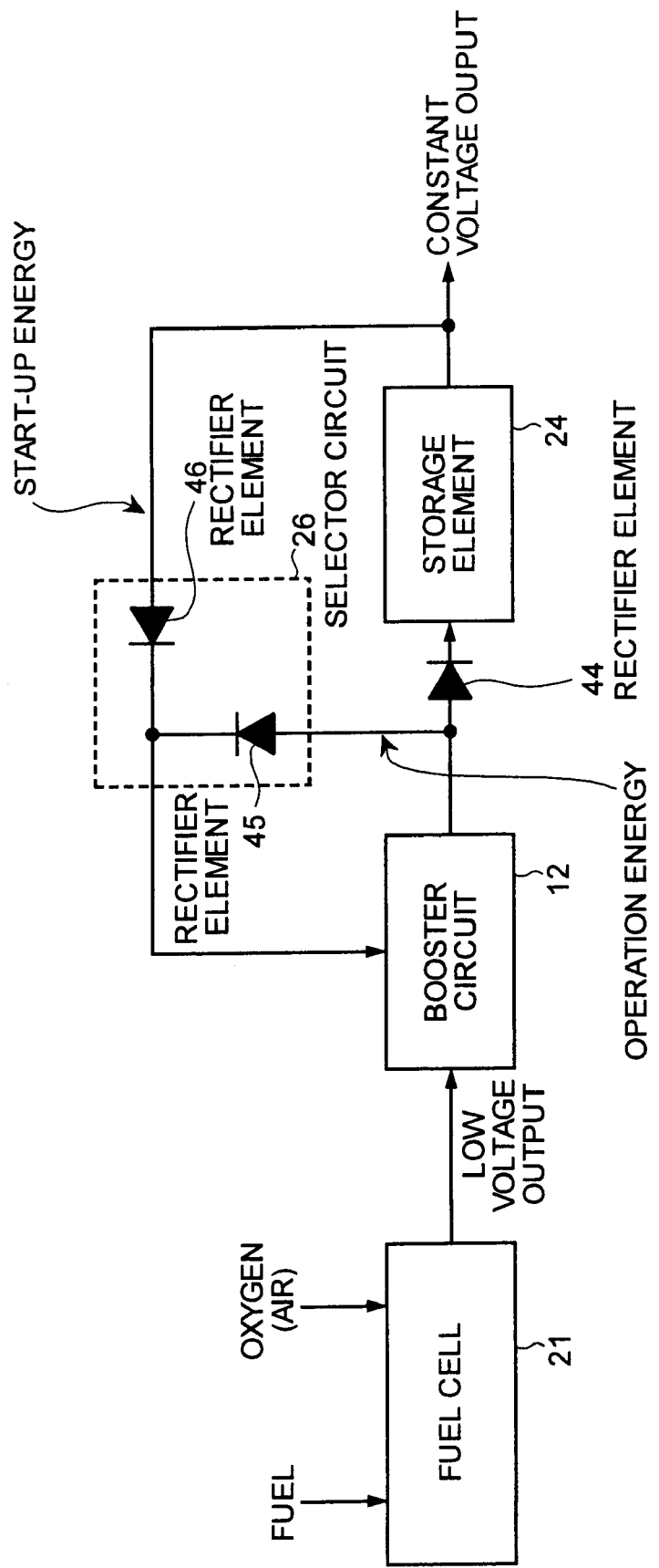
FIG. 13 is a block diagram of a configuration of a booster according to a ninth embodiment of the present invention.

FIG. 13 is a block diagram of a configuration of a booster according to a ninth embodiment of the present invention. The booster depicted is configured to include, in addition to the configuration according to the eighth embodiment as shown in FIG. 12, a selector circuit 26 that has rectifier elements 45 and 46 and selects which one of the start-up energy and operation energy is to be output to the booster circuit 12 and a rectifier element 44 that prevents flow back from the storage element 24 to the booster circuit 12. Other configurations are the same as or equivalent to those shown in FIG. 12 and the same reference numerals designate those portions.

Referring to FIG. 13, the operation of this booster circuit is explained. A low voltage output is input to the booster circuit 12 from the single-cell fuel cell 21. Although in the eighth embodiment, both the start-up energy that is supplied when starting up and the operation energy that is continuously supplied during the operation are input to the booster circuit from the storage element 24, the booster circuit 12 according to this embodiment is configured in such a manner that only the operation energy is supplied by the booster circuit 12.

In the selector circuit 26 shown in FIG. 13, a superior output between outputs of the start-up energy and the operation energy is supplied to the booster circuit 12 through the selector circuit 26. That is, when the booster is started up, usually the booster circuit 12 is in a state where the operation stops and hence the output voltage of the storage element 24 (start-up energy) is higher than the output voltage of the booster circuit 12 (operation energy). Accordingly, the start-up energy is supplied to the booster circuit 12 through the rectifier element 46.

On the other hand, during the operation, the output voltage of the booster circuit 12 (operation energy) is higher than the output voltage of the storage element 24 (start-up energy). Accordingly, the operation energy is supplied to the booster circuit 12 itself through the rectifier element 45.

In this configuration, for example, when a load having a large load fluctuation is connected to the storage element 24, the load on the storage element 24 increases. Even in such a case, the configuration in which the operation energy for allowing the booster circuit 12 to continue its operation is supplied by the booster circuit 12 itself enables a reduction of the load on the storage element 24.

With the booster according to this embodiment, a low voltage output, target to be boosted, is input to the booster circuit 12 from the first cell and the selector circuit, to which both the start-up energy that is an output from the storage element and the operation energy that is an output from the booster circuit are input, outputs either one of the start-up energy and operation energy to the booster circuit. Accordingly, the boosted output for operating, for example, a mobile device can be obtained by using the energy of the first cell from which only a low voltage output is available. Also, a booster with which an increase in production cost due to use of a special cell is prevented and a reduction of cost by using a versatile cell is possible can be provided. The load on the storage element can be reduced and efficient utilization of boosted output energy can be realized.

In the same manner as that in other embodiments, the first cell, which is the fuel cell 21, may be a single-cell fuel cell or a single-cell solar cell. Alternatively, parallelly connected fuel cells or solar cells may be used.

The storage element 24 may be a storage element such as an ordinary capacitor or an electric double layer capacitor.

In the eighth embodiment, the booster circuit 12 and the storage element 24 are configured to be separate. However, it is possible to adopt a configuration in which the storage element 24 and the rectifier element 44 are incorporated in the booster circuit 12.

TENTH EMBODIMENT

Figure 14:
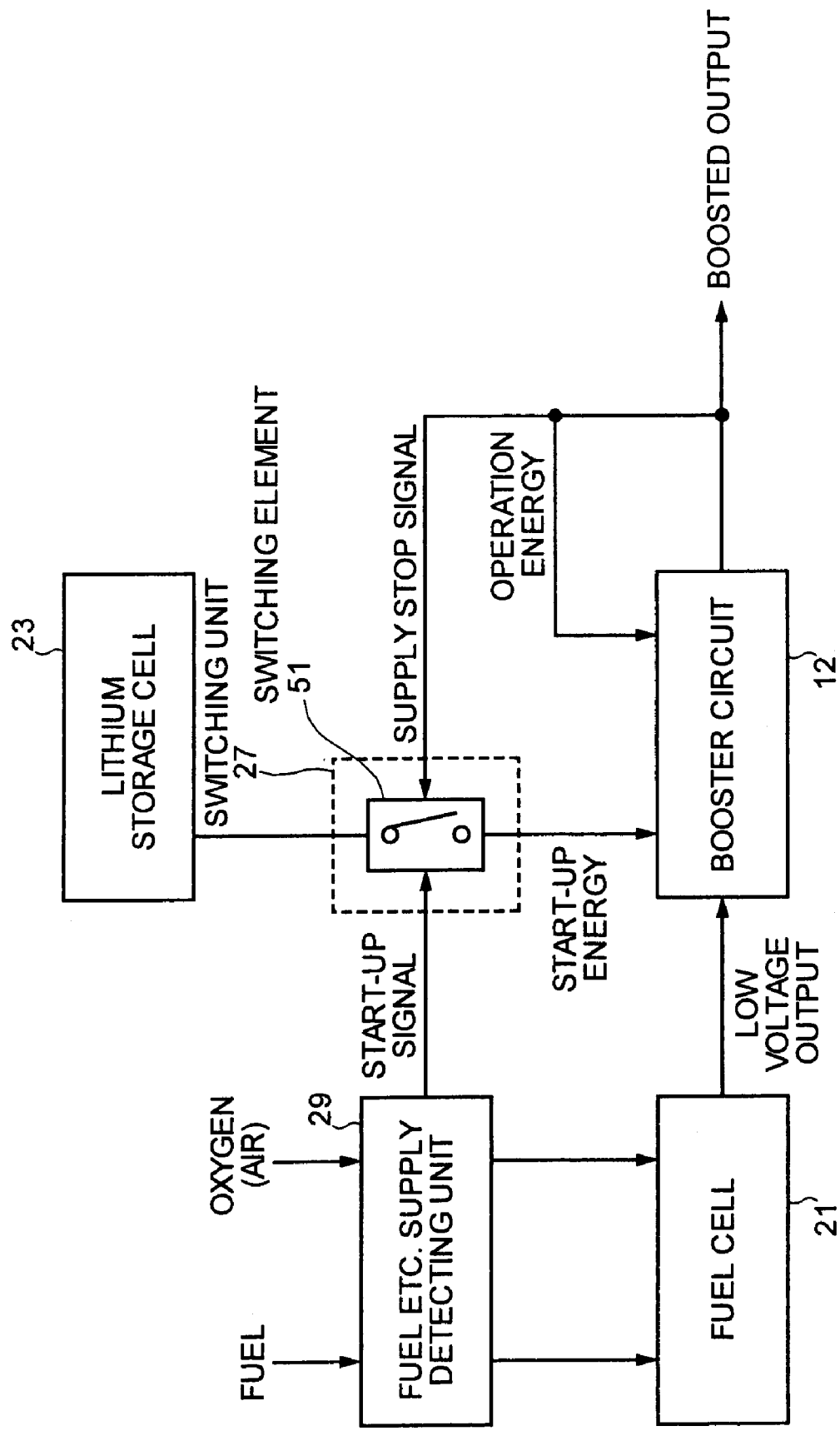
FIG. 14 is a block diagram of a configuration of a booster according to a tenth embodiment of the present invention.

FIG. 14 is a block diagram of a configuration of a booster according to a tenth embodiment of the present invention. The booster depicted includes, in the configuration according to the fifth embodiment as shown in FIG. 9, a detecting unit 29 that detects whether a fuel or oxygen (air) is supplied to the fuel cell 21, a switching unit 27 provided with a switching element 51 that is connected between the lithium storage cell 23 and the booster circuit 12 and to which a start-up signal from the detecting unit 29 and a supply stop signal from the booster circuit 12 are input. Other configurations are the same as or equivalent to those shown in FIG. 9 and the same reference numerals designate those portions.

Referring to FIG. 14, the operation of this booster circuit is explained. In FIG. 14, the detecting unit 29 detects that a fuel or oxygen (air) (hereinafter, referred to as "fuel etc.") is supplied to the fuel cell 21 and outputs a start-up signal. The booster circuit 12 generates a boosted output formed by boosting a low voltage output from the fuel cell 21. The switching unit 27 controls whether to output the start-up energy supplied from the lithium storage cell 23 to the booster circuit 12 based on the start-up signal that is output from the detecting unit 29 and the supply stop signal that is output from the booster circuit 12. On the other hand, the output of the booster circuit 12 is fed back to the booster circuit 12 itself, so that the booster circuit 12 can continue its boosting operation.

The detecting unit 29 outputs a start-up signal while the fuel etc. is supplied to the fuel cell 21. The start-up signal is output while the fuel etc. is supplied (start-up signal "ON"), and acts in such a manner that the switching element 51 of the switching unit is conducting. On the other hand, the supply stop signal is the boosted output itself of the booster circuit 12 and acts in such a manner that when the boosted output voltage is a predetermined voltage or more (supply stop signal "ON"), the switching element 51 of the switching unit 27 is interrupted while when the boosted output voltage is less than the predetermined voltage (supply stop signal "OFF"), the switching element 51 is conducting.

The relationship between the start-up signal and supply stop signal and the switching unit 27 is as follows. That is, when the start-up signal is in a state of ON and the supply stop signal is in a state of OFF, the switching element 51 is conducting and the start-up energy is supplied from the lithium storage cell 23 to the booster circuit 12.

When the start-up signal is in a state of OFF, or the supply stop signal is in a state of ON, the switching element 51 is interrupted, so that there is no supply of the start-up energy to the booster circuit 12.

The booster according to this embodiment is in as state where the fuel etc. is supplied to the fuel cell, and when the booster circuit 12 has not started up yet, the start-up energy is output to the booster circuit 12 from the lithium storage cell 23. In short, efficient use of the start-up energy is made possible by controlling in such a manner that the start-up energy is output only when it is necessary to start up the booster circuit 12.

Figure 15:
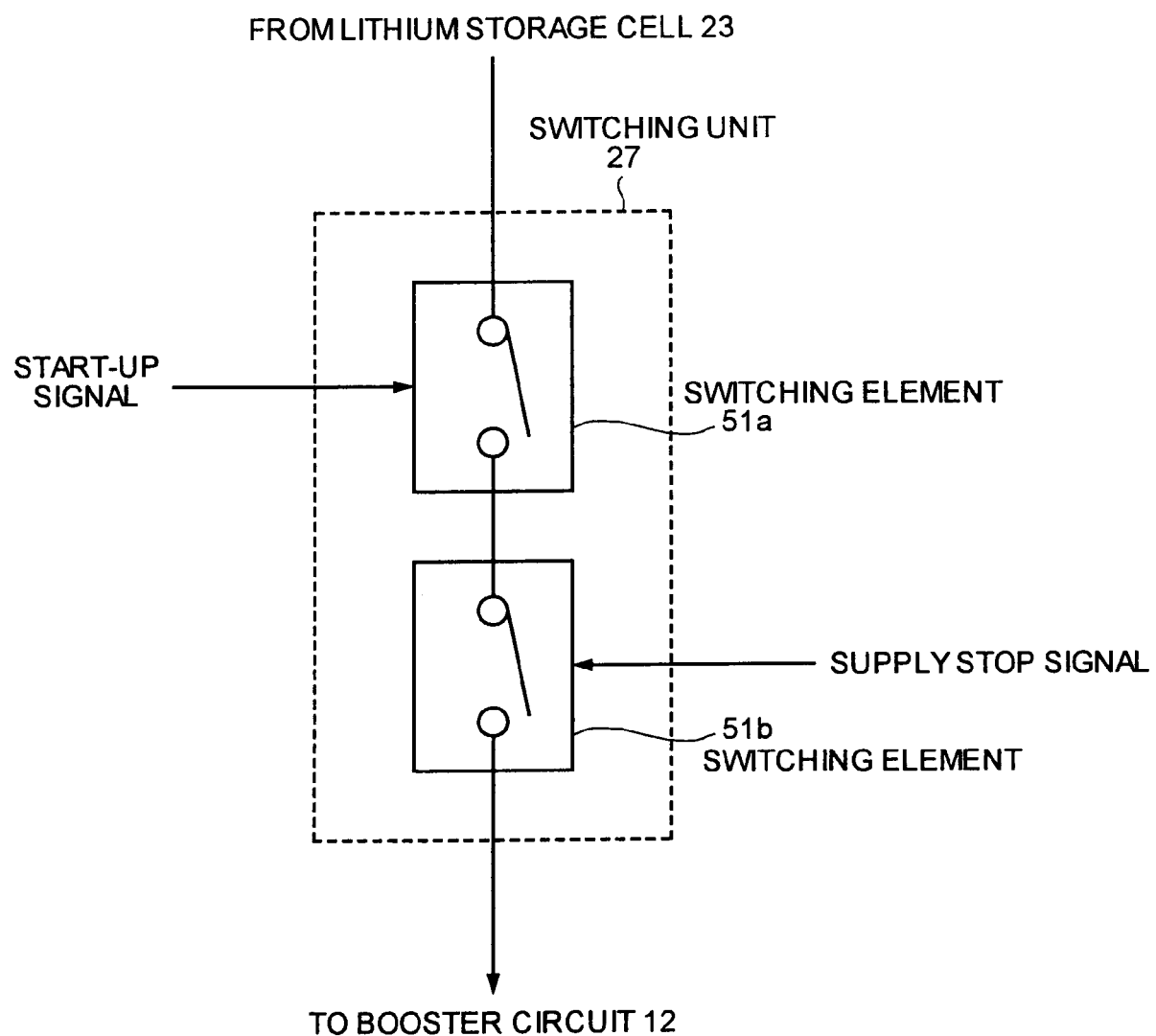
FIG. 15 is a block diagram of a case where a switching unit 27 is constituted by switching elements 51a and 51b that are serially connected one to another.

FIG. 15 is a block diagram of the switching unit 27 shown in FIG. 14 with serially connected switching elements 51a and 51b. The function of the switching unit 27 shown in FIG.

14 can be easily realized by connecting the start-up signal to the switching element 51a and the supply stop signal to the switching element 51b.

With the booster according to the tenth embodiment, the switching unit to which a low voltage output from the first cell is input controls whether to allow the start-up energy supplied from the second cell to be output to the booster circuit based on the start-up signal output from the detecting unit and the supply stop signal that is the boosted output itself, so that the boosted output for operating, for example, a mobile device can be obtained by using the energy of the first cell from which only a low voltage output is available. Also, the start-up energy can be output only when it is necessary to start up the booster circuit, so that it is possible to use the start-up energy efficiently.

The feature of this embodiment, i.e., the configuration in which controls whether to allow the start-up energy supplied from the second cell to be output to the booster circuit are performed based on the start-up signal output from the detecting unit and the supply stop signal that is the boosted output itself can be applied to the eighth and ninth embodiments with similar effects as those of the tenth embodiment.

The lithium storage cell 23, which is the second cell, which is a rechargeable secondary cell and plays a role of an energy source that provides start-up energy, may be any cell that can supply energy. For example, the lithium storage cell may be a primary cell that is not rechargeable, such as a dry cell. In addition, the second cell may be a storage element such as an ordinary capacitor or an electric double layer capacitor.

ELEVENTH EMBODIMENT

Figure 16:
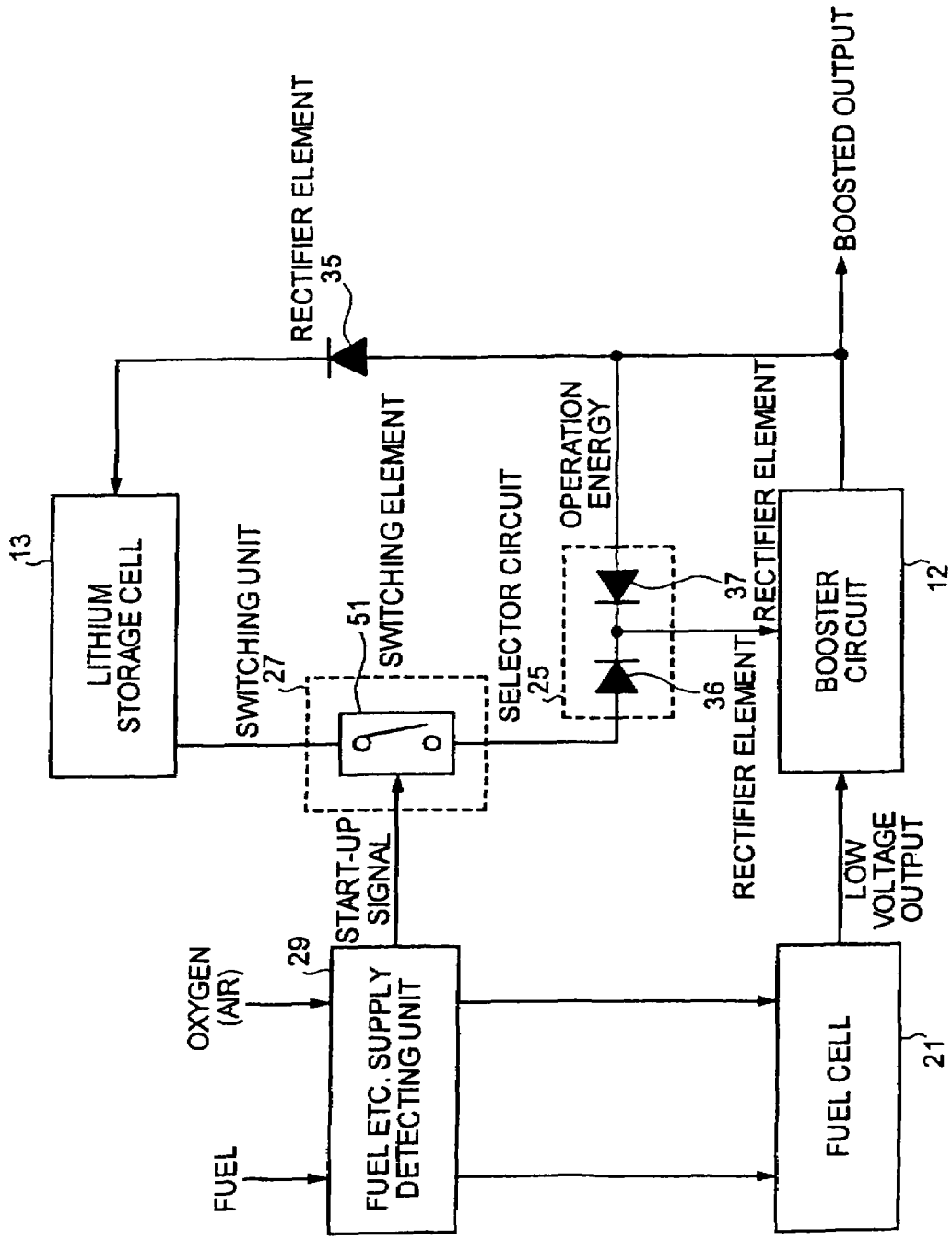
FIG. 16 is a block diagram of a configuration of a booster according to an eleventh embodiment of the present invention.

FIG. 16 is a block diagram of a configuration of a booster according to an eleventh embodiment of the present invention. The booster includes, in addition to the configuration according to the tenth embodiment as shown in FIG. 14, the selector circuit 25 that has the rectifier elements 36 and 37 and selects which one of the start-up energy and operation energy is to be output to the booster circuit 12 and the rectifier element 35 for outputting all or a part of the output of the booster circuit 12 to the lithium storage cell 23. Other configurations are the same as or equivalent to those shown in FIG. 14 and the same reference numerals designate those portions.

Referring to FIG. 16, the operation of this booster circuit is explained. However, the operation of the detecting unit to output a start-up signal and the operation of the fuel cell 21 to supply a low voltage output to the booster 12 are the same as those in the tenth embodiment and description thereof is omitted.

In the eleventh embodiment, all or a part of the boosted output from the booster circuit 12 is output to the lithium storage cell 23 through the rectifier element 35. Similarly to the sixth embodiment, the rectifier element 35 is provided so as to prevent a backflow of current from the lithium storage cell 23 to the booster circuit 12.

The switching unit 27 controls whether to output the start-up energy supplied from the lithium storage cell 23 to the booster circuit 12 based on the start-up signal output from the detecting unit 29. The start-up signal is output is a start-up signal ("ON" signal) for conducting the switching unit 27 while the fuel etc. is being supplied. On this occasion, the energy from the lithium storage cell 23 is output to the selector circuit 25.

The selector circuit 25 outputs to the booster circuit 12 a superior output between outputs of the start-up energy that is output from the switching unit 27 and the operation energy that is a boosted output from the booster circuit 12. The booster circuit 12 to which the start-up energy or operation energy is supplied generates and outputs a predetermined boosted output.

With the booster according to the eleventh embodiment, a low voltage output, target to be boosted, is input to the booster circuit from the first cell and the selector circuit, to which both the start-up energy and operation energy are input through the switching unit that operates based on the start-up signal output from the detecting unit, outputs either one of the start-up energy and operation energy to the booster circuit. Accordingly, not only the boosted output for operating, for example, a mobile device can be obtained by using the energy of the first cell from which only a low voltage output is available but also a booster with which an increase in production cost due to use of a special cell is prevented and a reduction of cost by using a versatile cell is possible can be provided. Also, the start-up energy can be output only when it is necessary to start up the booster circuit, so that it is possible to use the start-up energy efficiently.

The feature of this embodiment, i.e., the configuration in which the start-up energy is output based on the start-up signal output from the detecting unit and a control whether to allow either the start-up energy or the operation energy to be output to the booster circuit is performed can be applied to the eighth and ninth embodiments with similar effects as those of the eleventh embodiment.

The lithium storage cell 23, which is the second cell, which is a rechargeable secondary cell and plays a role of an energy source that provides start-up energy, may be any cell that can supply energy. For example, the lithium storage cell may be a primary cell that is not rechargeable, such as a dry cell. In addition, the second cell may be a storage element such as an ordinary capacitor or an electric double layer capacitor.

TWELFTH EMBODIMENT

Figure 17:
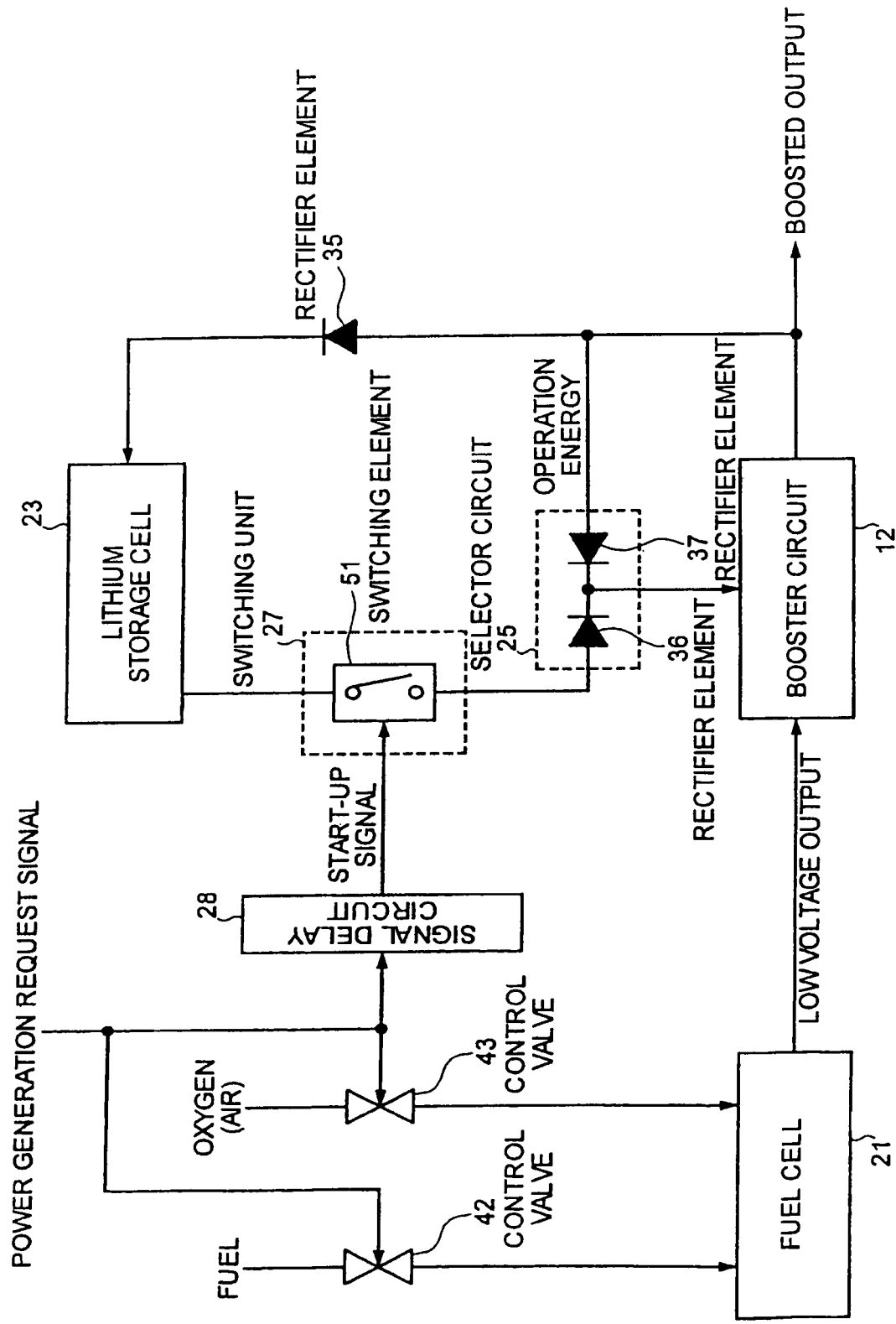
FIG. 17 is a block diagram of a configuration of a booster according to a twelfth embodiment of the present invention.

FIG. 17 is a block diagram of a configuration of a booster according to a twelfth embodiment of the present invention. The booster is configured in such a manner that in the configuration according to the eleventh embodiment as shown in FIG. 16, the start-up signal to be output to the switching unit 27 is output as follows. That is, a power generation request signal to be given to control valves 42 and 43 for controlling fuel and oxygen (air), respectively, supplied to the fuel cell 21 is output through a signal delay circuit 28 as the start-up signal. Other configurations are the same as or equivalent to those shown in FIG. 16 and the same reference numerals designate those portions.

Referring to FIG. 17, the operation of this booster circuit is explained. When a power generation request signal is input to the control valves 42 and 43, the control valves 42 and 43 are opened and fuel and oxygen are supplied to the fuel cell 21. The power generation request signal is input to the signal delay circuit 28. The signal delay circuit 28 outputs to the switching unit 27 a signal that is delayed a predetermined time with respect to the input power generation request signal.

A certain time is required for fuel and oxygen to distribute in the fuel cell. Therefore, by delaying a timing in which the switching unit 27 turns ON by a predetermined time behind a timing in which fuel and oxygen are sent to the fuel cell 21, the timing in which the output of the fuel cell 21 is output to the booster circuit 12 and the timing in which the start-up energy is output to the booster circuit 12 are synchronized with each other so that efficient use of the start-up energy is possible.

A delay time that is delayed by the signal delay circuit 28 only needs to be set to a time from a time when the power generation request signal is input to when the fuel etc. is distributed in the inside of the fuel cell 21 and may be set to any time depending on the system of the fuel cell. Note that the operation thereafter is similar to that in the eleventh embodiment, and a predetermined boosted output can be obtained by the booster circuit 12 can provide.

With the booster according to this embodiment, a low voltage output, target to be boosted, is input to the booster circuit from the first cell and the selector circuit, to which both the start-up energy through the switching unit that operates based on the start-up signal output and the operation energy as an output of the booster circuit are input, outputs either one of the start-up energy and operation energy to the booster circuit. Accordingly, not only the boosted output for operating, for example, a mobile device can be obtained by using the energy of the first cell from which only a low voltage output is available but also a booster with which an increase in production cost due to use of a special cell is prevented and a reduction of cost by using a versatile cell is possible can be provided. Also, the start-up energy can be output only when it is necessary to start up the booster circuit, so that it is possible to use the start-up energy efficiently.

The feature of this embodiment, i.e., the configuration in which the start-up energy is output based on the delayed output of the power generation request signal and a control whether to allow either the start-up energy or the operation energy to be output to the booster circuit is performed can be applied to the eighth and ninth embodiments with similar effects as those of the twelfth embodiment.

The lithium storage cell 23, which is the second cell, which is a rechargeable secondary cell and plays a role of an energy source that provides start-up energy, may be any cell that can supply energy. For example, the lithium storage cell may be a primary cell that is not rechargeable, such as a dry cell. In addition, the second cell may be a storage element such as an ordinary capacitor or an electric double layer capacitor.

THIRTEENTH EMBODIMENT

Figure 18:
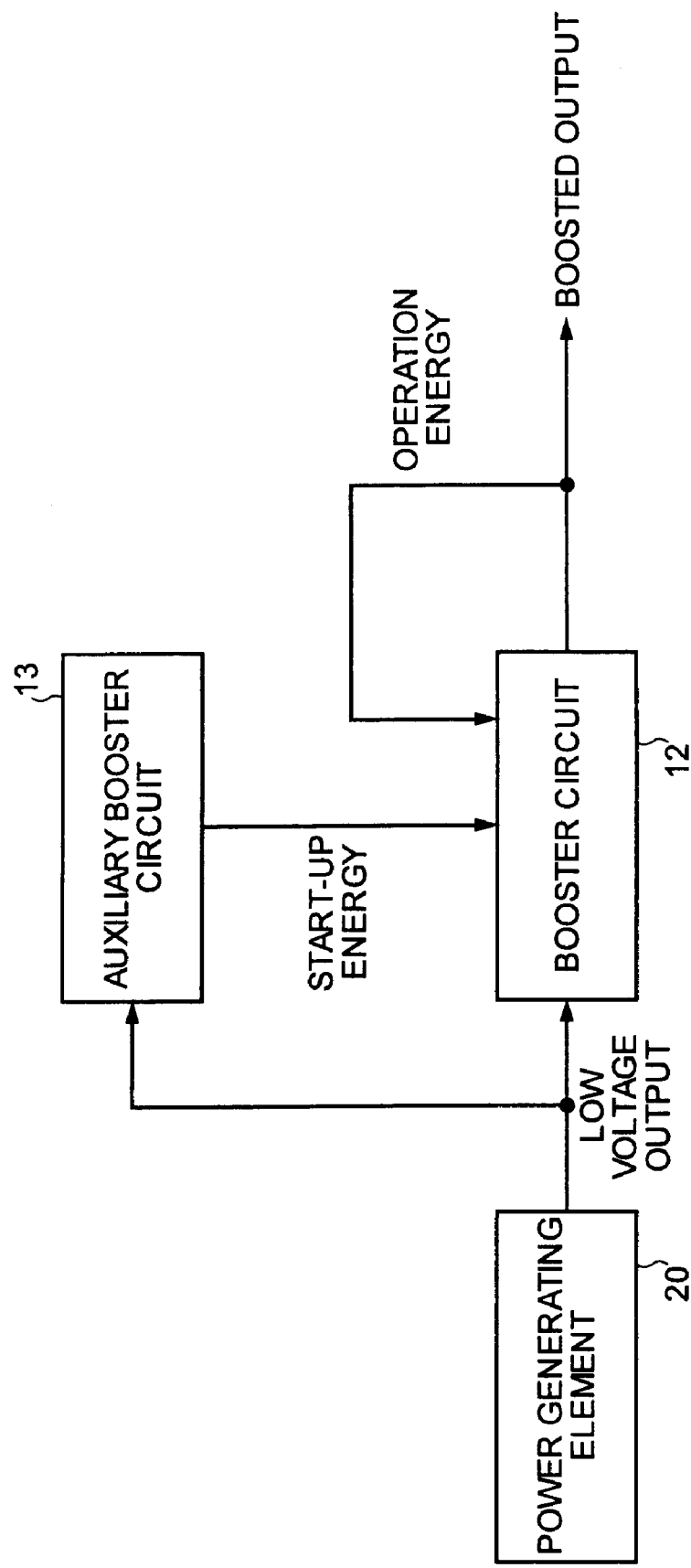
FIG. 18 is a block diagram of a configuration of a booster according to a thirteenth embodiment of the present invention.

FIG. 18 is a block diagram of a configuration of a booster according to a thirteenth embodiment of the present invention. The booster includes the booster circuit 12 that boosts a low voltage output from a power generating element 20 as a target to be boosted to about a predetermined voltage (for example, a voltage at which a load to be connected can operate) and an auxiliary booster circuit 13 provided to give start-up energy to the booster circuit 12. The power generating element 20, which supplies a low voltage output, a target to be boosted, to the booster circuit 12, is not a constituent element of the booster of the present invention.

The power generating element 20 that can be used include, for example, a single-cell fuel cell that outputs a low voltage as low as about 0.6 V to about 0.7 V without loads, and single-cell soar cells that have a composition of a monocrystalline silicon, polycrystalline silicon, amorphous silicon, and a compound semiconductor and output a low voltage of at most a little higher than 0.5 V.

The booster circuit 12 includes, for example, a switching regulator type circuit, with which it is easy to design a circuit configuration, and a boosted output can be obtained by generating energy of counterelectromotive force by ON/OFF control of the switching element provided in the booster circuit itself and storing the energy in a storage element such as a capacitor in the inside of the booster circuit itself.

The auxiliary booster circuit 13 includes, for example, a switched capacitor type circuit or a charge pump type circuit. The feature of the auxiliary booster circuit 13 is that the auxiliary booster circuit 13 can start-up at a low voltage as low as about 0.2 V to about 0.3 V and provides an output voltage of 1.2 V to 3 V depending on the number of connection stages of the storage elements. Therefore, the booster circuit 12 can be started up based on the start-up energy supplied by the auxiliary booster circuit 13. The details of the switched capacitor type circuit and of the charge pump type circuit are explained.

Referring to FIG. 18, the operation of the booster is explained. Electric energy is generated in the power generating element 20. An output based on the generated electric energy is generally at a low voltage. For example, in fuel cells, the output is about 0.6 to about 0.7 V in the absence of loads or at most around 0.3 V when rated output is produced. In solar cells, the output is at most a little higher than 0.5 V when it is fine or at most around 0.3 V when it is clouded. That is, the output from the power generating element 20 alone cannot directly allow a mobile device such as a note type personal computer or a mobile phone to operate.

The low voltage output from the power generating element 20 is input to the booster circuit 12. In the booster circuit 12, boosted electric energy is accumulated in a storage element such as a capacitor (not shown). On the other hand, a predetermined amount of start-up energy is required for operating the booster circuit 12. The auxiliary booster circuit 13 supplies a start-up voltage to the booster circuit 12. The booster circuit 12 requires about 1 V when starting up but it is featured that a small amount of start-up current is sufficient. Therefore, in the booster according to the thirteenth embodiment, the booster circuit 12 is started up with the start-up voltage from the auxiliary booster circuit 13 when starting up, and after the start-up, the own output is fed back to the booster circuit 12 as operation energy for continuing the operation of the booster circuit 12 to obtain a boosted output. This configuration has an advantage that no power supply unit is necessary for starting up the booster circuit.

Referring to a specific example of the booster circuit, for example, in the case of a general switching regulator type booster circuit, an input voltage of about 0.9 V to about 1.2 V is necessary when starting up while after the start-up, the operation of the booster circuit 12 itself can be continued even with a low input voltage of about 0.1 V.

The output of the booster circuit 12, that is, a boosted output, can be set at any predetermined voltage depending on the operation voltage of, for example a mobile device to be connected. Therefore, a predetermined boosted output for operating a mobile device or the like can be obtained by utilizing the energy of the power generating element 20 that can provide only a low voltage output.

A principle of operation and so on of a switched capacitor type circuit or a charged pump type circuit as a specific example of the auxiliary booster circuit 13 is explained.

Figure 19:
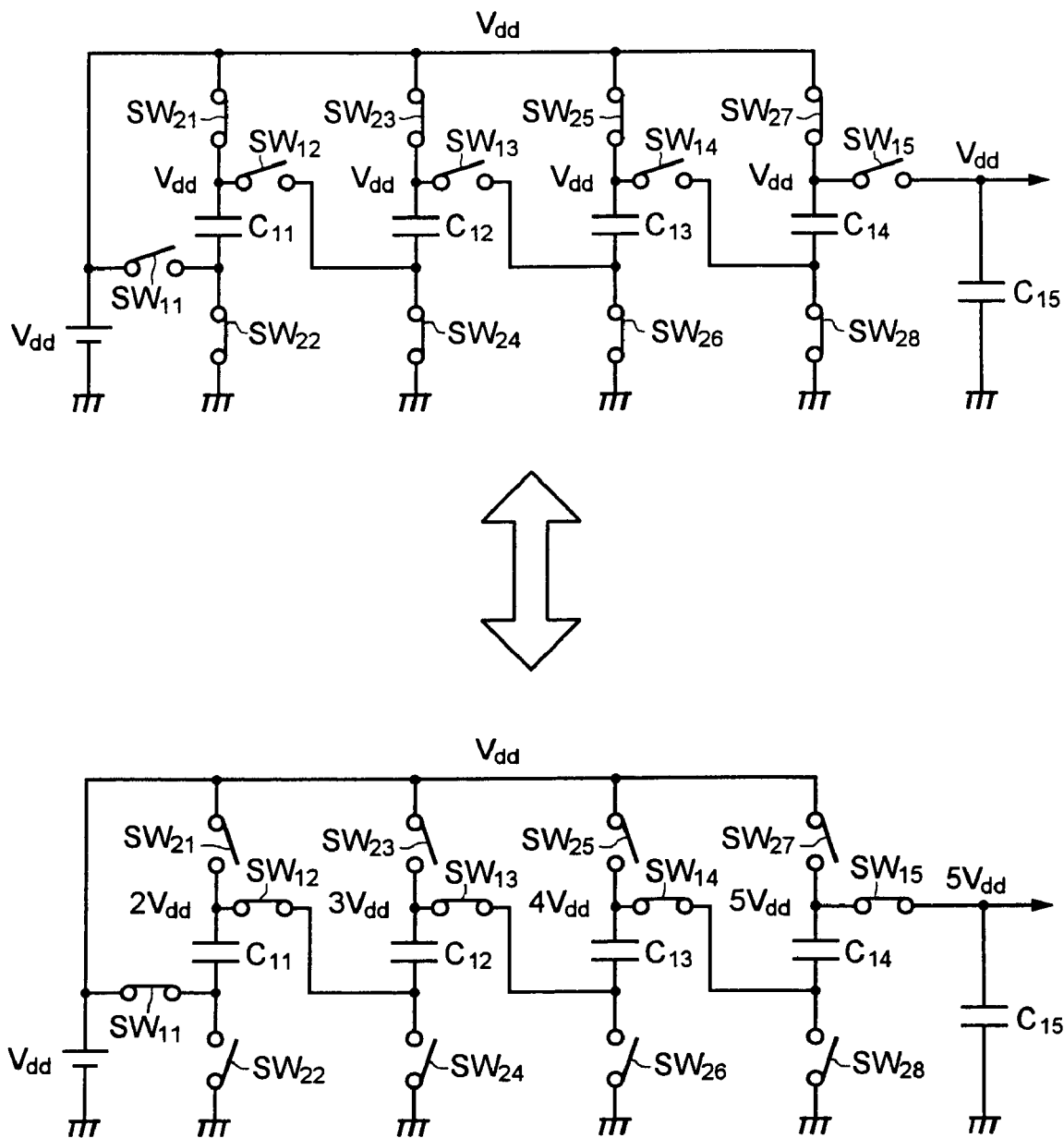
FIG. 19 is a schematic for explaining a principle of operation of a switched capacitor type.

FIG. 19 is a schematic for explaining a principle of operation of a switched capacitor type. $V_{dd}$ designates a direct current voltage and corresponds to the low voltage output that is output by the power generating element 20 shown in FIG. 18. $SW_{11}$ to $SW_{15}$ and $SW_{21}$ to $SW_{28}$ designate switching elements of a MOSFET or the like and controlled to either one of a state of ON and a state of OFF by, for example, a controller circuit not shown. Capacitors $C_{11}$ to $C_{15}$ are storage elements for storing charge. In particular, the capacitor $C_{15}$ is a storage element that stores start-up energy (output of the auxiliary booster circuit) for starting up the booster circuit 12.

Referring to FIG. 19, the operation of the switched capacitor type circuit is explained. First, in the state as shown in the upper part of FIG. 19, all of $SW_{21}$ to $SW_{28}$ are in a state of ON (closed) and all of $SW_{11}$ to $SW_{15}$ are in a state of OFF (open). Then, the capacitors $C_{11}$ to $C_{15}$ are in as state where they are connected in parallel on the part of the direct current voltage $V_{dd}$, so that the capacitors $C_{11}$ to $C_{15}$ are charged (charge is accumulated) to a voltage of approximately $V_{dd}$.

When all of $SW_{21}$ to $SW_{28}$ are set to be in a state of OFF and all of $SW_{11}$ to $SW_{15}$ are set to be in a state of ON as shown in the lower part of FIG. 19 from this state, the capacitors $SW_{11}$ to $SW_{15}$ are connected in series on the part of the direct current $V_{dd}$. Then, the potential of the upper end of the capacitor $C_{14}$ is $5V_{dd}$, so that a voltage (output of the auxiliary booster circuit) of $5V_{dd}$ can be generated across the capacitor $C_{15}$. An increasing number of connected stages results in a further increase in an output voltage. On the other hand, with one stroke of switching operation, a current capacity for operating the booster circuit 12 cannot be secured. Accordingly, a predetermined current capacity can be secured by repeatedly performing the switching operation.

Figure 20:
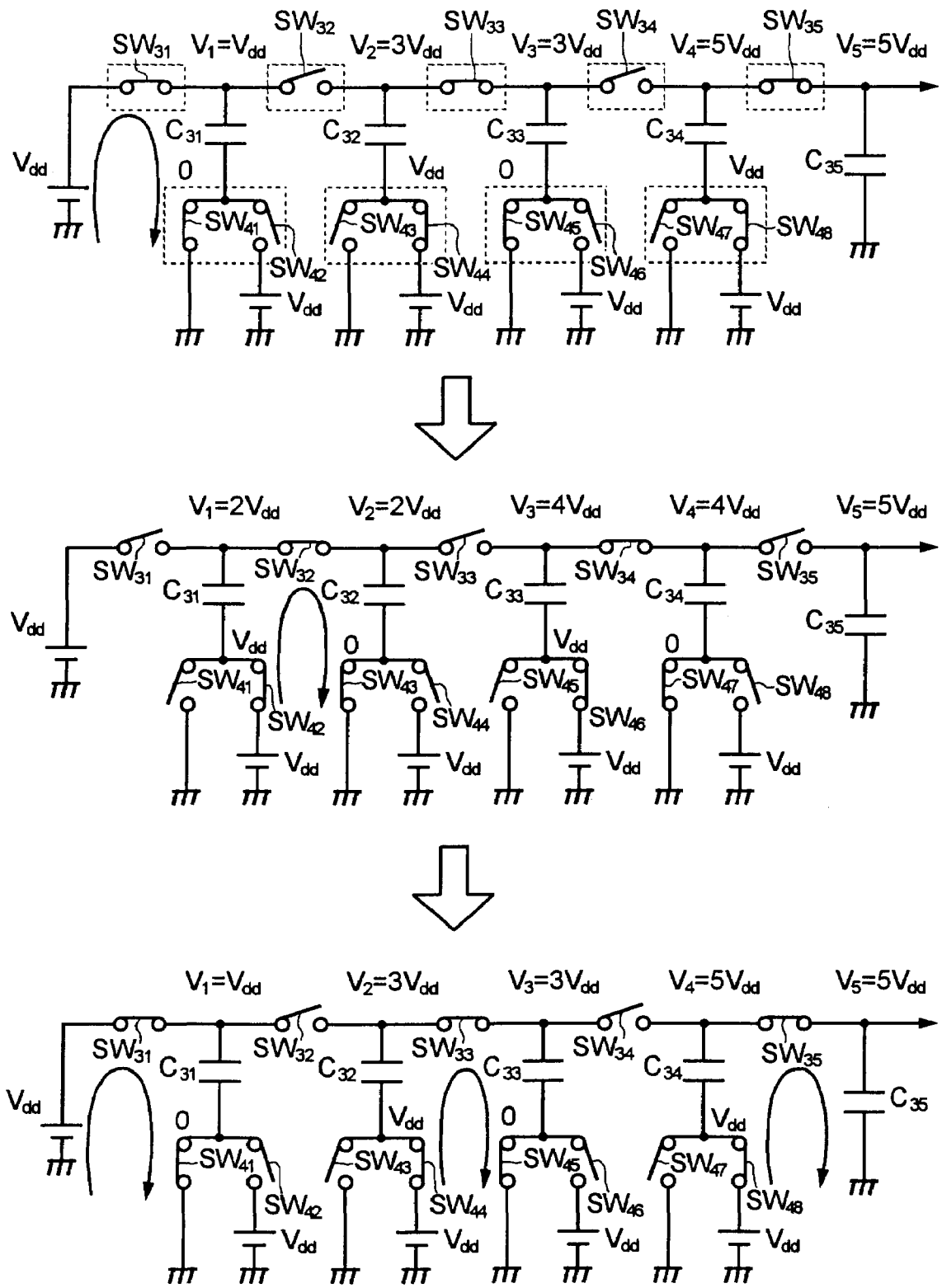
FIG. 20 is a schematic for explaining a circuit configuration and a principle of operation of a charge pump type.

FIG. 20 is a schematic for explaining a circuit configuration and a principle of operation of a charge pump type. $V_{dd}$ designates a direct current voltage and corresponds to the low voltage output that is output by the power generating element 20 shown in FIG. 18. Reference symbols $SW_{31}$ to $SW_{35}$ and $SW_{41}$ to $SW_{48}$ designate switching elements of a MOSFET or the like and controlled to either one of a state of ON and a state of OFF by, for example, a controller circuit not shown. Capacitors $C_{31}$ to $C_{35}$ are storage elements for storing charge. In particular, the capacitor $C_{35}$ is a storage element that stores start-up energy (output of the auxiliary booster circuit) for starting up the booster circuit 12. The charged pump type circuits, like the switched capacitor type circuits, can be constituted by capacitors and switching elements alone.

Referring to FIG. 20, the operation of the charged pump type circuit is explained. In the state shown in the upper part of FIG. 20, $SW_{31}$, $SW_{33}$, and $SW_{35}$ are in a state of ON and $SW_{32}$ and $SW_{34}$ are in a state of OFF. On the other hand, $SW_{41}$, $SW_{44}$, $SW_{45}$, and $SW_{48}$ are in a state of ON while $SW_{42}$, $SW_{43}$, $SW_{46}$, and $SW_{47}$ are in a state of OFF. The capacitor $C_{31}$ is charged (charge is accumulated) to approximately a voltage of $V_{dd}$ and a potential V1 on the upper end of the capacitor $C_{31}$ becomes approximately $V_{dd}$. As will be apparent in the subsequent operation, the capacitors $C_{32}$, $C_{33}$, and $C_{34}$ are charged to voltages of approximately $2V_{dd}$, $3V_{dd}$, and $4V_{dd}$, respectively, so that potentials $V_2$, $V_3$, $V_4$, and $V_5$ of the respective upper ends of the capacitors $C_{32}$, $C_{33}$, $C_{34}$ and $C_{35}$ become approximately $3V_{dd}$, $4V_{dd}$, $5V_{dd}$, and $5V_{dd}$, as shown in FIG. 20.

When all the states of the switching elements are reversed from this state, the states as shown in the middle part of FIG. 20 appears. On this occasion, since $SW_{42}$ is in a state of ON, and $SW_{32}$ and $SW_{43}$ are in a state of ON, the capacitor $C_{31}$ is charged up to approximately $2V_{dd}$, so that the potential V2 on the upper end of the capacitor $C_{32}$ becomes approximately $2V_{dd}$. That is, transition of the state in the upper part of FIG. 20 to the state in the middle part of FIG. 20 results in transfer of the charge from the first stage (capacitor $C_{31}$) to the second stage (capacitor $C_{32}$). This relationship is the same also between the third stage (capacitor $C_{33}$) and the fourth stage (capacitor $C_{34}$).

When all the states of the switching elements are reversed from this state (that is, into the same switching states as those in the upper part), the states as shown in the lower part of FIG. 20 appears. In this condition, the charge is transferred from the power generation element ($V_{dd}$) to the first stage, between the second stage (capacitor $C_{32}$) and the third stage (capacitor $C_{33}$), and between the fourth stage (capacitor $C_{34}$) and the fifth stage (capacitor $C_{35}$). The charged pump type circuit shown in FIG. 20 is configured to secure a predetermined voltage and a predetermined current capacity in the same manner as that of the switched capacitor type circuit by repeating such a bucket-relay type charge transfer alternately.

The switched capacitor type circuit and charged pump type circuit used as the auxiliary booster circuit 13 have low boosting capability and low boosting efficiency as compared with the switching regulator type circuit and the like used as the booster circuit 12. If switching regulator type circuits are named high efficiency large power type booster circuits, switched capacitor type circuits and charged pump type circuits can be named low efficiency small power type booster circuits.

However, switched capacitor type circuits and charged pump type circuits can be configured by capacitors and switching elements such as MOSFETs alone. The switching elements such as MOSFETs can perform switching operation at a low voltage of about 0.2 V to 0.3 V. On the other hand, switching regulator type circuit requires a start-up voltage of 0.9 V or more but requires not so much of a start-up current. Therefore, use of a switched capacitor type circuit or a charged pump type circuit for starting up a switching regulator type circuit enables one to utilize both the features effectively.

That is, it is possible to arrange the booster circuit of a low efficiency small power type between a power generating element of which the power generation voltage is not made so high and the booster circuit of a high efficiency large power type so as to operate in such a manner that the defects of both can be compensated.

With the booster according to the thirteenth embodiment, an output of the auxiliary booster circuit, which is start-up energy necessary for the start-up of the booster circuit 12 itself, is input to the booster circuit 12, or operation energy necessary for continuing the operation of the booster circuit 12 itself is fed back from the booster circuit 12 itself. This leads to generation of a boosted output based on the low voltage output supplied as a target to be boosted. Accordingly, the booster circuit can be started up independently of the start-up energy from a power supplying unit other than the power generating element.

FOURTEENTH EMBODIMENT

Figure 21:
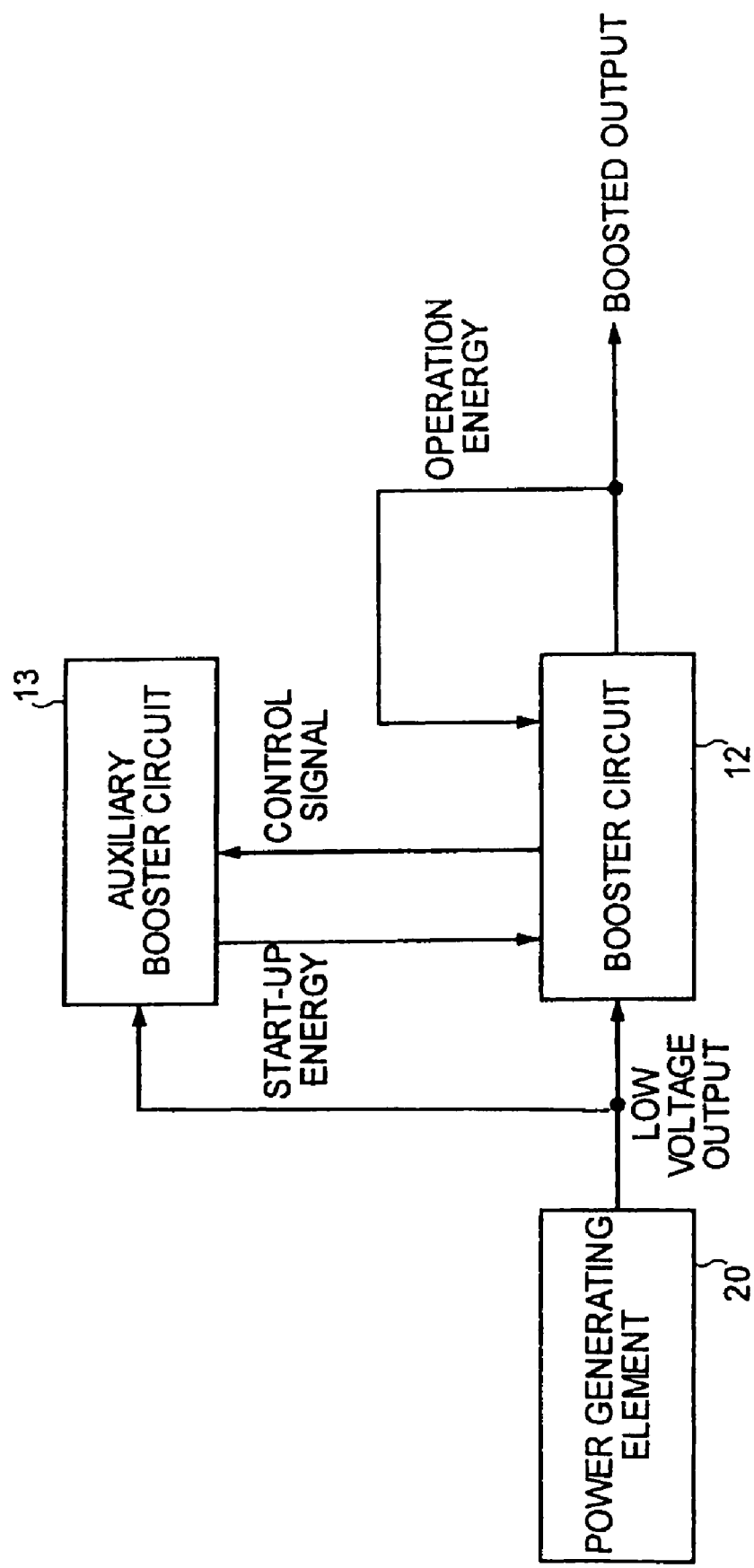
FIG. 21 is a diagram of a configuration of a booster according to a fourteenth embodiment of the present invention.

FIG. 21 is a diagram of a configuration of a booster according to a fourteenth embodiment of the present invention. The booster is configured to efficiently utilize the generated energy of the power generating element. The configuration shown in FIG. 21 is designed in such a manner that in the configuration according to the thirteenth embodiment as shown in FIG. 18, a control signal for judging whether to stop the start-up of the auxiliary booster circuit 13 is output from the booster circuit 12 to the auxiliary booster circuit 12.

Referring to FIG. 21, the operation of the booster is explained. However, the feature that the booster circuit 12 performs boosting operation by using either one of the start-up energy from the auxiliary booster circuit 13 and the operation energy obtained by feeding back a part of the output of the booster circuit 12 itself is the same as the first embodiment, so that description thereof is omitted.

The booster according to the fourteenth embodiment is configured in such a manner that after the start-up of the booster circuit 12, a control signal is output from the booster circuit 12 to the auxiliary booster circuit 13 to stop the supply of the operation energy that is output to the booster circuit 12 from the auxiliary booster circuit 13. A boosted output itself that is output from the booster circuit 12 can be used as the control signal. The judgment whether to stop the supply of the start-up energy may be performed based on the level of the boosted output. For example, control can be performed in such a manner that when the level of the boosted output exceeds a predetermined value, the supply of the operation energy stops while when the level of the boosted output is less than the predetermined value, the supply of the operation energy continues. Control of operation/non-operation in the inside of the auxiliary booster circuit 13 can be performed by stopping an oscillator circuit that switches the switched capacitor circuit upon receipt of a control signal therefor.

As described above, by the booster according to the fourteenth embodiment, the start-up of the auxiliary booster circuit is controlled based on the boosted output, so that after the start-up of the booster circuit, all of the generated energy of the power generating element can be directed to power generation, thereby promoting efficient utilization of generated energy.

FIFTEENTH EMBODIMENT

Figure 22:
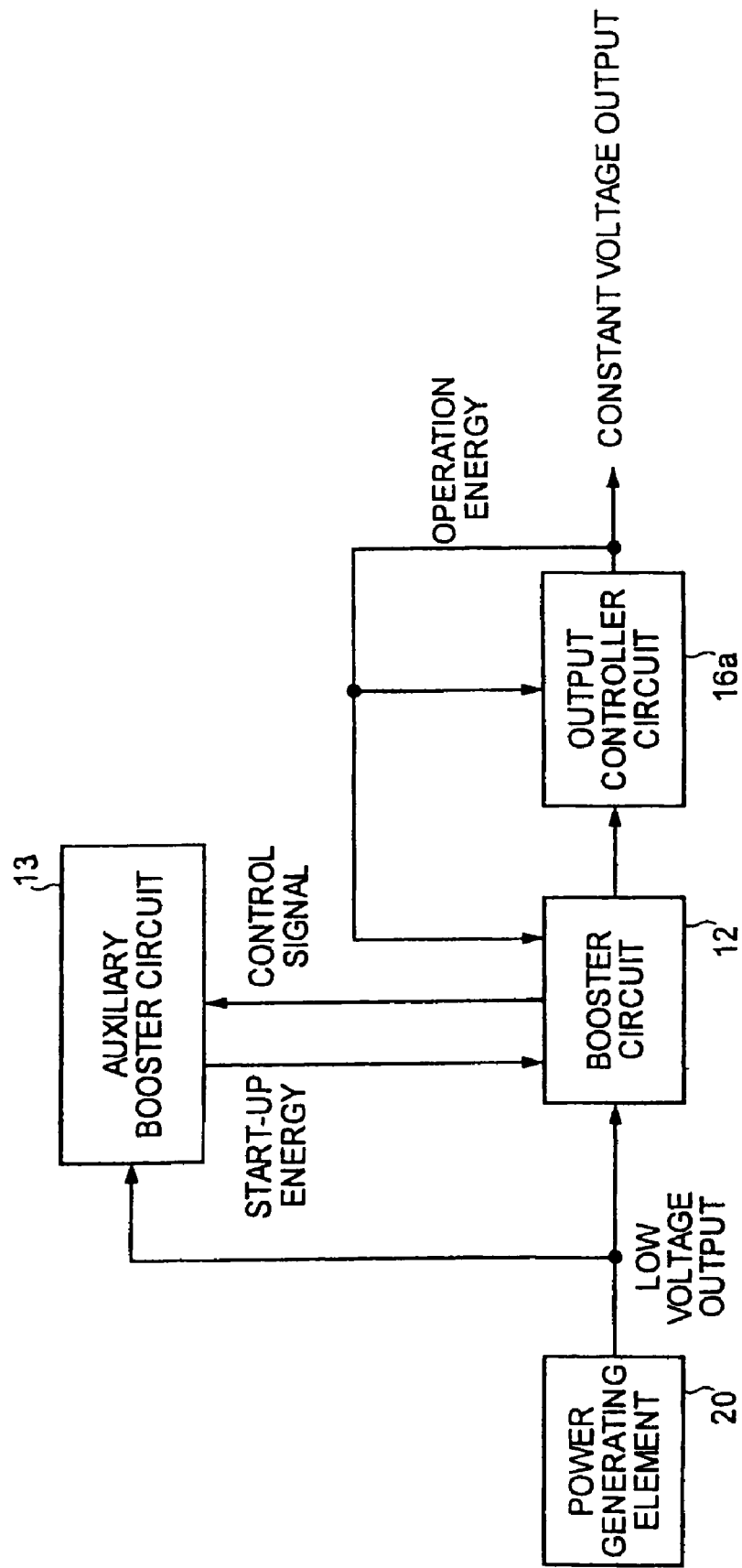
FIG. 22 is a diagram of a configuration of a booster according to a fifteenth embodiment of the present invention.

FIG. 22 is a diagram of a configuration of a booster according to a fifteenth embodiment of the present invention. The booster is of a configuration which includes an output control circuit 16a that is connected to an output stage of the booster circuit 12 in series. Other configurations are the same as or equivalent to those in the fourteenth embodiment and the same reference numerals as those in each circuit shown in FIG. 21 designate those portions.

Referring to FIG. 22, the operation of this booster circuit is explained. However, the feature that the booster circuit 12 performs boosting operation using either one of the start-up energy from the auxiliary booster circuit 13 and the operation energy obtained by feeding back a part of the output of the booster circuit 12 itself is the same as those in the first and second embodiments, so that description thereof is omitted.

The boosted output that is boosted by the booster circuit 12 is output, for example, as a constant voltage output by an output controller circuit 16a and a stable constant voltage output is supplied to a load (not shown). Further, in the same manner as in that in the fourteenth embodiment, when a predetermined boosted output is provided, the output of the start-up energy from the auxiliary booster circuit 13 stops based on the control signal (start-up stop control signal) from the booster circuit 12.

When the power generating element 20 is an energy source such as a solar cell, the output of the output controller circuit 16a is made a constant current output and a secondary cell for storing this energy may be directly connected to the output control circuit 16a. In addition, a rectifier element may be connected between the output controller circuit 16a and the secondary cell. Also, the secondary cell may be connected between the output controller circuit 16a and the power generating element 20 may be connected between the output controller circuit 16a and the secondary cell through a rectifier element. With such configurations, the flow back of current from the secondary cell to the output controller circuit 16a can be prevented, so that unnecessary discharge of the secondary cell can be prevented.

Figure 23:
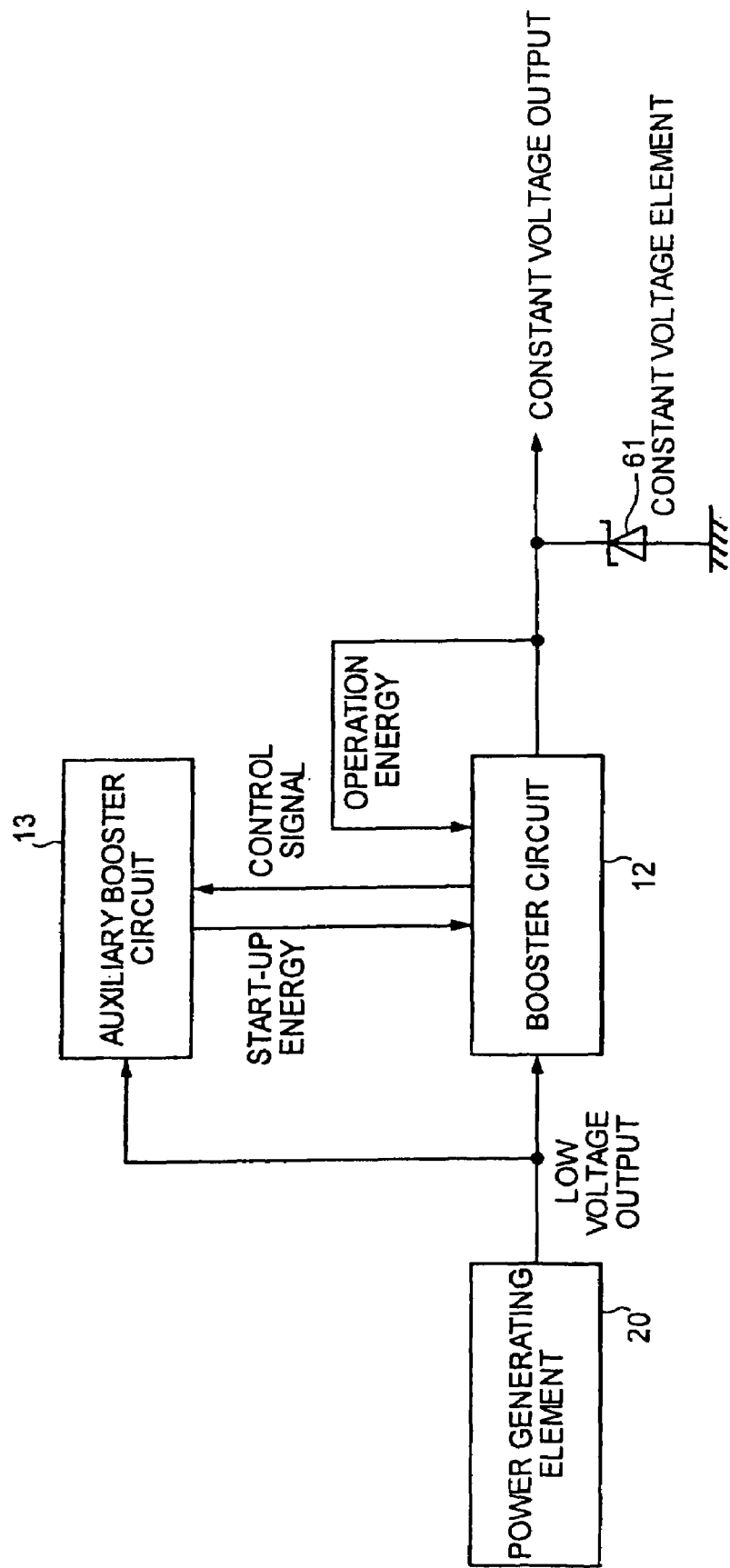
Figure 24:
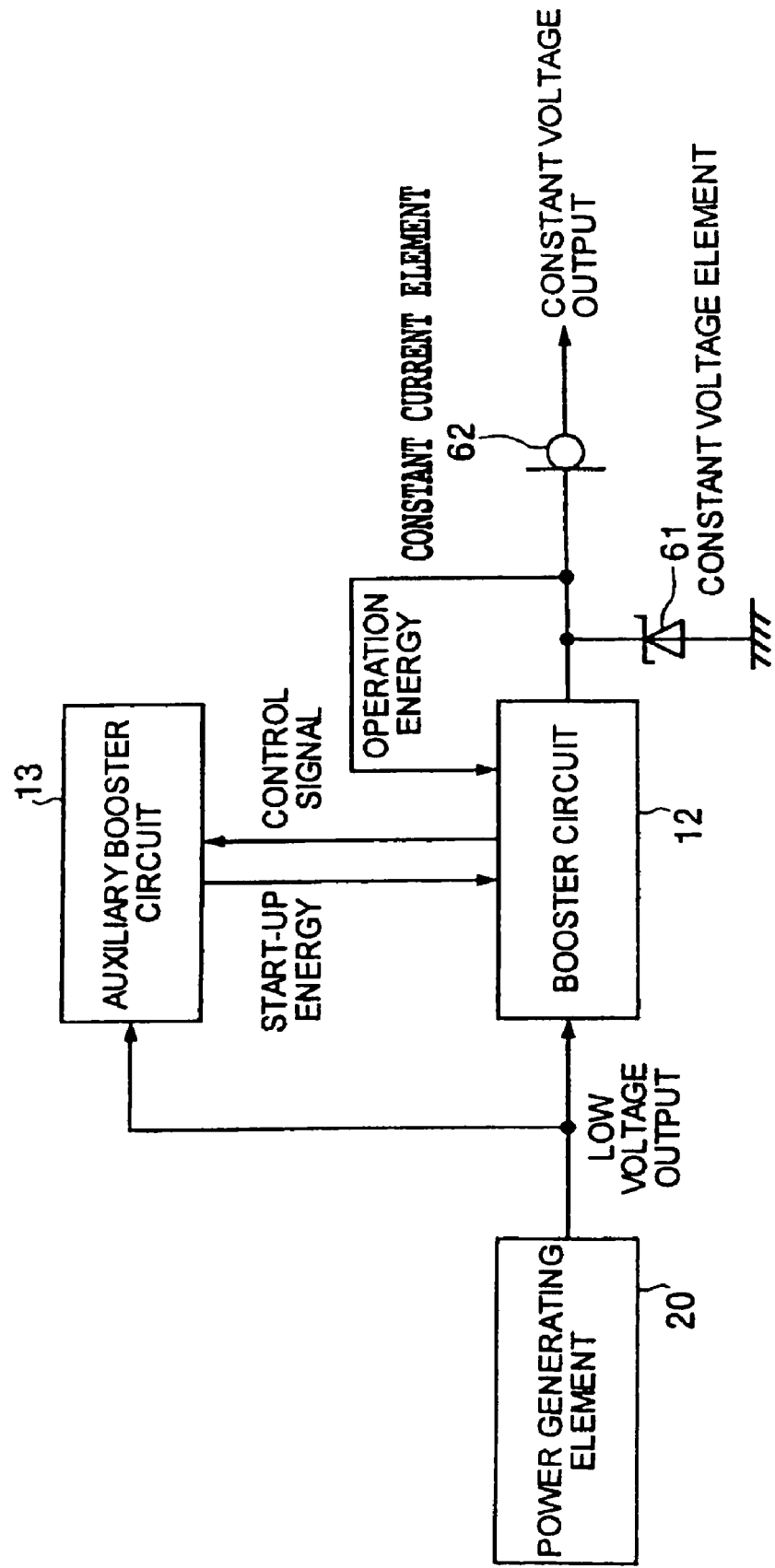

FIG. 23 is a diagram of a configuration that includes a constant voltage element (Zener diode) as one example of the output controller circuit 16a. FIG. 24 is a diagram of a configuration that includes a constant voltage element 61 (Zener diode) and a constant current element 62 as one example of the output controller circuit 16a. As shown in FIGS. 22 and 23, a constant voltage output or a constant current output can be easily generated so that a booster having an output control function can be realized at low cost and in a compact form. As another configuration of the output controller circuit 16a, a 3-terminal series regulator or the like may be used. This increases the stability of the output voltage.

With the booster according to the fifteenth embodiment, the output control is performed for obtaining a constant voltage or constant current, so that in addition to the effects of the first and second embodiments, respectively, the effect of supplying a stable output to a load can be obtained.

SIXTEENTH EMBODIMENT

Figure 25:
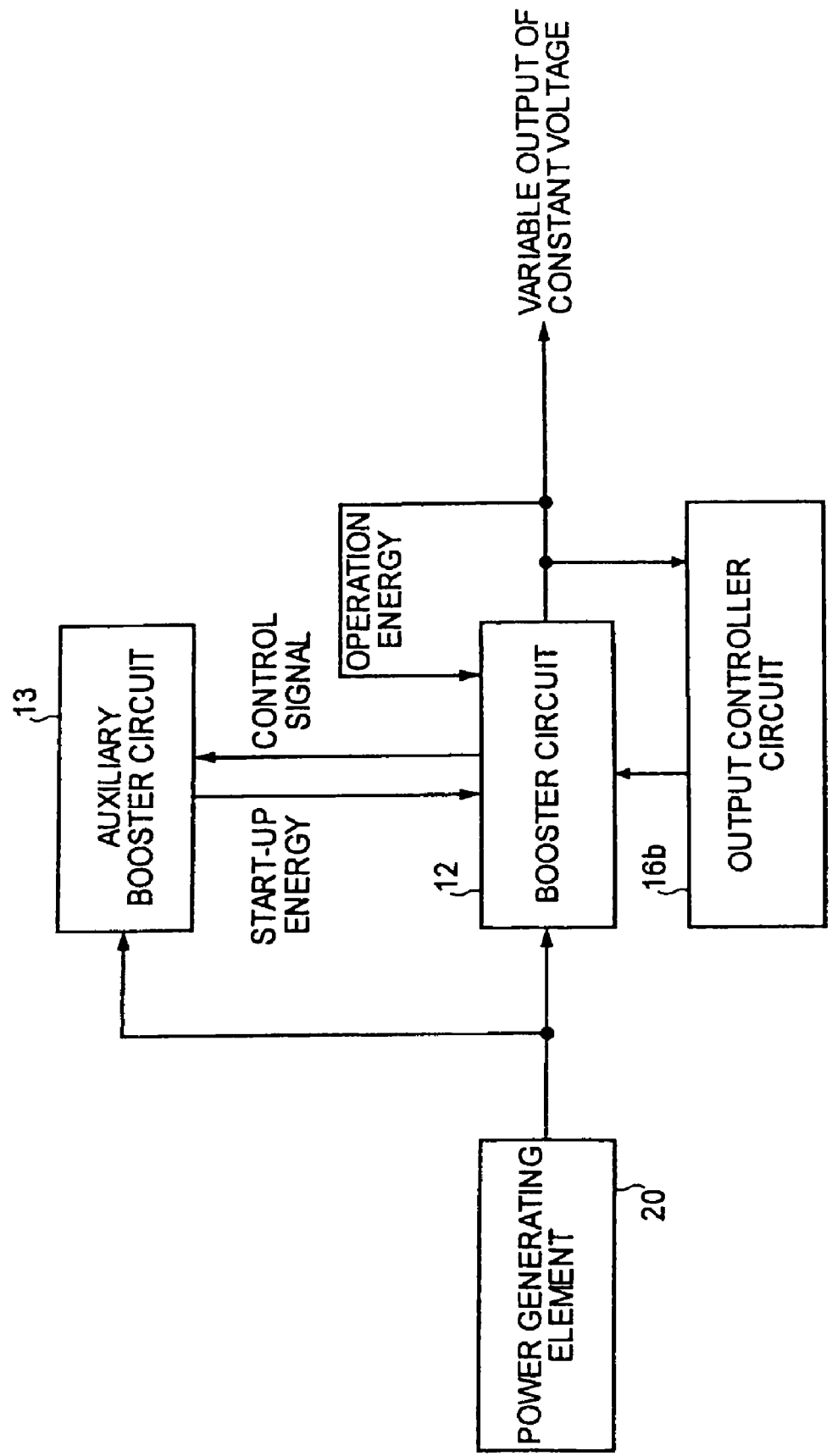
FIG. 25 is a diagram of a configuration of a booster according to a sixteenth embodiment of the present invention.

FIG. 25 is a diagram of a configuration of a booster according to a sixteenth embodiment of the present invention. The booster is of a configuration which includes an output control circuit 16b that is connected to an output stage of the booster circuit 12 in parallel. Other configurations are the same as or equivalent to those in the fourteenth embodiment and the same reference numerals as those in each circuit shown in FIG. 21 designate those portions.

Referring to FIG. 25, the operation of this booster circuit is explained. However, the feature that the booster circuit 12 performs boosting operation using either one of the start-up energy from the auxiliary booster circuit 13 and the operation energy obtained by feeding back a part of the output of the booster circuit 12 itself and the feature that when a predetermined boosted output is obtained, the output of the start-up energy from the auxiliary booster circuit 13 stops based on the control signal from the booster circuit 12 are the same as the fourteenth embodiment, so that description thereof is omitted.

The boosted output that is boosted by the booster circuit 12 is subjected to feedback control by the output controller circuit 16b and is output as a constant voltage variable output. That is, the booster according to the sixteenth embodiment has a function to maintain the output of the booster circuit 12 at a constant voltage by the output control circuit 16b and vary the output voltage in accordance with a load capacity. This constant voltage varying function can be realized by a configuration in which the booster circuit 12 includes a circuit of a switching type and the output control circuit 16b performs control such as pulse width modulation (PWM) control or pulse frequency modulation (PFM) control to the booster circuit 12.

Figure 26:
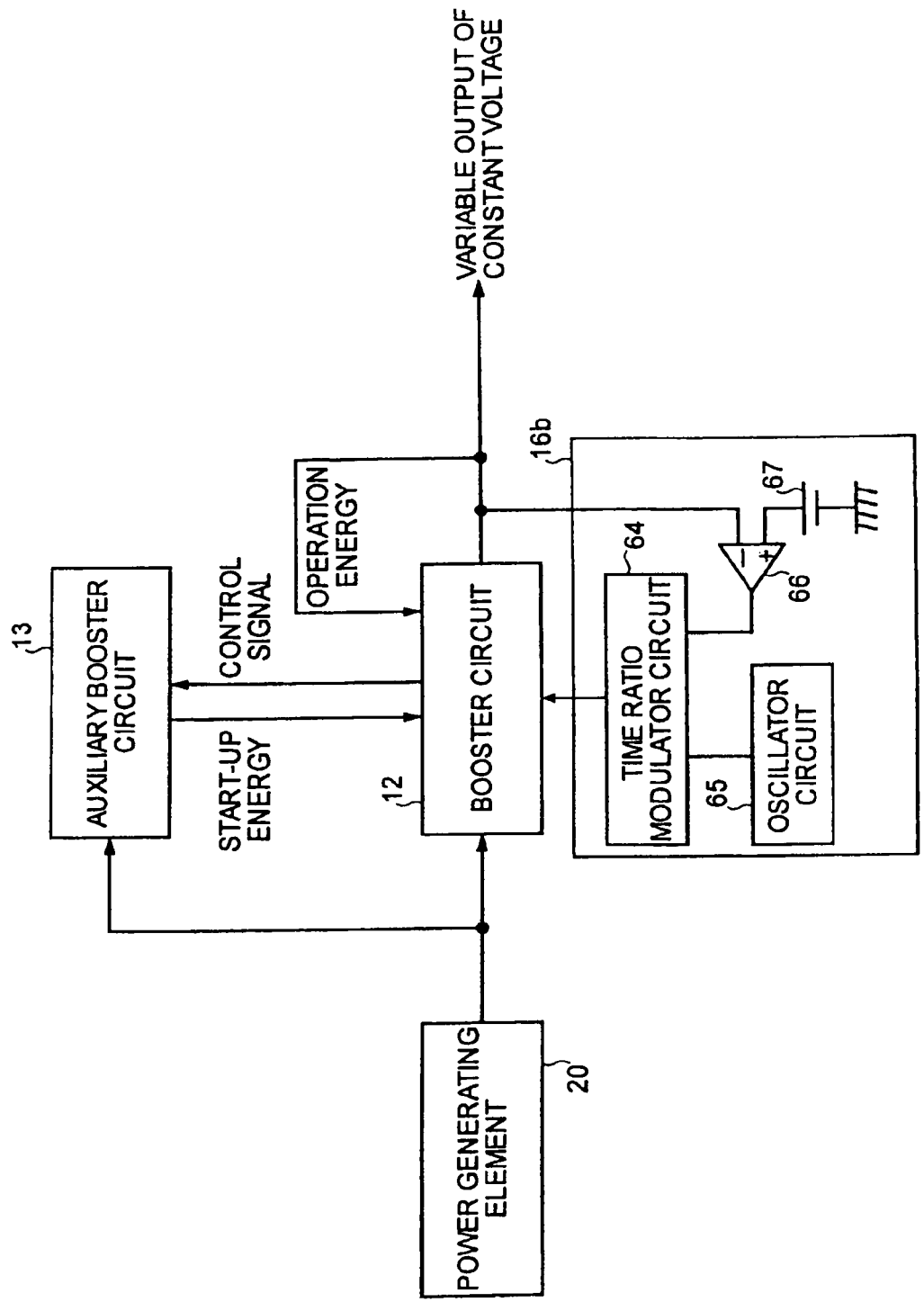
FIG. 26 is a diagram of one example of a configuration of an output controller circuit 16b.

FIG. 26 is a diagram of one example of a configuration of the output controller circuit 16b. The output control circuit 16b includes a time ratio modulator circuit 64, an oscillator circuit 65, and a comparator circuit 66. The output control circuit 16b operates as follows. The comparator 66 in the output controller circuit 16b compares the output of the booster circuit 12 and a predetermined standard voltage value 67 and a differential output voltage between these outputs is output to the time ratio modulator circuit. Time ratio modulator circuit 64 generates, for example, a PWM control signal to a triangular wave that is output from the oscillator circuit 65 based on the differential output voltage that is output from the comparator circuit 66 and outputs it to the booster circuit 12. In the circuit configuration according to this embodiment, as described above, a configured is adopted in such a manner that the boosted output of the booster circuit 12 is subjected to feedback control by the output controller circuit 16b, so that the output voltage is stabilized. A configuration is adopted in such a manner that the output voltage can vary based on the standard voltage value 67, so that a variable output of a constant voltage can be obtained.

With the booster according to the sixteenth embodiment, a boosted output of the booster circuit 12 is subjected to feedback control by the output controller circuit 16b and the output voltage is made variable based on the standard voltage, so that in addition to the effects of the first to third embodiments, a variable and stabilized output can be obtained in accordance with a load capacity.

SEVENTEENTH EMBODIMENT

Figure 27:
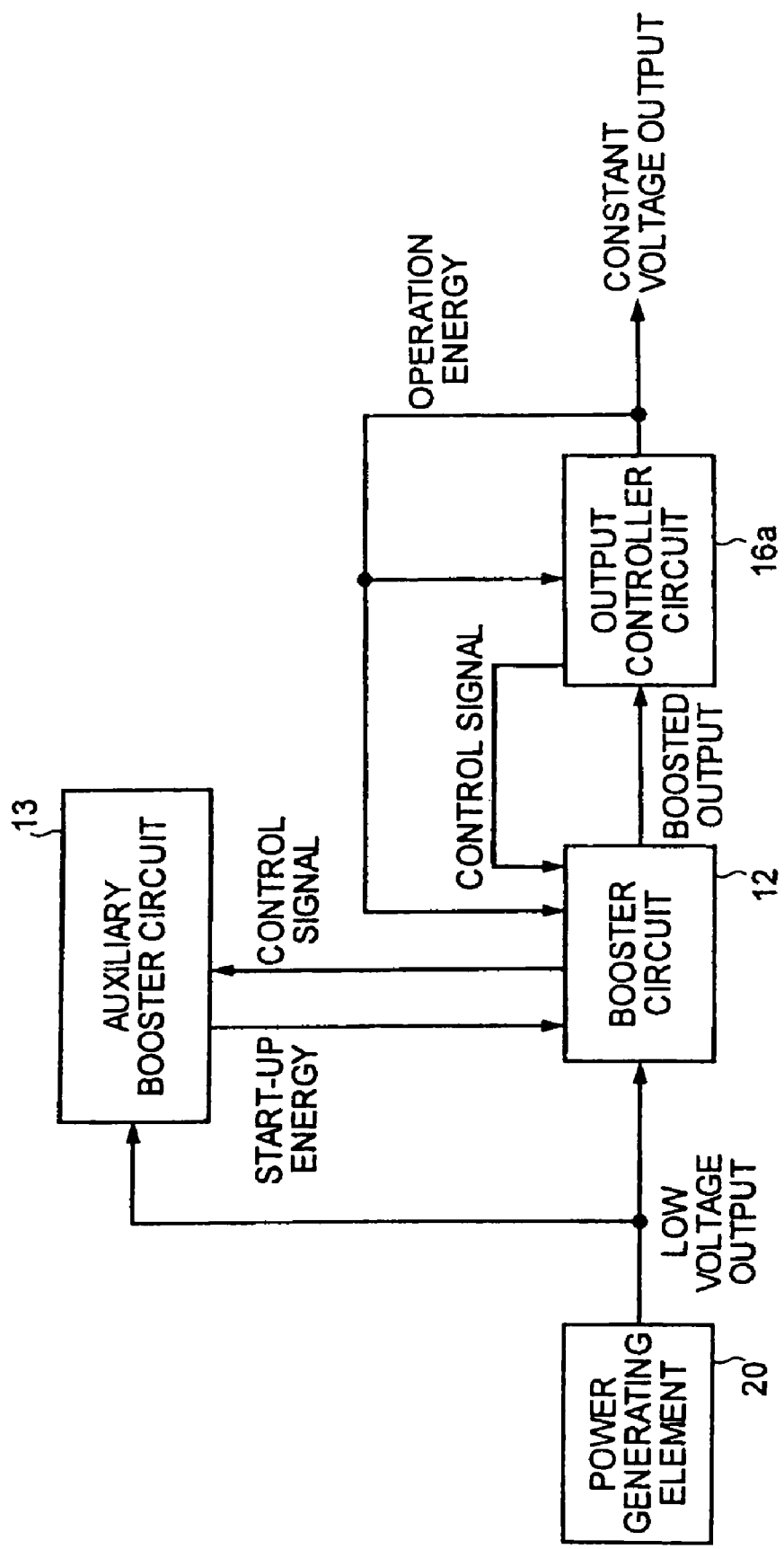
FIG. 27 is a diagram of a configuration of a booster according to a seventeenth embodiment of the present invention.

FIG. 27 is a diagram of a configuration of a booster according to a seventeenth embodiment of the present invention. The booster depicted in FIG. 27 is configured in such a manner that in the booster according to the fifteenth embodiment shown in FIG. 22, a control signal is transmitted from the output control circuit 16a to the booster circuit 12 to make the boosting capability variable, thereby achieving a control objective. Other configurations are the same as or equivalent to those of the fifteenth embodiment and the same reference numerals as those shown in FIG. 22 designate those portions.

Referring to FIG. 27, the operation of this booster circuit is explained. The booster circuit 12 receives start-up energy from the auxiliary booster circuit 13 and starts up. In this point in time, no boosted output is generated or a boosted output does not reach the minimum operation voltage of the output controller circuit 16a. Therefore, in this point in time, no control signal from the output controller circuit 16a is present or an unstable control signal is present. For this reason, there is a fear that the booster circuit 12 that has come to start up will stop due to an undesirable state of the control signal, thus failing to operate normally. To solve this problem, a circuit configuration having the following characteristics must be adopted.

(1) At the time of start-up, an unstable control output is not given to the booster circuit 12 from the output controller circuit 16a.

(2) At the time of start-up, the control signal output terminal of the output controller circuit 16a is at a high impedance.

To prevent the output controller circuit 16a from outputting an unstable control signal, it is effective to use a current driving element such as a bipolar transistor in a control signal outputting stage. When such an element is used, a predetermined current is necessary for turning the element ON, so that wrong operation of the element can be prevented at the time of starting up the booster circuit 12 or after the start-up thereof. Making the output terminal at a high impedance results in a flow of current from the booster circuit 12 to the control output terminal of the output control circuit 16a, so that deterioration of the start-up characteristics of the booster circuit can be prevented. Therefore, it is effective to adopt open drain configuration that is made a current-driven type by connecting a resistor in parallel to the open collector or to between the gate and source in a control signal output stage of the output controller circuit 16a.

In the booster according to the seventeenth embodiment, the booster circuit controls boosting capability based on the control output of the output controller circuit. Accordingly, the output controller circuit is prevented from performing an undesirable control to the booster circuit that has just come to start up and is in an unstable state, such as a state immediately after the start-up.

EIGHTEENTH EMBODIMENT

Figure 28:
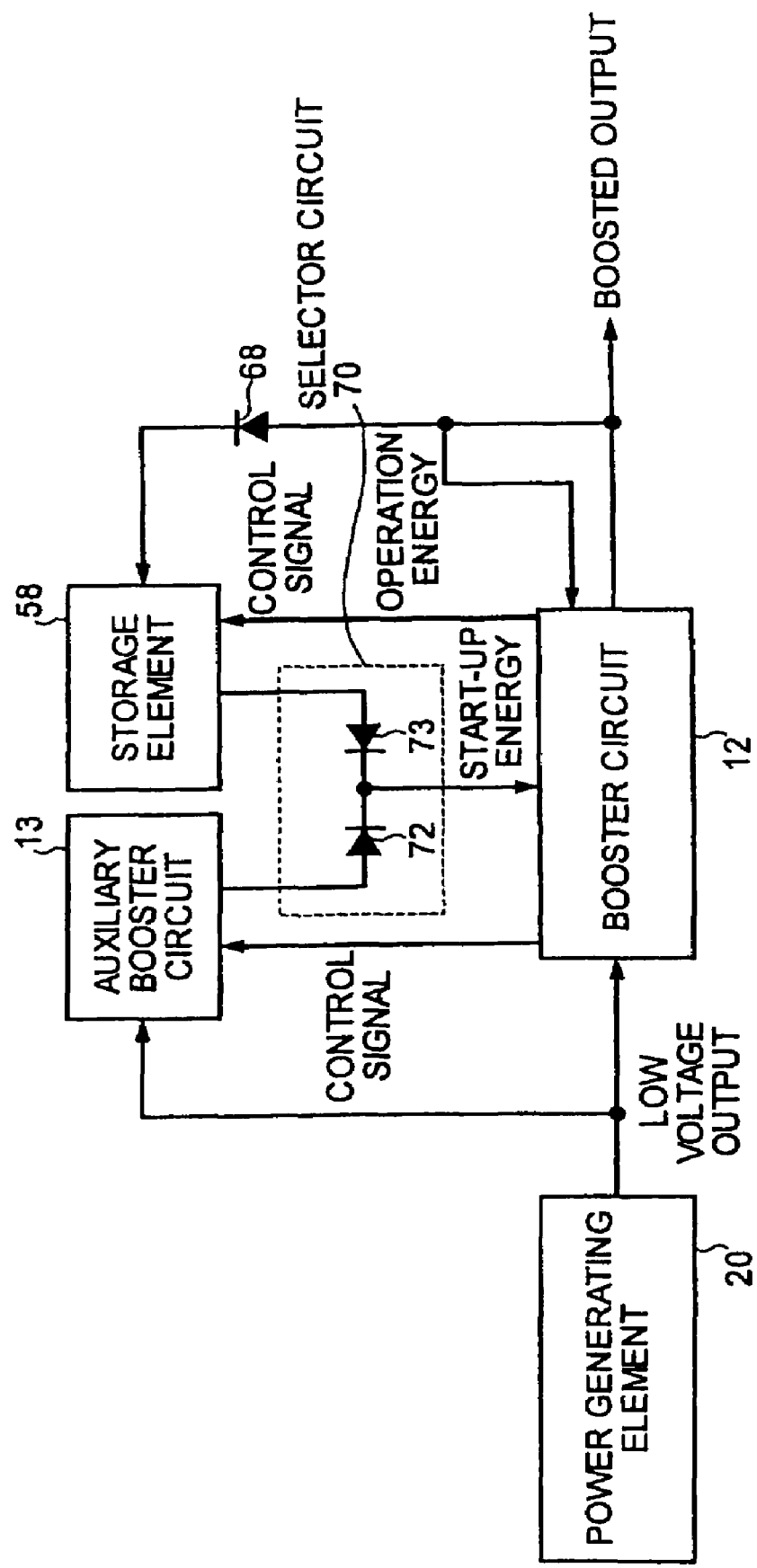
FIG. 28 is a diagram of a configuration of a booster according to an eighteenth embodiment of the present invention.

FIG. 28 is a diagram of a configuration of a booster according to an eighteenth embodiment of the present invention. The booster includes, in the configuration according to the thirteenth embodiment shown in FIG. 18, a storage element 58 that stores a part of the output of the booster circuit 12 as energy to be used upon a next or subsequent start-up, a rectifier element 68 for preventing flow back that prevents flow of the output of the storage element 58 to the load side, and a selector circuit 70 including rectifier elements 72 and 73 for selecting either one of the auxiliary booster circuit 13 and the storage element 58 as a source that provides start-up energy. Other configurations are the same as or equivalent to those of the fifteenth embodiment and the same reference numerals as those shown in FIG. 18 designate those portions.

Referring to FIG. 28, the operation of this booster circuit is explained. However, the feature that the booster circuit 12 performs boosting operation using the operation energy that is a part of its own output fed back to the booster circuit itself after the start-up is the same as that in the other embodiments and explanation will be omitted herein.

In FIG. 28, the booster circuit 12 receives either one of the start-up energy form the auxiliary booster circuit 13 and the start-up energy from the storage element 58 and starts up. In the selector circuit 70 provided with the rectifiers 72 and 73, one of the output voltage of the auxiliary booster circuit 13 and the output voltage of the storage element 58, which is higher, is selected and output to the booster circuit 12. After the start-up, the booster circuit 12 supplies a predetermined boosted output to, for example, a load (not shown). A part of the boosted output is stored in the storage element 58 through the rectifier element 68 as energy for restarting the booster circuit 12.

In the boosters according to other embodiments, when a predetermined output (power generation energy) is not provided to the booster circuit 12 from the power generating element 20, the operation of the booster circuit 12 becomes unstable, so that it becomes necessary to stop the booster circuit 12. On the other hand, to restart the booster circuit 12 after the booster circuit 12 stops, new start energy is required. In this case, if all or a part of the output of the booster circuit 12 is stored in the storage element 58 as energy for restarting the booster circuit 12 itself, not only the start-up energy from the auxiliary booster circuit 13 but also the start-up energy from the storage element 58 can be used when the booster circuit 12 is restarted. If the booster circuit can be restarted using the start-up energy from the storage element 58, not only the restart time of the booster circuit 12 can be shortened as compared with the case where the auxiliary booster circuit 13 is used but also the booster circuit 12 can be started up reliably. If the predetermined boosted output is output from the booster circuit 12, similarly to the fourteenth embodiment, it is only necessary to stop outputting of the start-up energy from the auxiliary booster circuit 13 and storage element 58 based on the control signal from the booster circuit 12.

With the booster according to the eighteenth embodiment, all or a part of the boosted output is stored in the storage element (power storing unit) as energy for restarting the own operation and either one of the first start-up energy that is start-up energy output from the auxiliary booster circuit and the second start-up energy that is start-up energy output from the storage element is output to the booster circuit. Accordingly, the start-up of the booster circuit can be performed reliably.

Although the storage element is used as an element for storing start-up energy for restarting, a secondary cell or the like may also be used. Use of the secondary cell enables one to perform the start-up of the booster circuit more reliably.

NINETEENTH EMBODIMENT

Figure 29:
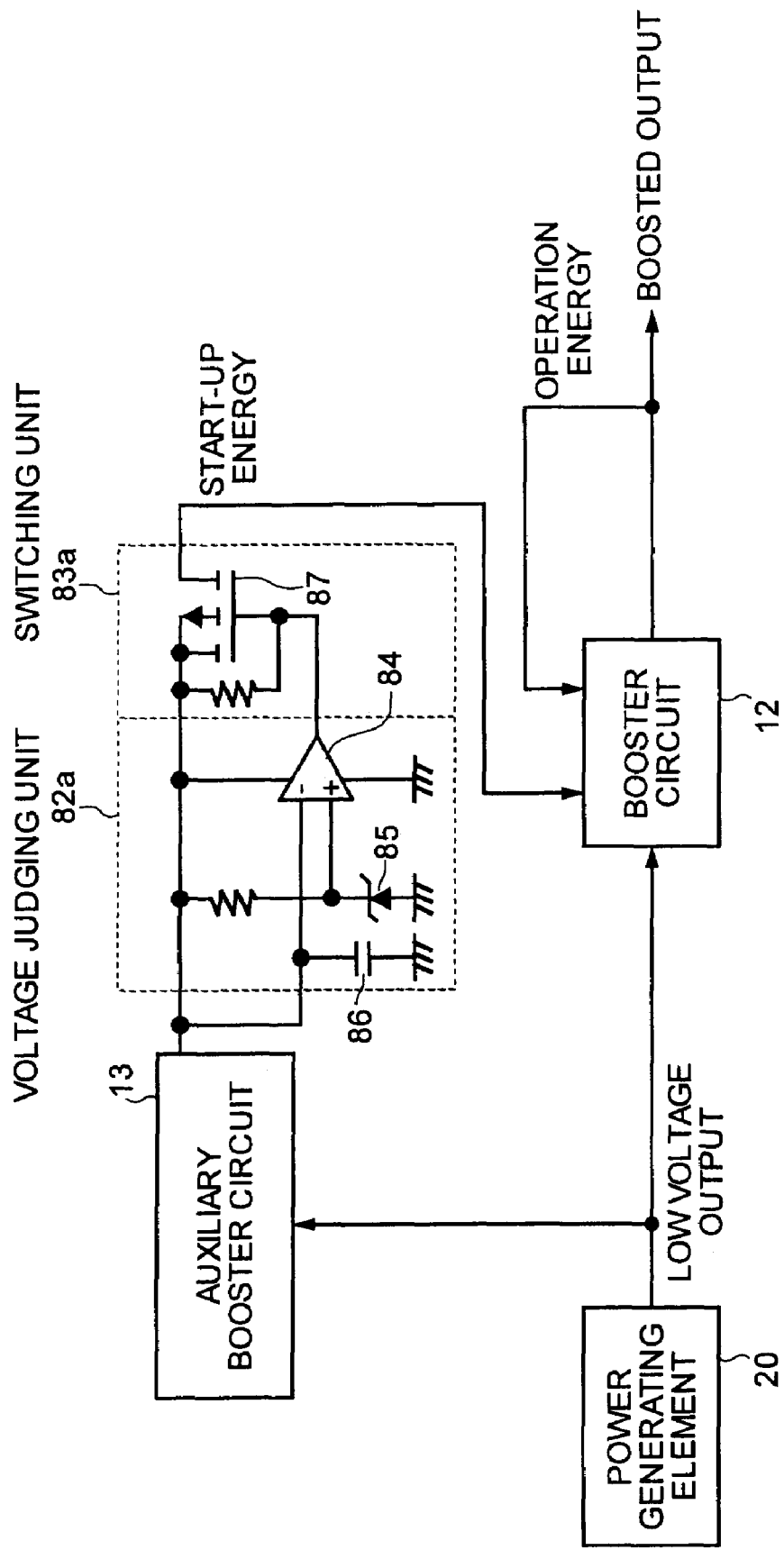
FIG. 29 is a diagram of a configuration of a booster according to a nineteenth embodiment of the present invention.

FIG. 29 is a diagram of a configuration of a booster according to a nineteenth embodiment of the present invention. The booster has a configuration that additionally includes, in the configuration according to the thirteenth embodiment shown in FIG. 18, a voltage judging part 82a that controls timing in which the auxiliary booster circuit outputs based on an output value (voltage) of an output of the auxiliary booster circuit output to the booster circuit 12 and a switching part 83a. Other configurations are the same as or equivalent to those of the thirteenth embodiment shown in FIG. 18 and the same reference numerals designate those portions.

Referring to FIG. 29, the operation of this booster circuit is explained. However, the feature that the booster circuit 12 performs boosting operation using either the start-up energy that is an output (auxiliary booster circuit output) of the auxiliary booster circuit 13 or the operation energy that is a part of its own output fed back to the booster circuit itself is the same as that in the other embodiments and explanation is omitted.

The output from the auxiliary booster circuit 13 (i.e., output from the auxiliary booster circuit) is stored in a capacitor 86 in the voltage judging part 82a, and the stored voltage is compared in the comparator circuit 84 with a standard voltage value ($V_0$) generated by a constant voltage element 85, such as a Zener diode. When the stored voltage of the capacitor 86 exceeds the standard voltage value ($V_0$), a switching element provided in the switching part 83a, such as a MOSFET 87, becomes conducting to output the output of the auxiliary booster circuit (start-up energy) to the booster circuit 12. When the stored voltage of the capacitor 86 is not above the standard voltage value ($V_0$), the switching element in the switching part 83a is not conducting, so that the supply of the auxiliary booster circuit output to the booster circuit 12 is suspended. The standard voltage ($V_0$) determined by the capacitor 86 and the constant voltage element 85 may be advantageously adjusted to an optimum value, for example, in such a manner that when the energy stored in the capacitor in the last stage of the switched capacitor type circuit shown in FIG. 19 or the charged pump type circuit shown in FIG. 20 reaches a predetermined energy level that is sufficient for starting up the booster circuit 12, the switching element, such as the MOSFET 87, turns on.

When the amount of power generation by the power generating element 20 is small, it may sometimes be the case that the output current that is output from the auxiliary booster circuit 13 is lower than the current necessary for starting up the booster circuit 12. In the circuit configurations of the boosters according to the first to the fifth embodiments, the current for starting up the booster circuit 12 (start-up current) is insufficient. Accordingly, there is a possibility that the output voltage of the auxiliary booster circuit immediately after the booster circuit 12 is started up instantaneously lowered, resulting in a failure to start up the booster circuit 12.

However, in the booster according to this embodiment, the standard volume ($V_0$) is set so that the output of the auxiliary booster circuit 13 is supplied to the booster circuit 12 when the amount of energy that is stored in the capacitor 86 with a capacitance $C_x$, $E=(C_x V^2)/2$, reaches an amount of energy that allows start-up of the booster circuit 12. Therefore, even when the amount of the power generation by the power generating element 20 is slight, a sufficient amount of start-up energy is stored with passage of time although a storage time in which the energy is stored in the capacitor is longer. Accordingly, the start-up of the booster circuit 12 can be performed reliably.

When the power generating element 20 is a solar cell, a boosted output can be obtained at a lower luminance. In particular, with a solar cell arranged in the outdoor, luminance gradually increases from dawn, so that the booster starts up automatically, and a boosted output can be obtained for a long time.

In the booster according to the nineteenth embodiment, the voltage judging includes a comparator that compares the auxiliary booster circuit output with a predetermined standard voltage and the switching element provided in the switching part is controlled based on the result of comparison by the comparator. Accordingly, the start-up of the booster circuit can be performed reliably independently of the power generation state of the power generating element.

Although the booster according to this embodiment includes, in the booster according to the thirteenth embodiment shown in FIG. 18, the voltage judging part 82a and the switching part 83a between the auxiliary booster circuit and the booster circuit, a configuration equivalent to this may be applied to the boosters according to the fourteenth and the fifteenth embodiments with similar effects as those of the booster according to the nineteenth embodiment.

TWENTIETH EMBODIMENT

Figure 30:
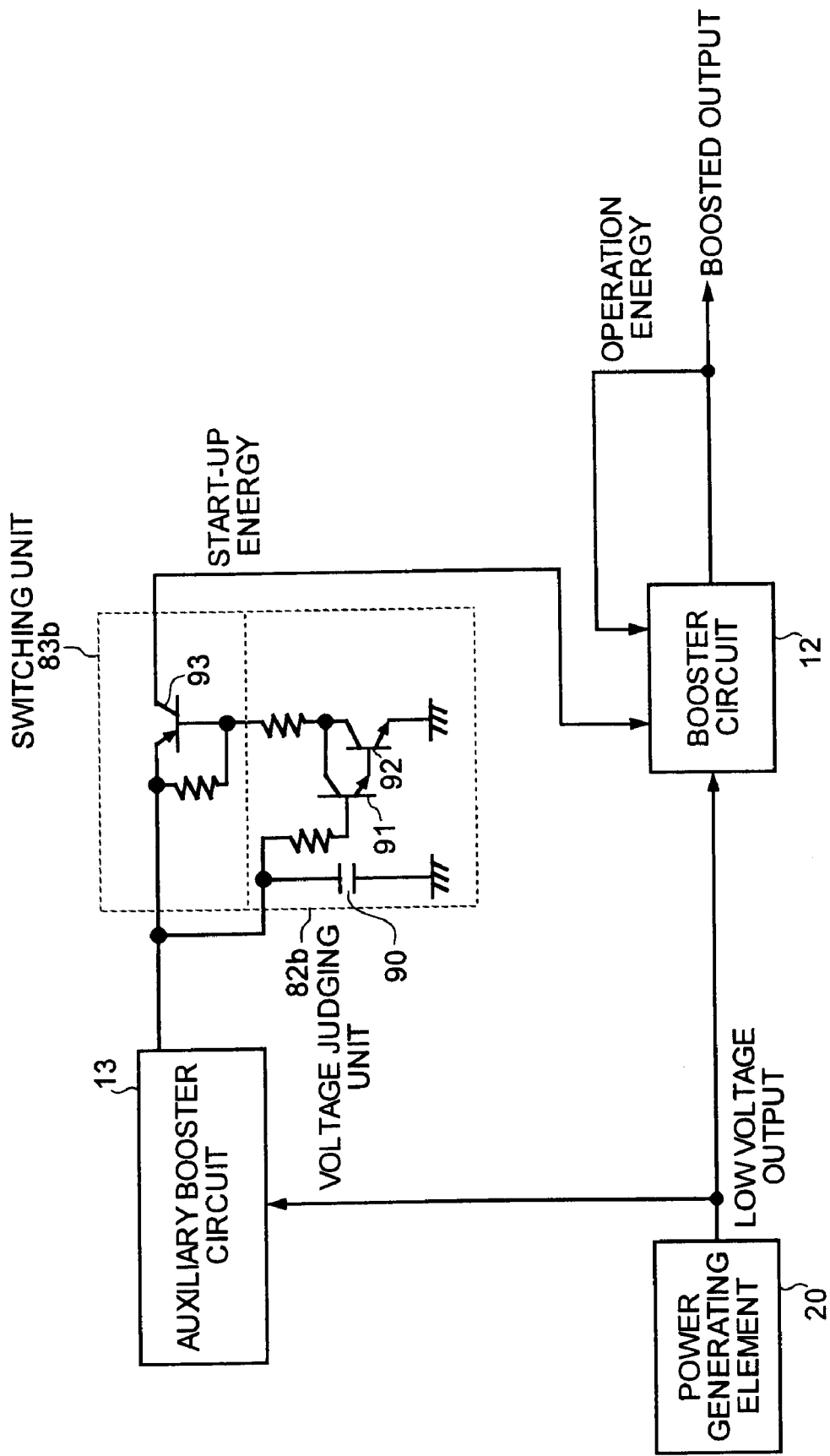
FIG. 30 is a diagram of a configuration of a booster according to a twentieth embodiment of the present invention.

FIG. 30 is a diagram of a configuration of a booster according to a twentieth embodiment of the present invention. The booster depicted in FIG. 30 is configured in such a manner that instead of the voltage judging part 82a and the switching part 83a, a voltage judging part 82b and a switching part 83b that have similar functions as those of the voltage judging part 82a and the switching part 83a, respectively, are provided. Other configurations are the same as or equivalent to those of the nineteenth embodiment shown in FIG. 29 and the same reference numerals designate those portions.

Referring to FIG. 30, the operation of this booster circuit is explained. However, the basic operation is the same as that in the nineteenth embodiment and explanation is omitted.

The voltage judging part 82b includes a resistor, a capacitor 90, Darlington-connected transistors 91 and 92, and so on and when a stored voltage that is stored in the capacitor in the last stage in the auxiliary booster circuit 13 exceeds $V_{BE}$ (that is approximately equal to 1.2 V) of the Darlington-connected transistors 91 and 92, a switching element 93 in the switching part 83b becomes conducting, so that start-up energy is supplied to the booster circuit 12. Although the voltage judging part 82b includes the Darlington-connected transistors 91 and 92, the present invention is not limited to this connection and a configuration in which a resistor, a rectifier element and so on are combined and a voltage drop that occurs in the rectifier element is utilized may also be used.

Also, in the booster according to the twentieth embodiment, by setting the resistance values of the voltage judging part 82b and the switching part 83b to predetermined values, the booster can be operated in such a manner that when the energy amount $E=(C_0 V^2)/2$ reaches an energy amount that allows start-up of the booster circuit 12, the output of the auxiliary booster circuit 13 is supplied to the booster circuit 12 in the same manner as that in the booster according to the nineteenth embodiment. Accordingly, even when the power generation amount of the power generating element 20 is slight, the start-up of the booster circuit 12 can be performed reliably. The booster according to the twentieth embodiment provides effects equivalent to those of the booster according to the nineteenth embodiment but requires no comparator in contrast to the voltage judging part 82a in the nineteenth embodiment. This provides advantages that power consumption reduces to improve the efficiency of energy storage in the storage element and cost decreases.

In the booster according to this embodiment, the voltage judging part includes Darlington-connected transistors that become conducting when the auxiliary booster circuit output reaches a predetermined voltage and the switching element provided in the switching part is controlled based on the auxiliary booster circuit output and the voltage drop that occurs between the base and emitter of the Darlington-connected transistors. Accordingly, the start-up of the booster can be performed reliably independently of the power generation state of the power generating element.

Although the booster according to the embodiment is configured to include the voltage judging part 82b and the switching part 83b between the auxiliary booster circuit and the booster circuit, a configuration equivalent to this may also be applied to the boosters according to the fourteenth to seventeenth embodiments with similar effects to those of the twentieth embodiment.

INDUSTRIAL APPLICABILITY

The booster according to the present invention is useful as a booster for use in a power source for mobile devices, and in particular, the booster according to the present invention is suitable when an output of a fuel cell or an output of a solar cell is used as an energy source.

The invention claimed is:

1. A booster comprising:
   a booster circuit to which either start-up energy necessary for start starting up the booster circuit or operation energy necessary for continuing an operation of the booster circuit is supplied, wherein the booster circuit generates a boosted output by boosting an input voltage as a target to be boosted, and outputs the boosted output; and
   a storage element that stores the boosted output input through a rectifier element connected in a forward direction between the booster circuit and the storage element and generates a constant voltage output, and outputs the start-up energy; and
   a selector circuit that outputs either the start-up energy or the operation energy to the booster circuit, the selector circuit including two inputs, one of the two inputs being connected to an output of the booster circuit, other one of the two inputs being connected to an output of the storage element, wherein
   an output from the booster circuit is supplied to the selector circuit as the operation energy, and an output from the storage element is supplied to the selector circuit as the start-up energy.

2. The booster according to claim 1, wherein the selector circuit further comprises:
   a rectifier element connected in a direction in which the boosted output is fed back to the booster circuit itself and in a forward direction.

* * * * *